United States Patent
Agram et al.

(10) Patent No.: US 12,266,167 B1
(45) Date of Patent: Apr. 1, 2025

(54) RADIOMETRIC TERRAIN CORRECTION

(71) Applicant: Descartes Labs, Inc., Santa Fe, NM (US)

(72) Inventors: Piyush Shanker Agram, Pasadena, CA (US); Scott Allen Arko, Fairbanks, AK (US); Matthew Thomas Calef, Los Alamos, NM (US); Michael S. Warren, Los Alamos, NM (US)

(73) Assignee: EarthDaily Analytics USA, Inc., Maple Grove, MN (US)

( * ) Notice: Subject to any disclaimer, the term of this patent is extended or adjusted under 35 U.S.C. 154(b) by 454 days.

(21) Appl. No.: 17/749,539

(22) Filed: May 20, 2022

Related U.S. Application Data

(60) Provisional application No. 63/191,841, filed on May 21, 2021.

(51) Int. Cl.
    *G06V 20/13* (2022.01)
    *G06T 7/60* (2017.01)
    *G06V 10/764* (2022.01)

(52) U.S. Cl.
    CPC .............. *G06V 20/13* (2022.01); *G06T 7/60* (2013.01); *G06V 10/764* (2022.01)

(58) Field of Classification Search
    CPC ......... G06V 20/13; G06V 10/764; G06T 7/60
    See application file for complete search history.

(56) References Cited

U.S. PATENT DOCUMENTS

| 7,729,561 B1* | 6/2010 | Boland | G06V 20/13 |
| | | | 382/109 |
| 2010/0094556 A1* | 4/2010 | Barnes | G01V 7/16 |
| | | | 702/5 |

* cited by examiner

*Primary Examiner* — Brandon J Miller
(74) *Attorney, Agent, or Firm* — Scale LLP

(57) ABSTRACT

Performing radiometric terrain correction includes receiving an uncorrected image and acquisition geometry metadata. It further includes determining an acquisition classification based at least in part on the acquisition geometry metadata. It further includes based at least in part on the acquisition classification, determining whether a correction factor corresponding to the acquisition classification exists. It further includes in response to determining that the correction factor corresponding to the acquisition classification does not exist: determining a correction factor; and storing the correction factor. It further includes associating the uncorrected image with the correction factor.

21 Claims, 41 Drawing Sheets

Obtain list of images to download

Optional [
    filter list of images [
        obtain metadata for images
        apply filter to select images of a given type or in a given region
            or for a given period of time
        ]
    ]

\# Download data
For each image in list:
    Check if we have already retrieved image
    If not [
      Download image
      copy image to long-term cloud storage
      if download or copy fails:
        retry until success
    ]

FIG. 6

\# Pre-process data
For each new image in cloud storage:
    Tile image
    Optional [ interpolate / reproject / convert to reflectance ]
    Copy processed image tiles to cloud storage
    if anything fails:
        retry until success
    Put metadata entry in key/value store for each image tile
]

FIG. 7

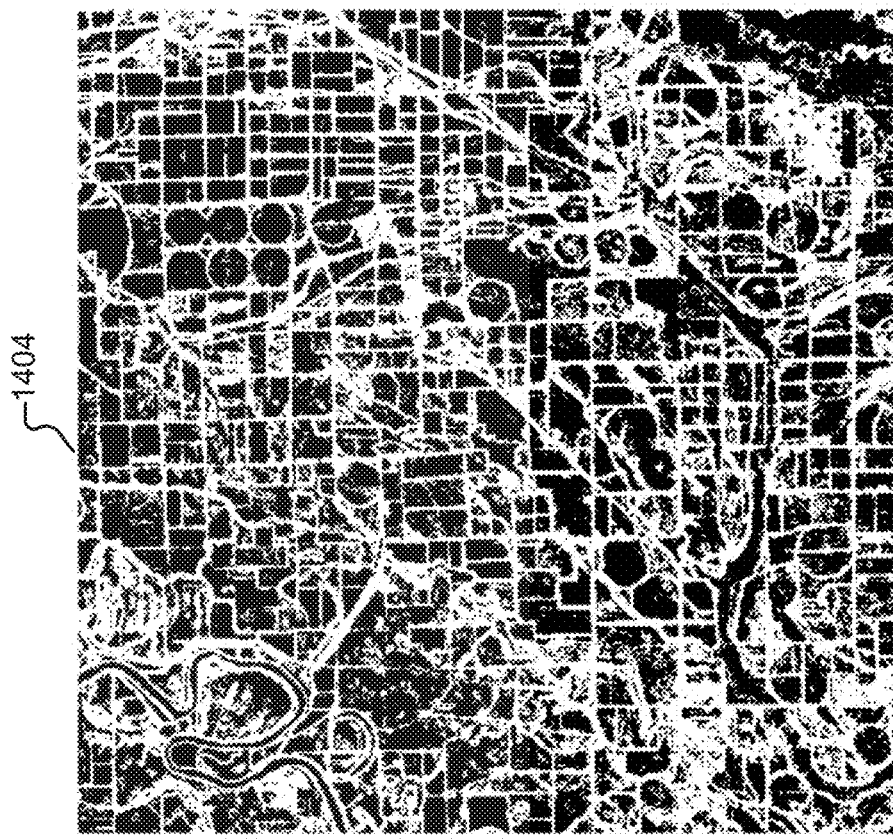
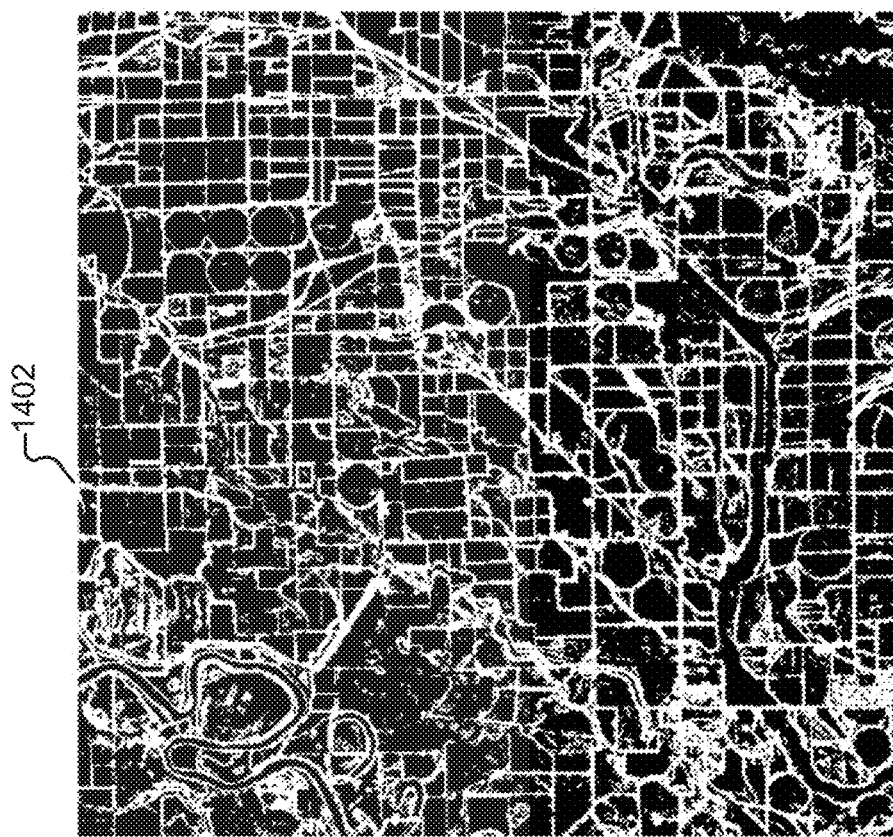
FIG. 14

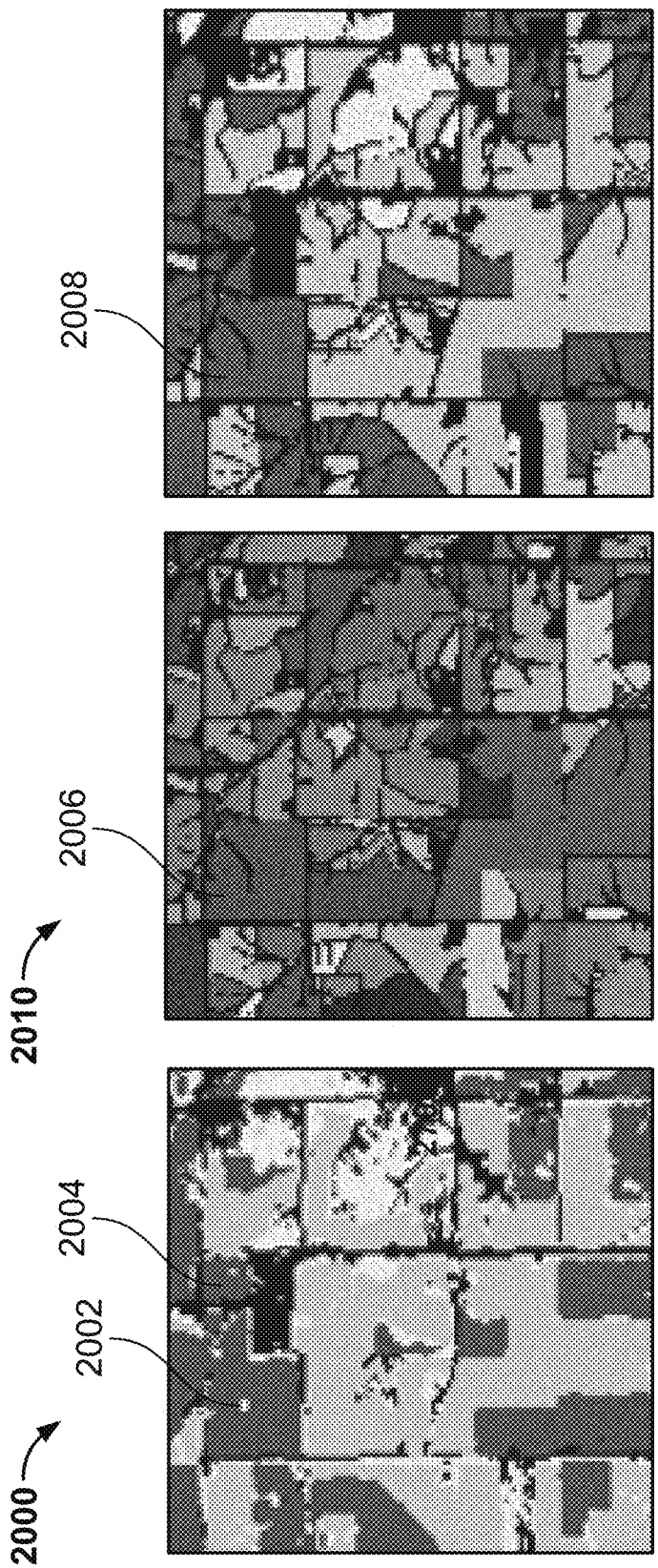

RADIOMETRIC TERRAIN CORRECTION

CROSS REFERENCE TO OTHER APPLICATIONS

This application claims priority to U.S. Provisional Patent Application No. 63/191,841 entitled RADIOMETRIC TERRAIN CORRECTION filed May 21, 2021 which is incorporated herein by reference for all purposes.

BACKGROUND OF THE INVENTION

Performing radiometric terrain correction can be challenging due to factors such as the manner in which observational data sets are captured. This challenge can be particularly daunting given the computational resources required to perform such correction. Accordingly, there is an ongoing need for systems and techniques capable of efficiently performing radiometric terrain correction.

BRIEF DESCRIPTION OF THE DRAWINGS

Various embodiments of the invention are disclosed in the following detailed description and the accompanying drawings.

FIG. 6 depicts an example of pseudocode for ingesting data.

FIG. 7 depicts an example of pseudocode for preprocessing data.

FIG. 14 depicts gradient presence images.

FIG. 20A illustrates an example of a portion of land classified without use of a boundary map.

FIG. 20B illustrates an example of a boundary map.

FIG. 20C illustrates an example result of providing the time series used to produce a classification map, and a boundary map, to a classifier.

DETAILED DESCRIPTION

Figure 1:
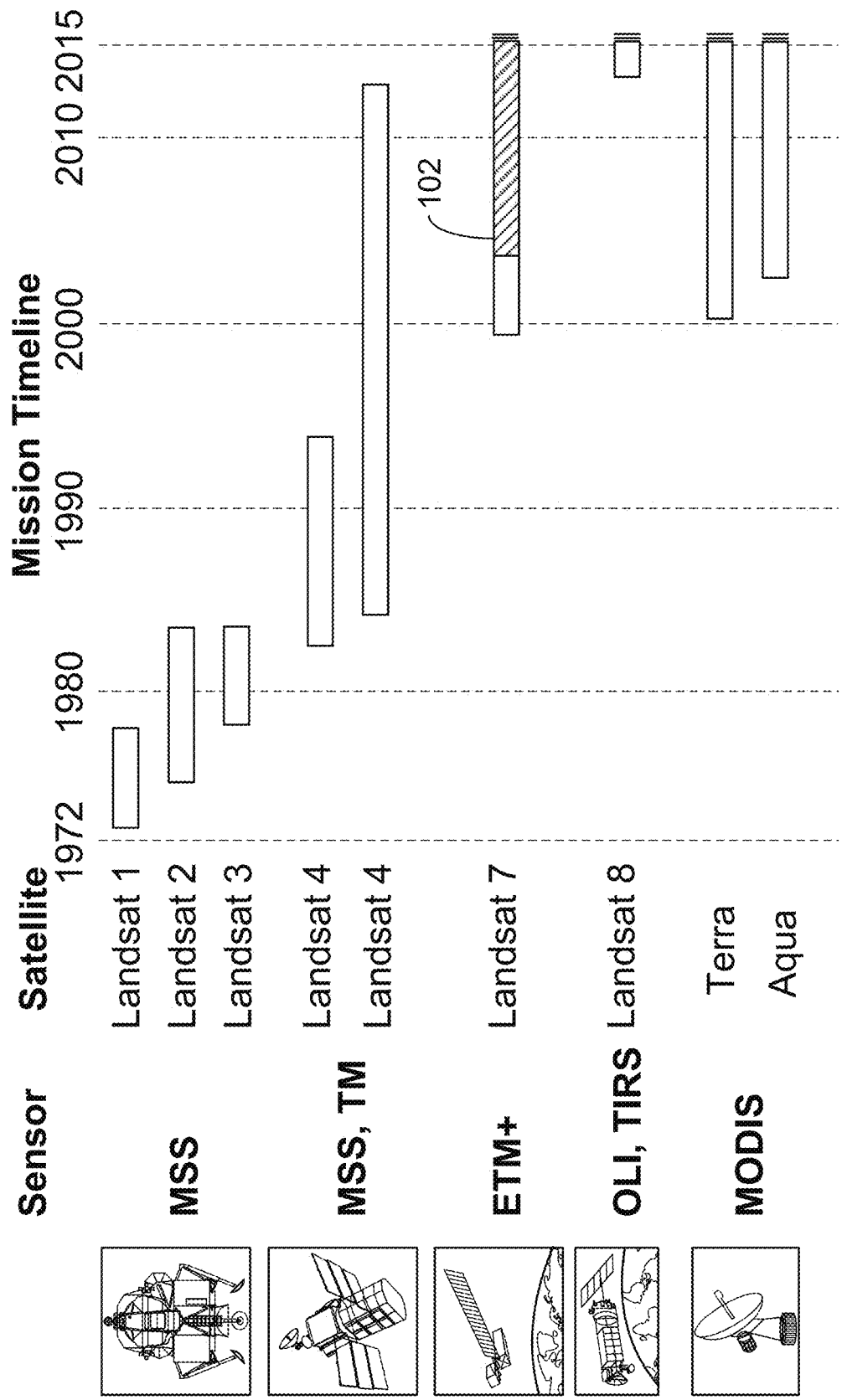
FIG. 1 shows NASA/USGS Landsat and MODIS satellites and sensors providing data that can be processed using embodiments of techniques described herein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques described herein can be used to process and analyze data such as multi-decadal observations of the Earth by constellations of satellites. For example, described herein are techniques for operating on over a petabyte ($8 \times 10^{15}$ bits) of compressed raw data from 2.8 quadrillion pixels (2.8 petapixels) acquired by sources such as the U.S. Landsat and MODIS Earth remote sensing programs over the past forty years. As described herein, such data can be converted from a raw form to a calibrated, georeferenced, and multi-resolution tiled format suitable for further additional processing/analysis, facilitating further space and time-domain analysis, including fusion of the Landsat and MODIS (and other) datasets, as applicable. The techniques described herein are efficient—allowing, in various embodiments, for the detection, in real time, of events that occur anywhere on the globe. The techniques described herein can be deployed using commodity cloud computing resources (using a "Cloud architecture"), but can also be deployed using other architectures, including traditional high-performance computing architectures, in various embodiments, as applicable.

I. Overview

A. Overview of Example Data Sources

The NASA/USGS Landsat program has routinely collected approximately monthly snapshots of the world's land surface since 1972. The Landsat program has evolved over its lifetime, with the eight Landsat satellites hosting a series of moderate-resolution multispectral imaging systems, from the Multispectral Scanner (MSS), to the Thematic Mapper (TM) and Enhanced Thematic Mapper (ETM+), and most recently the Operational Land Imager (OLI) and Thermal Infrared Sensor (TIRS). FIG. 1 shows NASA/USGS Landsat and MODIS satellites and sensors providing data that can be processed using embodiments of techniques described herein. Landsat 6 failed on launch, and a failure in the Landsat 7 scanline corrector (SLC) is indicated in region 102. Complementing the Landsat program is a range of lower-spatial resolution systems optimized for daily global imaging, of which the most widely used is the Moderate Resolution Imaging Spectroradiometer (MODIS) instrument on the NASA satellites EOS Terra (launched 1999) and Aqua (launched 2002). Landsat and MODIS are two examples of sources of observational data. Other sources can also be processed/analyzed in addition to/instead of Landsat/MODIS data in accordance with various embodiments. For example, observational data collected from other constellations (e.g., PlanetScope, RapidEye, Dove, Sentinel-1, and Sentinel-2), as well as higher-resolution imagery (e.g., collected via airplane/drones) can also be used in accordance with embodiments of techniques described herein.

Figure 2:
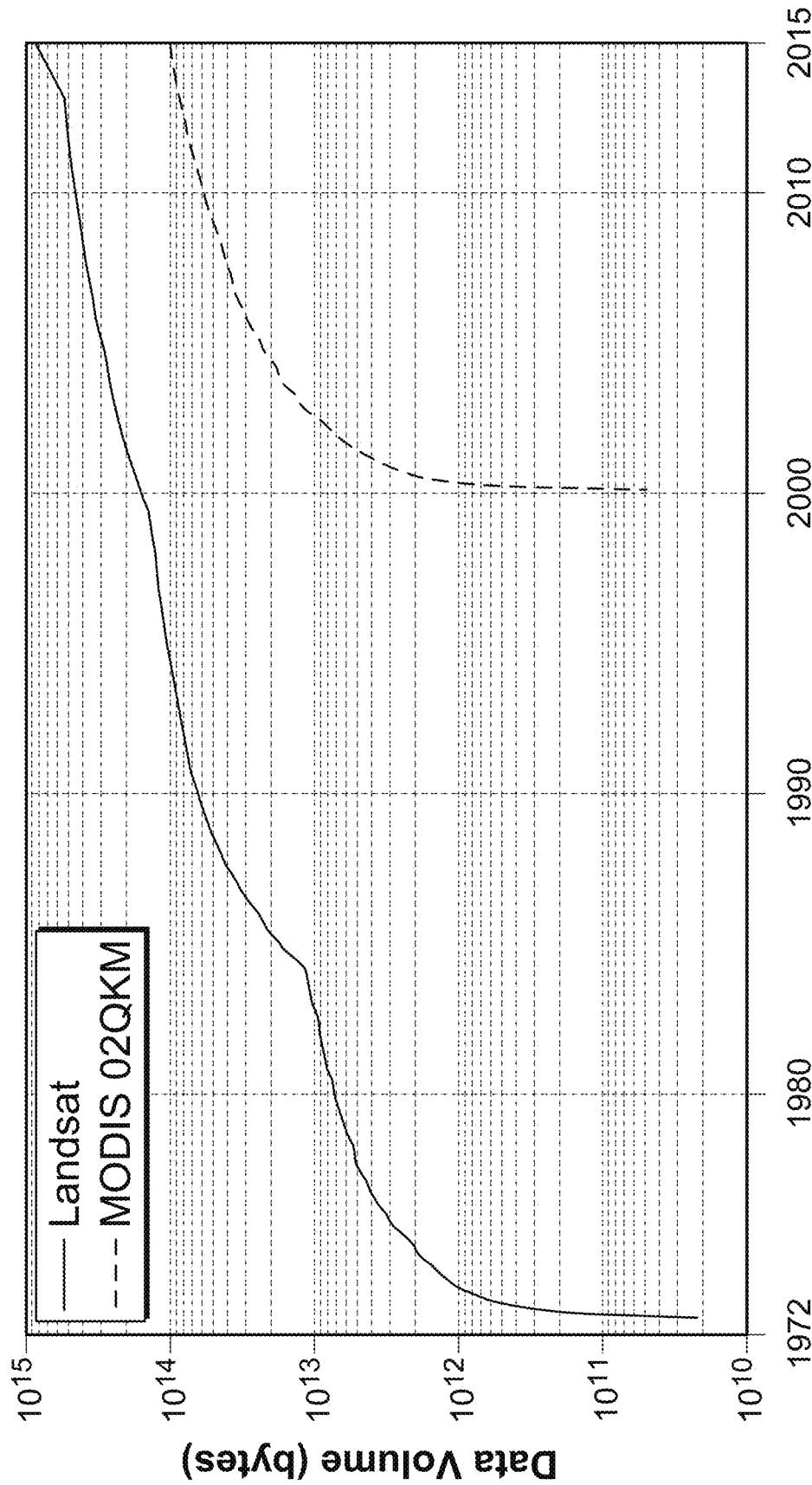
FIG. 2 shows the growth of Landsat and MODIS data volume over time.

FIG. 2 shows the growth of Landsat and MODIS data volume over time. To be most useful (e.g., to the community of researchers and policy makers), the Landsat and MODIS datasets need to be available globally on data systems that support high-bandwidth access, and the data itself needs to be stored in a data format that supports scientific analysis and is compatible with common visualization tools. At the time of the Landsat 1 launch on Jul. 23, 1972, the fastest computer in the world was the CDC 7600, capable of approximately 10 Mflops. Each Landsat 1 MSS scene consisted of 20 Mpixels (170 km×185 km image at 79 m ground sample distance in 4 spectral bands). The long-term storage options for these huge images involved magnetic tape and conversion to large-format photographic film. Hundreds of thousands of frames of photographic film remain in the USGS Eros data center, and efforts were taken in the early 1990s to convert the film data from Landsat 1 through 5 MSS and TM observations back to a digital format.

Google Earth Engine and the Amazon-NASA Earth Exchange (NEX) have placed historical (and are continuing to place newly-collected) Landsat and MODIS data into freely accessible storage in the cloud. Unfortunately, this data is often provided to the public in a format which requires more resources to store and process than necessary, and can prevent some forms of analysis entirely. As one example, bzip compressed tar files (often used to store such imagery) prevent random access to the data within them. Additionally, if answering a specific question requires access to the entire time series of data within a relatively small region (e.g., tens of kilometers), more than 1000 large image files spanning 185 km would need to be decompressed in their entirety, and then further spatially subdivided in order to fit within the memory of a processing node. However, if, as will be described in more detail below, the data is provided in a multi-resolution tiled format, only the data of interest needs to be accessed, reducing the cost and complexity by a large factor.

B. Overview of Example Infrastructure

1. Hardware

A variety of infrastructural approaches can be used to process data at a petabyte scale. One option is to purchase hardware, and install and maintain one's own computing center. One drawback of this approach is that, where the peak requirements are very large, but the typical workload is much smaller, resources will often go wasted through idleness. Further, this approach requires an appropriate knowledge of how to design and provision the hardware and software environment, possibly before having a complete understanding of the resources required to solve the data processing problem at hand. This solution also potentially comes with a multi-year commitment, since there is not much of a market for slightly used supercomputers.

A second option is to use shared supercomputing resources (e.g., provided by one's company, university, or national supercomputing facility). There are hundreds of supercomputing installations with more than 10,000 cores that could potentially provide for the on-node processing of the datasets described herein. Unfortunately, the associated storage and network resources are not so readily available. One major limitation to processing very large datasets using traditional supercomputing hardware is the difficulty of transferring the data to a parallel file system where it can be processed. At typical supercomputing center transfer rates, retrieving a petabyte from an archival storage location over the Internet could take a month or more.

Another issue is how to store the data while it is being collected. Parallel file systems commonly attached to supercomputers, such as Lustre and Panasas, have been designed for high performance, and their high cost limits their utility for long-term data storage. They are typically reserved for temporary, scratch storage. Lower cost archival storage such as magnetic tapes are available, but are not designed to support the use case of staging a petabyte at a time onto a parallel datastore. Yet another issue is how to perform further analysis and/or distribute results after a large data processing run has completed. Supercomputing centers typically do not provide a friendly environment for interactive data analysis and visualization, and additional infrastructure to provide web-enabled public or private access to large amounts of processed data can run afoul of traditional security models.

Instead of purchasing dedicated hardware to perform calculations, and/or performing them at an existing supercomputing center, an alternate approach is to leverage public cloud computing resources. Cloud computing represents a further step in the commoditization of computational resources, with associated benefits in agility, elasticity, and reliability. One aspect of cloud computing is that its pay-as-you-go model promotes transparency of resource costs, and thus allows free-market economic feedback loops which are largely suppressed in the traditional supercomputing environment. In the following Specification reference is made to Google Compute Engine, which is the Infrastructure as a Service (IaaS) component of Google Cloud Platform. Other platforms provided by other companies can also be used, and the techniques adapted as applicable.

Figure 3:
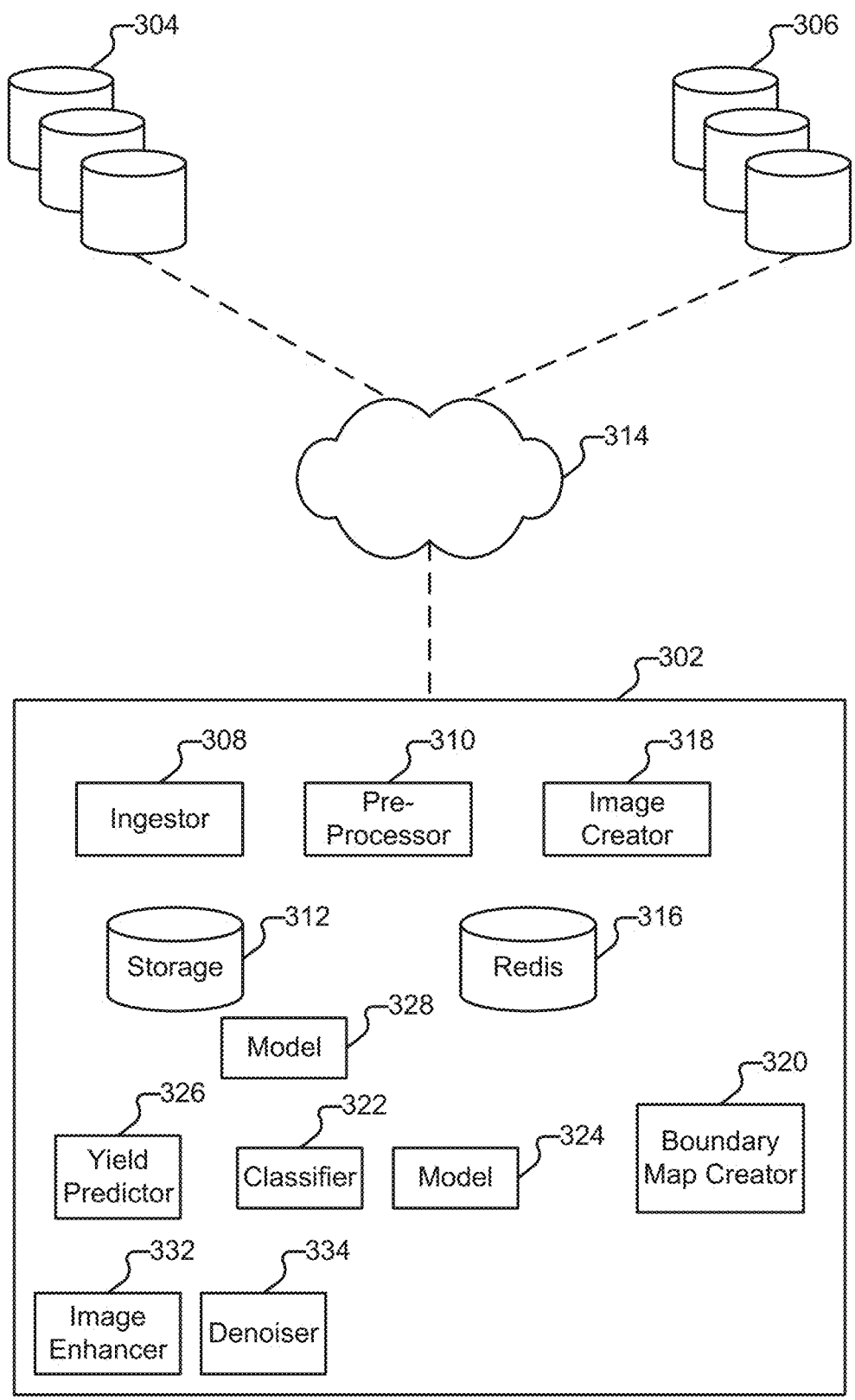
FIG. 3 depicts an example environment for processing and analyzing data in accordance with various techniques described herein.

FIG. 3 (described in more detail below) depicts an example environment for processing and analyzing data in accordance with various techniques described herein. As explained throughout the Specification, platform 302 (and/or various elements thereof) can be implemented using traditional server hardware, and can also be implemented using cloud computing resources. Various elements of the environment shown in FIG. 3 are depicted as individual units (e.g., ingestor 308 and pre-processor 310). It is to be understood that such elements need not be implemented on a single node, but can also be implemented across multiple nodes configured to cooperate to perform tasks (e.g., leveraging various industry standard cloud computing techniques, as well as various approaches described herein). Further, whenever platform 302 is described as performing a task, a single component, a subset of components, or all components of platform 302 may cooperate to perform the task. Similarly, whenever a component of platform 302 is described as performing a task, a subcomponent may perform the task and/or the component may perform the task in conjunction with other components. Various logical components and/or features of platform 302 may be omitted and the techniques described herein adapted accordingly. Similarly, additional logical components/features can be added to embodiments of platform 302 as applicable.

2. Software

The availability of useful, high-quality, and interoperable software packages continually increases (e.g., as the knowledge and effort of many software developers integrates over time in a code base counted in hundreds of millions of lines). The ecosystem that has developed around the collaborative development of software is a remarkable example of how the solution to a problem can be scaled across a large number of people. A corollary to the observation that there is vastly more high-quality open source software available now than there was in the past, is that much of the complexity of managing software has moved from writing one's own code to interfacing one's code with software written by others.

Python offers a good compromise between rapid code development and high performance. Accordingly, in various embodiments, various pipelines (and/or components thereof) are predominantly written in Python, leveraging Numpy for numerical array operations. Cython is used as a glue to interface to other software libraries, and the Geospatial Data Abstraction Library (GDAL) is also used. The code is revision controlled with Git, which is also used as the vehicle for code deployment to worker nodes. Other languages/packages/etc. can also be used in accordance with various embodiments of the techniques described herein. As one example, a Landsat metadata file parser from the Landsat ecosystem disturbance adaptive processing system (LEDAPS) can be written in the C programming language, comprising approximately 500 lines of code, supporting either the old or new Landsat metadata format, depending on the version used. A Python metadata file parser in accordance with embodiments of the techniques described herein requires less than 40 lines, and can support both old and new Landsat metadata formats with the addition of an 80 line translation dictionary. Landsat metadata information can be propagated into an XML container within JPEG 2000 output files, providing a self-documenting provenance for the data the processing pipeline produces.

Various approaches can be used to reduce the cost of resources involved in the various kinds of processing and analysis described herein. For example, memory usage can be reduced to allow for execution on the smallest memory (and least expensive per core) Google Compute Engine nodes, which contain somewhat less than 2 GBytes of memory per hardware core, and use no conventional disk storage on the compute nodes at all (beyond the minimum 10 GB partition required to boot the system), working entirely in memory or from the Linux tmpfs RAM disk. As another example, intermediate writes to the local file system can be reduced, instead going from memory buffer to memory buffer between application libraries. As a specific example, rather than copying a bzipped Landsat image tar file from Google Cloud Storage to local storage and then decompressing and reading the file into memory, the data can be streamed directly into memory using a Python tarfile module reading from a gsutil cat pipe. The data in memory can then be passed directly to GDAL via the gdal.FileFromMemBuffer interface.

3. Initial Dataset—Landsat/MODIS

One example input dataset for use in conjunction with techniques described herein comprises $915.52 \times 10^{12}$ bytes of Landsat data in 5,693,003 bzip compressed GeoTIFF files (available at gs://earthengine-public/), and $101.83 \times 10^{12}$ bytes of MODIS Level 1B (2QKM) band 1 (red) and 2 (near infrared) data in 613,320 sz compressed Hierarchical Data Format (HDF4) files (e.g., collected from the NASA ftp site (1204) and stored in Google Cloud Storage (1212)), for a total of $1017.35 \times 10^{12}$ bytes and 6,306,323 files. The oldest image was collected Jul. 25, 1972, and (in this example data set) the recent image was collected on 2015-04-13 at 06:10:04Z. All of the input data is publicly available.

In various embodiments, the processing stages for each Landsat image in the dataset include: retrieving the image from Google Cloud Storage, uncompressing the image, parsing the metadata, identifying the bounding rectangle that contains valid data, cleaning the edges of the image, converting the raw pixel information into meaningful units (e.g., calibrated top of atmosphere reflectance using the appropriate constants for each satellite and accounting for solar distance and zenith angle), cutting each image into appropriately sized pieces using a consistent equal-area worldwide tiling of the sphere, performing any necessary coordinate transformations, compressing the data into a JPEG 2000 format (or another appropriate format), and storing the result back into Cloud Storage.

4. JPEG 2000 Image Coding

Aspects of JPEG 2000 include:

Rate-distortion performance that is somewhat superior to that of traditional JPEG at high bit-rates (i.e., low compression ratios) and substantially superior at low bit-rates (i.e., high compression ratios).

Much greater flexibility in terms of the types of images that can be coded, including single and multi-band images, and bit-depths between 1 and 32 bits per band (e.g., as compared to traditional JPEG).

Support for both lossless and lossy compression.

A scalable codestream that can be truncated to obtain a lower bitrate representation of the image of similar quality to that which would have been obtained if the image had been coded to target that reduced bit-rate. The codestream can be ordered for various forms of scalability, giving priority, for example, to either resolution (a high-fidelity low-resolution representation is obtained first) or fidelity (a low-fidelity full-resolution representation is obtained first).

The above features are all provided by the baseline, defined in "Part 1" of the standard, which also defines a standard file format for the codestream, referred to as JP2. Further flexibility, such as support for user-defined wavelet transforms and inter-band transforms, is provided by "Part 2" extensions to the standard, which also defines the more flexible JPX file format.

5. Generations of Landsat Imagery: MSS, TM, ETM+, AND OLI

Landsat images comprise 6 or 7 spectral channels, a higher-resolution panchromatic channel (only available in Landsat 7 ETM+ and Landsat 8 OLI), and one or more mask images. Example ways to combine groups of them are in the following set of JPEG 2000 encoded images in JP2 file format:

a three-band image comprising the spectral channels with the closest correspondence to visible red, green, and blue bands (lossy coding), a three-band image comprising the near infrared (NIR) and short wave infrared (SWIR) bands (lossy coding), a single thermal infrared (TIR) band (lossy coding), a single high-resolution panchromatic (PAN) band for ETM+ and OLI (lossy coding), a single band 1-bit image representing the data validity mask (lossless coding), and a single band 8-bit image representing the most important bit-planes in the Landsat 8 Quality Assessment Band (lossless coding).

The above layout does not fully exploit all of the flexibility of the JPEG 2000 standard, which would allow all bands to be included within a single JPX file, or all multispectral bands to be included as multiple components within the same JP2 file. Example reasons for this choice are (i) the optimum layout is strongly influenced by the optimal chunk size for access while minimizing costs for cloud file operations, and (ii) a JP2 file format was preferred over the more flexible JPX format due to the much wider support by libraries for decoding JPEG 2000 format images. In other embodiments, other layouts can also be used.

JPEG 2000 performance in reversible coding of bitplanes is inferior to that of a coding technique, such as JPEG-LS, specifically designed for this type of content. However, to avoid the complexity of using multiple coding standards, in various embodiments, JPEG 2000 is also used for bands of this type. A substantial performance improvement can be obtained, at the expense of losing resolution scalability, by effectively disabling the wavelet transform by setting the number of transform level to zero.

6. JPEG 2000 Parameters

A variety of libraries can be used for manipulating image data. For example, the commercial Kakadu library can be used, as can an open-source option such as OpenJPEG. Using the Kakadu library offers an advantage in encoding speed. One application of the imagery described herein is as an input to a classifier. In various embodiments, the desired level of compression is specified to the Kakadu encoder using the rate-allocation slope rather than a target bitrate (which is less robust to changes with image content in delivering a consistent reconstruction distortion). As applicable, suitable compression ratios can be selected, e.g., by performing a classification experiment on processed JP2 imagery over a wide range of compression ratios. As one example, suppose for each ratio, thirteen 2048×2048 frames for the same thirteen 2048×2048 frames for the same spatial location (e.g., a region in Kansas) are selected from different times in 2011, and 1800 rows of pixels are used in each of the six spectral bands as training data, with the remaining 248 rows of pixels as testing data. The ground truth in this example is whether each pixel location is identified by the United States Department of Agriculture (USDA) Crop-Scape Data Layer (CDL) as containing wheat. The 78-dimensional training inputs for each of the 3,686,400 training pixels can be input into an artificial neural network comprising three fully-connected layers, using the open source Caffe library. In this example, suppose the classification performance varies from 87.52% for uncompressed data to 87.13% for the most compressed imagery. A compression ratio can be selected such that it is sufficiently high to give a substantial reduction in storage costs, but for which image structure (e.g., edges) is just perceptible in the difference image between original and decoded images.

7. Visualization in the Browser

Being able to quickly view and interrogate a given image or montage of images can be helpful for verification and validation of a processing pipeline. Unfortunately, even though the use of JPEG 2000 enables superior performance in terms of compression ratios and multi-resolution representation of imagery, modem web browsers such as Google Chrome, Mozilla Firefox, and Apple Safari may not natively support the format. Accordingly, output JP2 files that could otherwise be viewable directly in the Google Developers' Console Storage Browser must first be downloaded to a local workstation and viewed using an image viewer capable of parsing JP2 files. The situation is aggravated by the files having up to 10 different components, requiring the usage of layout-specific visualization scripts. One solution is to use a Google Chrome Javascript-based extension to view images directly from within the web browser. While an entire JP2-capable parser can be purely in Javascript, in various embodiments, the Emscripten LLVM compiler toolchain is used to compile the C99 OpenJPEG 2.1.0 library to LLVM bytecode and translate the result into optimized Javascript. The base library can be augmented by implementing additional C library functions that are used to specify additional decoding parameters and yield direct access to image component data without first writing to a temporary PNG or RAW image. An HTML5 Canvas object can then be filled with the data array, providing scaling and gamma correction functionality through a simple web GUI. This moves the image inspection procedure directly to wherever the data resides (in terms of its location on a website). Progressive decoding of the bytestream can be performed as it arrives from the server, allowing for a seamless integration into traditional websites.

8. Example System and Environment—Google Compute Engine

As explained above, in various embodiments, the data processing and analysis techniques described herein are implemented using commercially available public cloud resources with an on-demand cost model. These include Google Cloud Platform resources, such as Compute Engine and Cloud Storage, but other platform resources by other vendors can also be used, as applicable (e.g., as offered by Amazon). Cloud vendors such as Google divide physical hardware into virtual resources to divide workloads into isolated environments, which allows customers to use compute capacity with an on-demand cost model. Once the task is complete, the customer can deprovision the system, ending their costs. The virtual infrastructure and its underlying physical resources can then be returned to the available resource pool for the next customer to use. Construction and management of data centers, purchasing of hardware, utilities, and staffing are all removed for the task of building a large distributed system. This allows for focus on the actual problem being solved. Google has multiple geographic availability zones, any/all of which are used in various computations described herein. Geographical diversity creates design options for robust failover and scaling.

Google Compute Engine allows for development teams to specify virtual hardware such as CPU, RAM, SSDs, network, security, etc., along with software such as an operating system, custom software, and dependencies. This flexibility allows the costs and benefits of different hardware to be factored into the software engineering decision process, as a tradeoff against the cost of optimizing the code to work with lower priced virtual hardware. In various embodiments, worker nodes comprise four virtual machine CPU (vCPU) models, based on what is available in the four geographic zones. Examples are as follows:

| Zone | Virtual Machine | CPU Hardware |
| --- | --- | --- |
| us-central1-a | highcpu-16 vCPU | Intel Sandy Bridge 2.6 GHz Xeon E5 |
| us-central1-b | highcpu-16 vCPU | Intel Haswell 2.3 GHZ E5 v3 |
| us-central1-c | highcpu-32 vCPU | Intel Haswell 2.3 GHZ E5 v3 |
| us-central1-f | highcpu-32 vCPU | Intel Ivy Bridge 2.5 GHz E5 v2 |

Other virtual hardware specifications such as RAM, SSD, and network are identical across zones. Software is identical with the exception of worker processes corresponding to the vCPUs available. Zone variations (primarily 16 and 32 vCPU instances) necessitate multiple VM templates. Datacenter regions also allow the specification of templates inside a group, such as the specification of the number of VMs to be created, and auto-scaling of the group based on factors such as network traffic or CPU load.

9. Example Software Deployment and Configuration

In various embodiments, software deployment and configuration is accomplished with two techniques: bash scripts and Linux containers (e.g., Docker). VM templates allow for a custom script to be specified and executed post startup. With the bash script technique, the code is pulled from a private Github repository along with dependencies, and configuration files deploy the code onto the virtual machines and start the worker processes. In the second approach, a pre-built Docker container that contains source code, dependencies, and configurations built inside the container is deployed onto the VM and the container is executed in daemon mode. Docker containers provide an API around several Linux kernel features (libvirt, LXC, systemd, and libcontainer) to create an isolation mechanism from the host OS while utilizing the existing Linux kernel. Traditional virtual machines fully isolate operating systems on top of a hypervisor. Docker containers also use a copy-on-write layered file system approach where identical layers need not be duplicated, creating considerably smaller storage requirements than traditional virtual machines. Because the container is leveraging the existing kernel's CPU, memory, and network, additional performance overhead can be minimal. Containers can be executed on both virtual machines and bare metal hardware, which provides an efficient mechanism to move configured, functional, versioned, compute capabilities to where the data resides, which often could be a different cloud vendor, private datacenter, or collaborator's laptop. Just as source code can be branched and versioned inside modern source code repositories such as Git, pre-built containers can be versioned and branched in container repositories at a fraction of the size of versioning virtual machines, since only the changes in the layered file system are differentiated. In an example deployment, containers are built with all required dependencies, configurations, and source code from GitHub, and then stored in a private Google Container Registry located inside a Google Cloud Storage bucket. This allows for the latest container to be pulled down and executed in daemon mode on startup in a consistent manner across the cluster. Containers also provide a reproducible archival mechanism for others to later execute code to attempt to duplicate results with minimal effort.

Various observational data (e.g., the Landsat dataset) is stored inside Google Cloud Storage as a publicly available dataset, persistent and accessible from all four us-central zones. As an alternative to using a large NFS for all worker nodes to write results, Google Cloud Storage buckets can be used as a persistent, common datastore across all nodes. As a further benefit, this data is also available in other geographical zones, enhancing availability and tolerance to hardware failures.

To manage the creation of asynchronous tasks for processing millions of scenes across the worker nodes, an asynchronous task queue approach (e.g., the Python Celery library) is used in some embodiments. Celery's API allows multiple asynchronous job queues to be created, the list of tasks and their parameters to be managed, and for their insertion into a pluggable backend key-value pair store (e.g., Redis 316). As worker nodes are provisioned and start, they connect to the Celery broker to receive processing tasks in the queue. To optimize performance, Redis 316 can be configured to keep the queue in memory.

10. Scalability and Performance—Example Execution

In one example execution (e.g., of the tiling process described in more detail below), processing of a petabyte of satellite imagery begins at 02:15 UTC, when 250 nodes in zone us-central1-f are started, processing Landsat TM images. Additional compute instances are then created across zones a, b, c, and f, accounting for approximately 15,000 physical compute cores. At 11:34 UTC, nodes running the MODIS processing pipeline are started, and an equivalent number of Landsat nodes are shut down. At 15:45 UTC, a list of tasks which have not completed and have not been automatically re-tried by the task manager is resubmitted. By 16:15 UTC, the bulk of the Landsat tasks are complete, and the remaining Landsat MSS tasks are added. At 17:11 UTC, the MODIS processing completes, and at 17:41 UTC on April 16 all tasks have completed. During the 15.5 hour process, the petabyte of input data is read from the distributed Google Cloud Storage system at an average rate of 18.1 Gbytes/sec. After decompression, this represents 55.2 Gbytes/sec into processor memory. The peak input network bandwidth exceeds 25 Gbytes/sec (200 gigabits/sec). The output bandwidth back to Google Cloud Storage averages about 4.5 Gbytes/sec, written to over 185 million individual files.

Figure 4A:
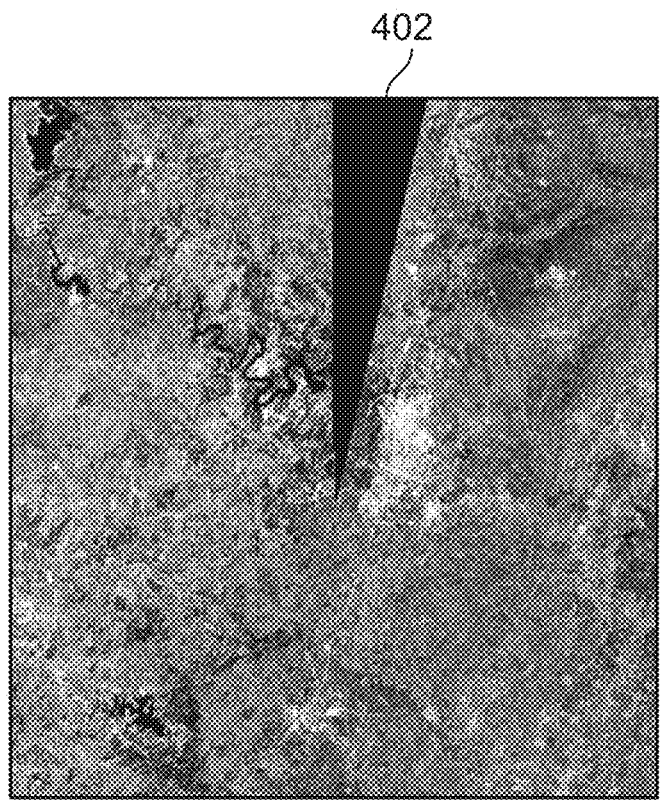
FIGS. 4A-4C illustrate processed tiles.
Figure 4B:
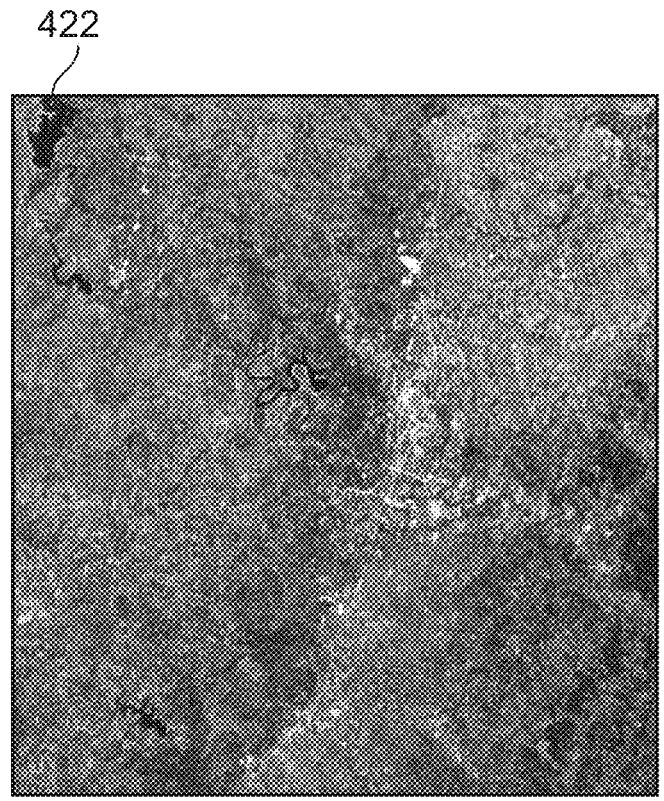
Figure 4C:
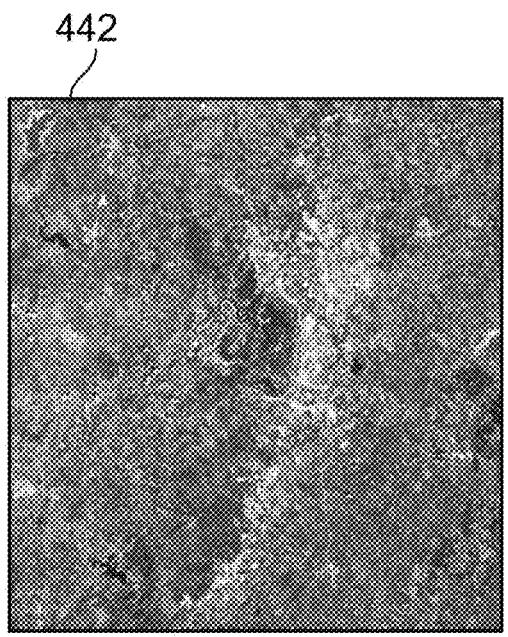

FIGS. 4A-4C show examples of processed tiles of the Austin, Texas area. FIG. 4A depicts March 1973 (Landsat 1 MSS), FIG. 4B depicts September 1994 (Landsat 5 TM, 10B), and FIG. 4C depicts March 2015 (Landsat 8 OLI, 10C), respectively. The tiles are 2048×2048 pixels, and are calibrated and georeferenced. The Landsat 1 image (FIG. 4A) is a false-color image (RGB display channels mapped to near IR, visible red, visible green), due to the MSS sensor lacking a visible blue band. All three panels are composites of four processed tiles, where each panel is formed from tiles collected over several days, showing the consistency of the processing across Landsat scenes and between sensors. Region 402 in FIG. 4A is a region where no data was available in that Landsat 1 MSS observation. Changes in the extent of urbanization surrounding Austin are clearly visible from panel to panel, as is a significant change in Buchanan Lake between FIGS. 4B (region 422) and 4C (region 442).

II. Ingestion and Pre-Processing

Figure 5:
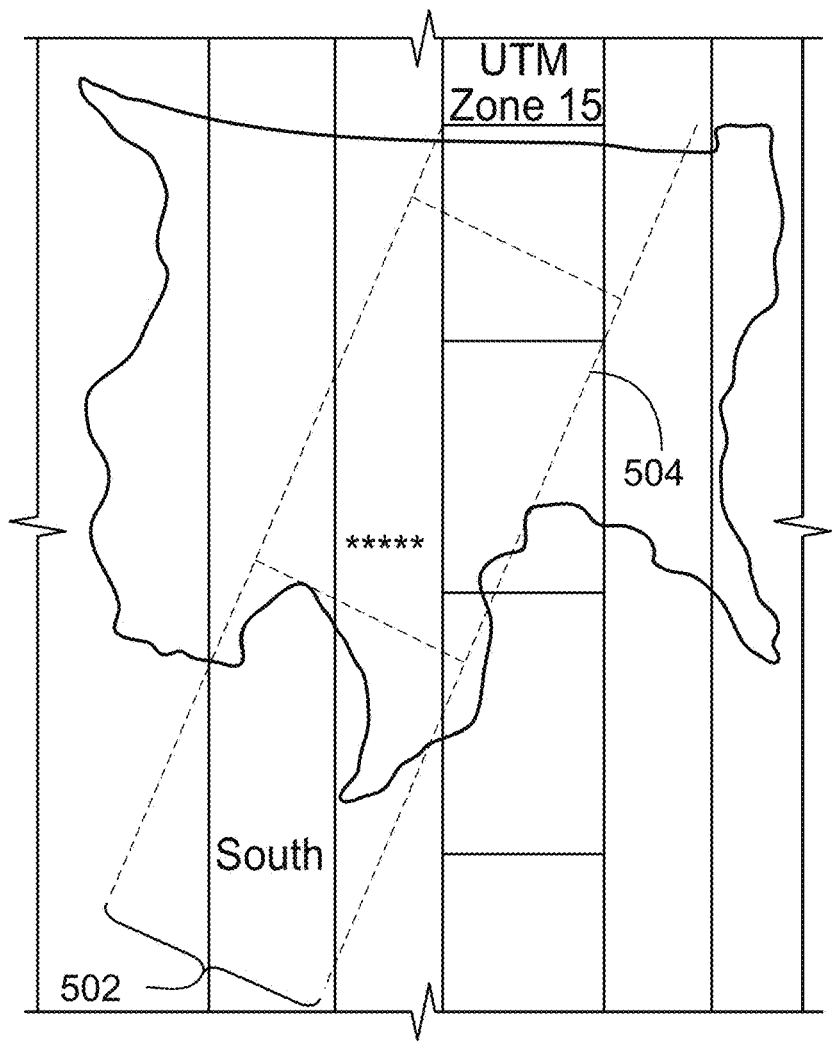
FIG. 5 depicts an illustration of the United States, as observed from a satellite.

FIG. 5 depicts an illustration of the United States, as observed from a satellite. In particular, FIG. 5 illustrates a granule (504) of data—five minutes of orbit along a swath (502). The path of the spacecraft is down through the center of the swath.

A. Map Projections

Two common map projections which represent the spherical surface of the Earth as a regular grid are the Web Mercator projection and the Universal Transverse Mercator (UTM) projection. A single image of the Earth with pixel scales less than about 10 km can be too large to process efficiently, so the map is "tiled," or split into pieces which can be processed independently.

The Web Mercator projection can readily be tiled because the image dimensions are precisely a power of two in both coordinates. The level of the decomposition divides the world into $4^n$ level pieces. An appropriate level can be chosen to satisfy various constraints, mainly, the number of time slices of a given tile that can fit into processor memory at one time. Web Mercator is suitable for simple map interfaces, but can be problematic for applications beyond simple analysis because the pixel areas are not equal: as a pixel becomes farther from the equator, it represents a smaller and smaller area on the surface of the Earth.

The UTM projection is not as simple. UTM first splits the world into 60 zones, and within each zone pixels are split into nearly equal areas referenced by their "x" or "Easting" coordinate and their "y" or "Northing" coordinate. All UTM distances are measured in meters. The number of pixels which span a zone in the East-West direction depends on the distance from the equator.

For the MODIS sensor carried on the Aqua and Terra satellites, sensor values come as a logically rectangular grid of latitude/longitude co-ordinates (a swath), but projected on to the surface the sample points are not on a regular grid (points become farther apart towards the edges of the swath). For other sensors, the image values are delivered in UTM coordinates. A shared, common coordinate reference system can be used to further the most efficient and accurate processing of multiple datasets. Most of the input data is delivered in UTM coordinates, and operations to interpolate pixels to a different map projection or resolution can affect the data quality and require additional computational resources. Accordingly, in various embodiments, UTM is used as a common map projection. The tiling techniques described herein can also be adapted for use with other projections, as applicable.

B. UTM Tiling Parameters

UTM tiling (e.g., as used by embodiments of platform 302) can be described by a number of parameters. It is applied to each of the 60 UTM zones with identical parameters, with the zone designated by z. A similar construction can be applied to the polar UPS projection. The parameters are as follows:

z: the UTM zone,
$x_0 y_0$: the origin of the tiling system,
$x_n y_n$: the number of pixels in the tile,
$x_b y_b$: the border size of the tile,
r: the spatial resolution of the pixel.

Each pixel can be located by its spatial global index offset from the origin of the tiling system $g_i g_j$, or its index i, j, within a specific tile $t_i t_j$ (also referred to as column and row).

An example size for tile images (e.g., given current computer architectures and memory storage capacities) $x_n y_n$ is approximately 4096×4096 pixels. Since a UTM zone is 6 degrees across, that represents 668 km at the equator. For pixel scales $x_r$ larger than approximately 200 meters, a single tile will cover the east-west extent of a UTM zone. For smaller pixel scales, multiple tiles are required. For example, for r=10 m resolution (e.g., Sentinel-2), seventeen 4096 pixel wide tiles would be required $$\left( \frac{668 \text{ km} * \frac{1000 \text{ m}}{10 \text{ m}}}{4096} \right).$$

In the y-dimension, the distance from the equator to the pole is near 10000 km, so the number of 4096×4096 tiles to span that distance is approximately 10 for a 250 m pixel tile, and 244 for a 10 m tile. The southern hemisphere can be handled with a similar number of tiles using a negative index referenced from the equator, or referenced by their northing coordinate from the south pole using the southern "S" designator for the zone.

There are several potential choices for the origin of the tiling. The first uses the native UTM 0,0 as the origin, which is at the intersection of the false easting of the zone (500 km) and the equator. One drawback of this choice is that the tiles are not symmetric within a zone. Another choice is to use the intersection of the central meridian of the zone with the equator, which is located at UTM $x_0 y_0$=500000,0.

The border size represents overlap with adjacent tiles, which allows the reduction of "edge" effects for processing which requires neighboring pixels. One choice is to use some fraction of the tile size to reduce duplicate storage. For a 4096×4096 tile, an example choice is some power of 2 between 32 and 256.

There are also various choices for the optimal pixel resolution "r." One approach is to accommodate as many sensors as possible using powers of two of a fundamental resolution. Examples of such tilings are as follows:

r=5 m accommodates RapidEye and PlanetScope (native 5 m), and Sentinel-2 (native 10 m/20 m).

r=15 m accommodates pan-sharpened Landsat 7/8 (15 m), Landsat 5/7/8 (native 30 m), and MODIS (240 m).

For high-resolution sensors (e.g., NAIP aerial photography at 1 m resolution), r=1 m can be used as the fundamental tiling, with small interpolation adjustments as needed to accommodate the existing sensors (e.g., with RapidEye and PlanetScope adjusted to 4 m (level 2), Sentinel-2 to 8 m (level 3), pan-sharpened Landsat at 16 m (level 4), Landsat at 32 m (level 5), and MODIS at 256 m (level 8)).

C. Example Conversion to Pixel/Tile Index

The following example shows an assignment of a specific WGS84 latitude/longitude from the MODIS sensor to a pixel and tile. Longitude −106.3017 and Latitude 35.8785 is UTM Zone 13N Easting 382497.99 Northing 3971254.80. For a pixel resolution of 1 meter, this would fall in the pixel whose upper left corner is at 382497, 3971255 which is identical to the zone pixel $g_i,g_j$ address. For a pixel resolution of 240 meters, the sample would be in the pixel with upper left location 382320, 3971280 and $g_i,g_j$ address 1593, 16547. The global pixel indices can be calculated via $$g_i = r * \left\lfloor \frac{Easting}{r} \right\rfloor$$

and $$g_j = r * \left\lfloor \frac{Northing}{r} + 1 \right\rfloor.$$

The corresponding tile indices for r=1, $x_0$=0, $y_0$=0, $x_n$=4096, $y_n$=4096 are $t_i$=93, $t_j$=970. Using a central meridian origin ($x_0$=500000), $t_i$=−29, $t_j$=970. For the MODIS 240 m pixel and $x_n$=4096, $y_n$=4096, $t_i$=0, $t_j$=5. The tile indices can be calculated from the pixel indices via $$t_1 = \left\lfloor \frac{g_i}{x_n} \right\rfloor$$

and $$t_j = \left\lfloor \frac{g_j}{y_n} + 1 \right\rfloor.$$

Tile indices are mapped to a string which is part of the file name (along with date of acquisition and sensor) stored in a long-term storage 312 (e.g., Google Cloud Storage or Amazon S3). An example for MODIS would be "2006-06-09-1800_12N_12_MO_09qkm.jp2," which was collected on Jun. 9, 2006 at 18:00 UTC in Zone 12N with $t_j$=12 by the Terra sensor. There is no $t_i$ because a tile covers the entire E-W span of the zone. An example for Landsat 7 would be "2015-01-18-L7-034033_13N_007_069_321.jp2" which was collected on Jan. 18, 2015 from zone 13N with $t_i$=7 and $t_j$=69.

D. Ingestion Process

FIG. 3 depicts an example environment for processing and analyzing data in accordance with various techniques described herein. Platform 302 includes an ingestor module 308 (comprising one or more Google Compute Engine instances and a Celery master). Ingestor module 308 connects (e.g., via one or more networks depicted in FIG. 3 as a single network cloud 314) to various sources of observational data. Two examples shown in FIG. 3 are NASA FTP site 304 and a proprietary repository 306 (e.g., storing aerial photography). Ingestor module 308 retrieves data (e.g., using the FTP protocol) from the repositories and writes them to storage 312 (e.g., creating a local mirror of the retrieved data).

The following is an example of how ingestor 308 obtains data, and in this particular example, the ingestion of MODIS data. As explained throughout the Specification, other sources of data (in other formats) can also be processed using embodiments of the techniques described herein.

In various embodiments, ingestor module 308 executes a shell script that manages ingestion. The shell script executes (e.g., as a cronjob running every four hours) and launches an LFTP process to obtain a directory listing of FTP site 304. Ingestor module 308 identifies files that are new since the last time the script ran, by parsing the directory listing into a list of potential files to retrieve, and then checking against a Redis database 316 to see whether the files were previously retrieved. Previously retrieved files are ignored and threads are started to download any new items. In an example operation, 50 to 100 new files are identified in NASA's MODIS collection each time the ingestor script executes (depending, e.g., on when NASA's MODIS processing occurs). Each raw MODIS Hierarchical Data Format (HDF) file obtained from FTP site 304 is approximately 140 MB. Multiple files can be downloaded in parallel (e.g., using threads), and locks can be used to prevent multiple threads from trying to download the same file simultaneously. In the event the download fails (e.g., due to a network connectivity problem, or if the file length is not correct when it is finished), the script can restart the download as needed. Newly seen files are copied to storage 312 and entries are made in Redis database 316 (e.g., using python) indicating the new files as having been downloaded successfully.

The raw data (e.g., MODIS data obtained from NASA) is stored in "granules." In various embodiments, every pixel in a granule is stored. In other embodiments, a cloud mask (included by NASA with the granule) is used to shrink the number of pixels stored. The following is an example file name for a granule stored in storage 312, and mirrors NASA's nomenclature:

gs://modis/allData/6/MOD02QKM/2015/200/ MOD02QKM.A2015200.0040.006. 2015200134321.hdf The components of the path name are:

gs://: Google Storage designator modis: storage bucket allData: (inherited from NASA storage path)

6: collection number (equivalent to a NASA version number)

MOD02QKM: data type (MODIS 02 quarter kilometer (250 m) bands)

2015: year

200: Julian day of year

MOD02QKM.A2015200.0040.006.2015200134321.hdf: a file name assigned by NASA using NASA's naming scheme In an example embodiment, platform 302 handles twelve types of data granules, each produced every five minutes over daylight portions of the globe. There are approximately 1,728 new files per day, 630,000 files per year, and 10 million files total.

An example of pseudocode for ingesting data (e.g., from site 304 by ingestor module 308) is shown in FIG. 6. An example of pseudocode of preprocessing data (e.g., by preprocessor 310 of the data ingested by ingestor module 308) is shown in FIG. 7.

E. Pre-Processing

Pre-processor module 310 (also comprising one or more Google Compute Engine instances and a Celery master) takes all of the newly retrieved files (e.g., the 50 to 100 MODIS files obtained by ingestor 308 every four hours) and pre-processes them. In various embodiments, pre-processing executes as a cron job (e.g., every four hours), and executes as a first portion of the process the ingestion processing described above. Pre-processing can also be triggered by an event, such as the appearance in a particular directory of new data.

A given granule can be split into smaller tiles (e.g., approximately twenty tiles) by pre-processor module 310. The smaller tiles are easier to perform various operations on by platform 302. Pre-processor module 310 can also process large repositories of historical data (e.g., the last n years of data stored with NASA FTP site 304) by performing a parallel run using an appropriate number of nodes (e.g., 200 multi-processor nodes). The Celery system distributes the workload over the (e.g., 200) nodes, with each node executing the same script as is executed for the newly-seen files (but in parallel).

The following is an example file name for a .xz file stored in storage 312:

gs://modis-xz/utm_v7q_09/15N/03/2015-06-20-1935-MY_15N_03.bin .xz

The components of the path name are:

gs://: Google Storage designator modis-xz: storage bucket utm_v7q_09: type and version 15N: zone 03: tile y index 2015-06-20-1935-MY_15N_03.bin .xz: file name An .xz file comprises an array of N samples. The samples are x and y coordinates as 16-bit unsigned integers quantized to 30 UTM pixel indices, followed by b bands of pixel location (DN) values. The array of N samples is compressed using the Lempel-Ziv-Markov chain compression technique. As previously mentioned, a given granule may have associated with it a cloud mask provided by the original data source (e.g., a NASA provided cloud mask). In such a scenario, the cloud mask can be used to reduce the number of points included in the .xz file, with the file structure remaining the same.

The .xz tiling process can be bypassed, as applicable, and JPEG2000 compressed image tiles can be created directly from the raw MODIS data using an appropriate interpolation method. The following is an example file name for a .jp2 file stored in storage 312:

gs://descartes-modis/2015-07-29-1620_16N_09_MO_09qkm.jp2

The components of the path name are:

gs://: Google Storage designator descartes-modis: storage bucket 2015-07-29-1620_16N_09_MO_09qkm.jp2: file name, date, time, zone, row, sensor, data type, and file type.

In various embodiments, additional (optional) preprocessing is performed (e.g., prior to the .xy tile being written). One example of such additional processing is scaling DN values to top of atmosphere reflectance. The physical meaning of the numbers associated with each pixel location (DN) varies by sensor. Various operations (e.g., performing cloud removal, described in more detail below) make use of values which represent reflectance as observed at the top of the atmosphere. Some sensors, such as Sentinel-2, deliver data in this format, and do not require scaling. Sensors such as MODIS and Landsat, however, deliver data in radiance units, which require various scaling to obtain reflectance. The metadata associated with the image data contains some of the appropriate constants, while others (such as the distance from the sun to the earth) can be tabulated from other sources as needed. The conversion formula to reflectance in the range of 0.0 to 1.0 is:

$$\text{gain} = \frac{(LMAX - LMIN)}{(QCALMAX - QCALMIN)}$$

$$\text{bias} = LMIN - \text{gain} * QCALMIN$$

$$\text{toar}_f = \frac{\pi * \text{earth\_sun\_dist\_in\_au}^2}{\text{sol\_irrad} * \cos(\text{solar\_zenith\_angle})}$$

$$scaledDN = DN * \text{toar}_f * \text{gain} + \text{toar}_f * \text{bias}.$$

To store the reflectance in a 16-bit integer, it is scaled by an additional factor of 10000. As another example of optional preprocessing, pixels for which no data is present (e.g., due to scanline errors) can have their values set to zero, which can be used in later applications, as described in more detail below.

III. Creating Images with Reduced Atmospheric Obstructions

Figure 8A:
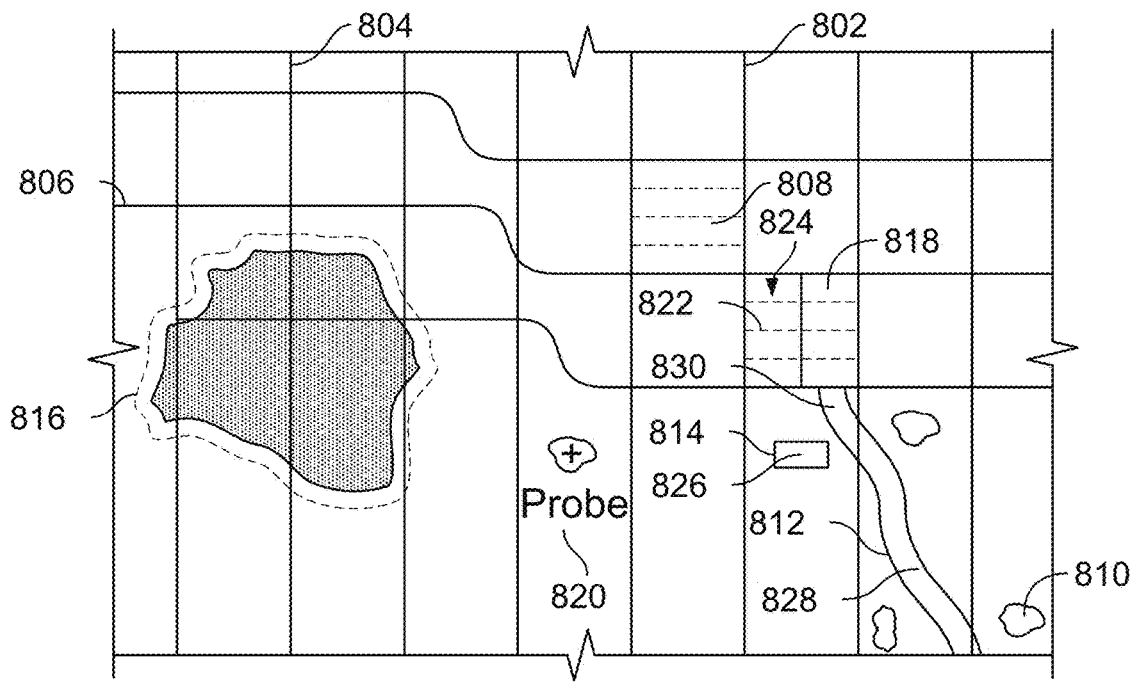
FIG. 8A illustrates an example portion of the Earth as viewed from above (e.g., by a satellite).

FIG. 8A illustrates an example of a portion of the Earth as viewed from above (e.g., by a satellite). Suppose FIG. 8A illustrates a portion of Iowa. Lines such as 802, 804, and 806 are gravel roads—generally spaced one mile apart. Other elements visible (e.g., to a satellite) are fields, such as field 808, tree 810, river 812, and house 814. Region 816 of FIG. 8A is obscured by clouds. In some cases, an obstruction (such as a cloud) may completely obscure the ground underneath it. In such a scenario, the optical depth can be represented as a "0," indicating that an obstruction can't be seen through. Correspondingly, a cloudless (i.e., completely visible) portion of ground can be considered as having an optical depth of "1." For some datasets (e.g., Landsat), a cloud mask accompanies the granule (e.g., as obtained from site 304), indicating for a given pixel (in a binary manner) whether the pixel represents a cloud or not.

Figure 8B:
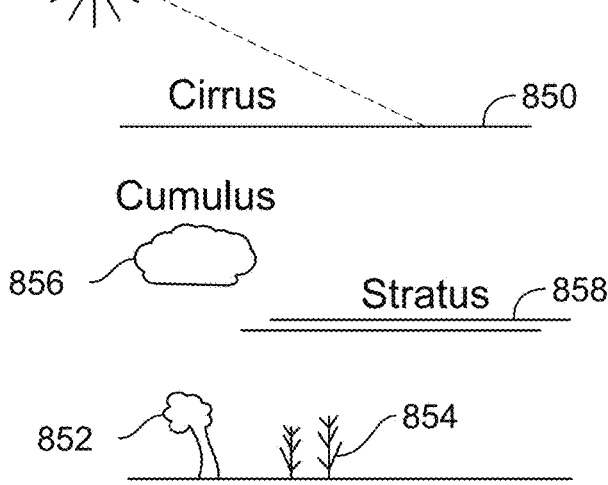
FIG. 8B illustrates an example portion of the Earth as viewed from the side.

As shown in FIG. 8B, clouds can take a variety of forms, and different types of clouds (or other atmospheric obstructions, such as smoke, snow, haze, and smog) can conceal the ground beneath them in different ways and to different degrees. In FIG. 8B, a tree (852) and corn plants (854) are shown. Example clouds are also shown, such as a cumulus cloud 856 (which will be opaque in the center part, but have fuzzy edges), low foggy stratus clouds (858), and very high cirrus clouds 850 (where the sun shines through the cloud but the illumination is affected by the cloud).

As mentioned above, sometimes the cloud may completely obstruct what is underneath it, and sometimes the view may be completely unobstructed. Sometimes, the optical depth value is inconclusive/insufficient to articulate whether a pixel is a cloud or not. For example, around the edges of pixels that have optical depths of 0 or 1, there will typically be pixels with optical depths somewhere in between 0 and 1 (e.g., 0.276). In some embodiments, a "cloud" pixel is defined as a pixel with an optical depth of less than 0.4 (or another appropriate value), and used as a mask. Cloud masks can also be more than 1 bit (e.g., 2 or 3 bits, indicating cloud, not cloud, or maybe cloud) per pixel.

One value that can be used in image processing/analysis is the normalized difference vegetation index (NDVI), which is a ratio $$\frac{NIR - VIS}{NIR + VIS},$$

where VIS and NTR stand for the spectral reflectance measurements acquired in the visible (red) and near-infrared regions. If a cloud affects each of these bands equally (e.g., it reduces each one by 10%), the ratio is unchanged. As an example, dust in the atmosphere scatters blue light more preferentially than green and red light. A cloud that affects red more than infrared will change the vegetation index. But, if that change occurs evenly across the whole scene, a correction can potentially be applied. For example, if a probe 820 is present for which the NDVI is known, and a different NDVI value is measured, if a sufficient number of probes are present in the scene, it could be possible to correct the whole scene for whatever obscuration is happening that is impacting the red and the infrared differently. Accordingly, a refinement to the definition of a "cloud" is something that affects NDVI in an uncorrectable way.

One approach to mitigating cloud cover (and other atmospheric obstructions) in imagery is to use the temporal dimension (e.g., to examine a set of images across time). One option is to opt for the largest number of samples in each pixel, without regard for resolution. A second option is to opt for the best resolution, with fewer samples per pixel.

Satellites (and other image sources) have a temporal period. For example, a given satellite might be above a given portion of land every 16 days. There may also be multiple satellites (e.g., two satellites), taking images on alternate days, where on one of the days the satellite will be directly above a region, and alternate days the satellite will be off to one side or another. Accordingly, for a given pixel, there could exist 20 observations, collectively, by various satellites over a 16 day period. Of those 20 observations of a given pixel, many may be masked out because of clouds (or other atmospheric obstructions). However, of those 20 observations of a given pixel, one pixel is the "best" pixel (e.g., the least obstructed). And, a composite image of an area can be created using data associated with each of the "best" pixels from a sequence of images covering the area, using techniques described in more detail below. The "best" pixel can be considered the one in a set (e.g., a time series) for which given spectral information associated with that pixel was last obscured by atmospheric obstruction.

Figure 9:
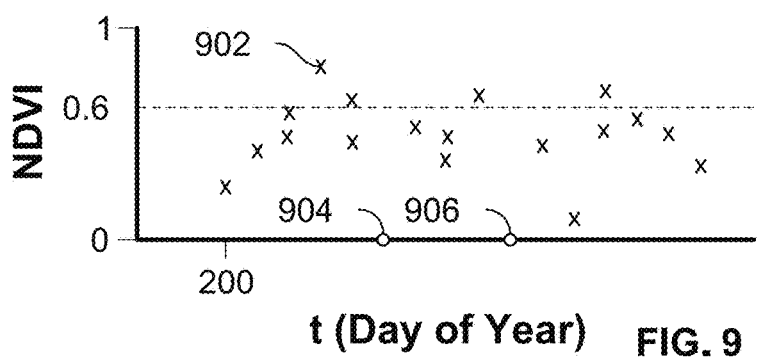
FIG. 9 illustrates a set of NDVI values for a given pixel in a sixteen day period.

A variety of approaches can be used to select the "best" pixel. One example is to use the NDVI value associated with the pixel (a one-sided error distribution). FIG. 9 illustrates a set of twenty NDVI values observed for a given pixel in a sixteen day period (starting on the 200$^{th}$ day of the year). While an NDVI value can range from −1 to 1, in this example, values below 0 have been excluded. In the sixteen day period, four "cloud free" observations are present (the points above the threshold NDVI line, set in this example at 0.6). Of those four observations, the observation on day 203 of the particular pixel being examined has the highest NDVI value (902) and is thus the "best" pixel in the sixteen day sequence.

For a given pixel in a given sequence of images, in some cases, no data may be present. One reason for the missing data is that a cloud mask (e.g., provided by NASA and described above) was applied. Another reason for missing data is that aberrations (due to satellite position) yield unusable image information. Suppose days 205 and 209 are missing data for the pixel being examined in FIG. 9. In various embodiments, the NDVI values of pixels with missing data are set to zero (e.g., as shown at 904 and 906). As mentioned above, in addition to clouds, a variety of other atmospheric obstructions can be "removed" in the composite image. For example, a composite image of a region affected by a wildfire can be created by selecting, collectively, the least smoky pixels from a bin of images. And, a set of images collected during a dust storm (e.g., on Earth, or elsewhere) can be used to create a composite image with the least amount of dust present in each pixel, etc. Other examples of "obstructions" that can be reduced in accordance with techniques described herein include digital defoliation (e.g., selecting for the pixel least obscured by plant cover using an appropriate index) and using a water index to select for a maximum (minimum) value to see a composite image of the ground at its wettest (or driest) as applicable.

The use of the NDVI value for cloud detection relies on the fact that clouds are spectrally "flat." In other words, the reflectance for each band is similar. This is equivalent to clouds being white, or a shade of gray. The formula for NDVI $$\frac{NIR - VIS}{NIR + VIS}$$

means clouds have an NDVI value near zero, since the terms in the numerator cancel. Selecting maximum value pixels is particularly effective with vegetation pixels, which have NDVI values which are much higher, since near-infrared (NIR) reflectance is much larger than red (VIS) reflectance. The same approach works for other differential indexes such as the normalized difference water index (NDWI), normalized difference snow index (NDSI), shortwave infrared $$\left(\frac{SWIR - VIS}{SWIR + VIS}\right),$$

or various permutations of differential vegetation index (e.g., using visible green instead of visible red). Other cloud rejection algorithms can work using other features of clouds. For example, since clouds are white or gray and are usually brighter than land cover they can be rejected over a background which is not white or gray by using an HSV (hue/saturation/value) decomposition of the RGB (red/green/blue) values and selecting pixels which are the lowest value or the lowest saturation.

Figure 10:
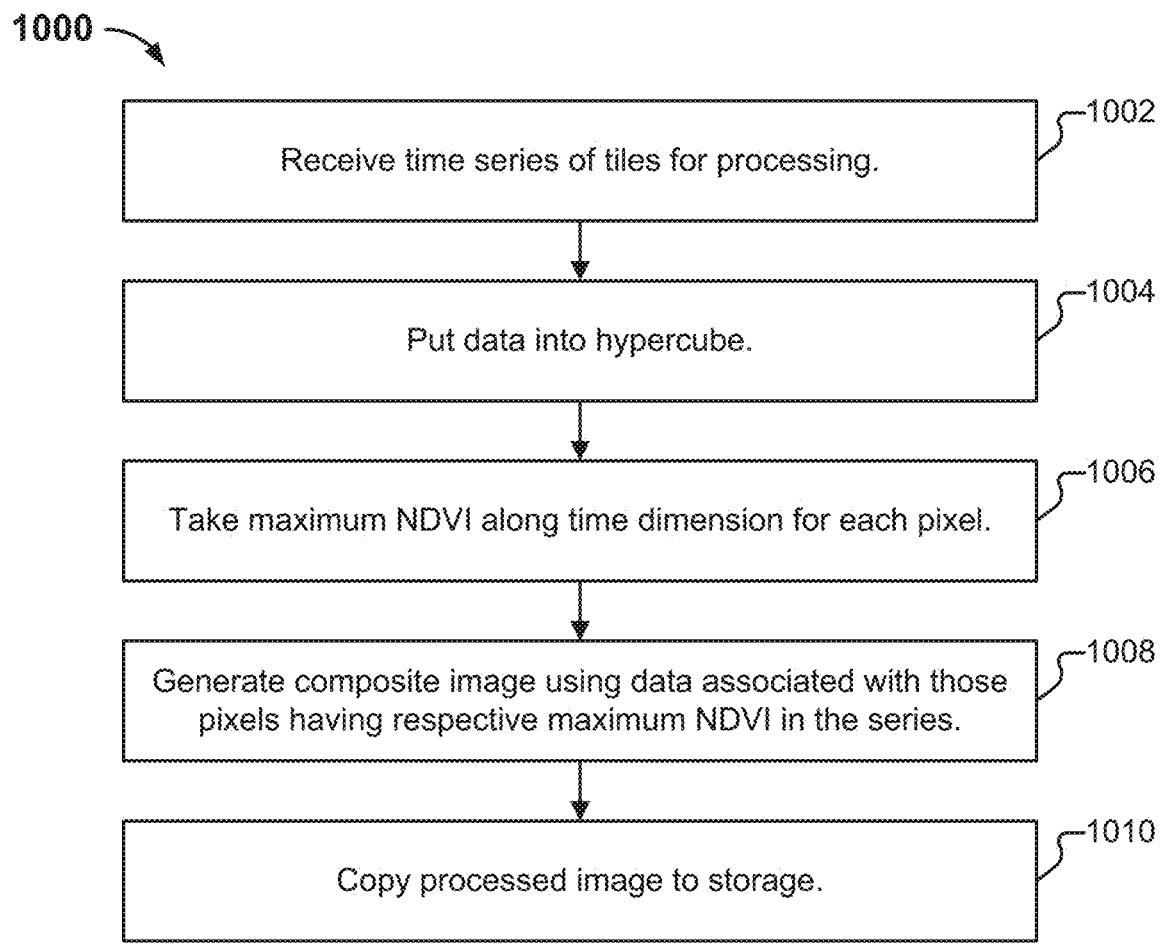
FIG. 10 illustrates an example of a process for creating a composite image.

FIG. 10 illustrates an example of a process for creating a composite image. In various embodiments, process 1000 is performed by image creator module 318.

The process begins at 1002, when a first tile is received for processing, and the previous fifteen (or other appropriate number of) tiles in a time series are also received. As one example, at 1002 image creator module 318 (comprising one or more Google Compute Engine instances and a Celery master) determines that a recently preprocessed tile (e.g., an output of pre-processor module 310) is available and retrieves that tile for additional processing. The images corresponding to the previous fifteen days' worth of that particular tile are also retrieved. As another example, predetermined time sequences of tiles (e.g., days 0-15, 16-31, etc.) are selected for processing (e.g., as the days elapse). Other size bins of data (i.e., other than 16 days) can also be used. Further, different size bins can be used for different regions (e.g., larger bins for cloudier areas) and/or different times of year (e.g., smaller bins in fall and larger bins in spring, where there are fewer clouds in a region in the fall than in the spring). Further, the images included in a bin need not be adjacent temporally. For example, a ten year stack of tiles from the same day of the year (e.g., Jan. 1, 1990; Jan. 1, 1991; Jan. 1, 1992; etc.) can be used as a bin, as can an arbitrary number of tiles selected at arbitrary intervals (e.g., depending on the application).

At 1004, a data hypercube is created by stacking each of the multi-band image tiles in the bin. In one example, the data hypercube created at 1004 is 4-dimensional, with the dimensions being pixel dimension (e.g., Red, Green, Blue, Near-Infrared, NDVI, Collection date), x-dimension, y-dimension, and time dimension. In various other embodiments, additional and/or different bands comprise the multi-band information included in the data hypercube. As process 1000 progresses, the time dimension is compressed to a single layer, and the data is reduced to a cube of values, or a 2-dimensional plane for each image component as applicable.

At 1006, the maximum NDVI is taken along the time dimension (e.g., by a python script). As a simplified example of the processing performed at 1006, suppose the data being operated on at 1006 includes a 3×3 image plane for the NDVI component on a particular day, and that only a total of two days' worth of tiles are used in the time series. Example data for a first day is as follows:

0 143 199
10 155 202
12 147 198

Example data for the second day for the NDVI plane is as follows:

20 122 204
10 157 199
11 141 206

After taking the maximum NDVI over the two days, the image plane would be:

20 143 204
10 157 202
12 147 206.

At 1008, a composite image is generated. As mentioned above, the maximum NDVI is used to determine, for a given pixel position (e.g., 1×1, . . . 3×3), which image's pixel in that position was the most cloud free in the time series. At 1008, the spectral information (e.g., any/all of RGB, NDVI, Infrared, etc.) associated with the "best" pixel (e.g., the one having the maximum NDVI for that pixel position in the set) is used to generate the composite image.

In various embodiments, additional metadata is included in the composite image. For example, the particular day of the year that was selected as the "best" for each pixel can be stored (e.g., day 203). As another example, the total number of valid observations that were considered can be stored. An example of a "valid" observation is any of the non-zero observations seen in FIG. 9 (i.e., not 904 or 906). In various embodiments, other processing (e.g., downstream of process 1000) can make use of the number of valid observations. For example, if out of 20 observations, only two are deemed valid, this could indicate a particularly stormy set of weeks (and that the maximum value recorded for that pixel during those two weeks is not likely to be representative of a cloud free image). A later process can have a requirement that (e.g., a minimum of three valid observations be seen in order for that pixel in that particular composite image to be considered representative.

Finally at 1010 the processed image is stored (e.g., to storage 312). The following is an example file name for a composite image file:
gs://modis-max/utm_v7r_max/2015/
max_2015_df200_15N_03 v7r.tif
The components of the path name are:
gs://: Google Storage designator
modis-max: storage bucket for
utm_v7r_max: type and version
2015: year
max_2015_df200_15N_03_v7r.tif: file name, with day=200, 15N=zone, and row=3

In some embodiments, there is one composite image per tile per day, with approximately 1200 MODIS tiles covering the globe. The resulting composite image can store a variety of features in a single or multiple bands as applicable. For example, the resulting composite image can store a single scalar feature in a single band, or can store one or more vector features in multiple bands.

A variety of analyses/manipulations can be performed using data such as the image data stored in storage 312, whether in conjunction with process 1000 (e.g., as one or more additional steps), or as a separate process (e.g., after the storing performed at 1010, or entirely independent of the execution of process 1000). Further, data from one (e.g., MODIS), or multiple (e.g., MODIS and Landsat) sources can be operated on during embodiments of process 1000, whether individually or in combination.

A variety of example applications using a variety of such techniques are described below. As one example, an image (or set of images, as applicable) can be used to generate a boundary map (an example of which is a field map). The boundary map can be used in a variety of ways. As one example, the map can be used to reduce the noisiness of an image. As a second example, the map can be used in image restoration to reduce artifacts. A boundary map can be also used as a mask to classify regions of an image (e.g., to produce an image of average values within the boundary or otherwise homogenize the pixel values for at least one band of information within the boundary, such as by taking a median value, a minimum value, etc.).

IV. Creating a Boundary Map

Some imagery applications work on an image as a whole. As one example, an image search application may take as input a photograph of a giraffe, and provide as output other photographs of giraffes selected from a corpus of photographs. As another example, in some applications (e.g., involving remote-sensing imagery) it is desirable to operate on the smallest area of an image possible (e.g., at the pixel level, which typically corresponds to the smallest area resolvable by the imaging sensor). For yet other applications however (e.g., various applications involving land use classification), it can be more desirable to operate over regions larger than a pixel (but smaller than the image as a whole).

Returning to the example of FIG. 8A, suppose field 808 is a corn field, as is field 818. Field 822 is a soybean field. Each of fields 808, 818, and 822 is an example of a "Common Land Unit (CLU)," described by the Farm Service Agency (FSA) as an individual contiguous farming parcel that has a permanent, contiguous boundary, a common land cover and land management, and a common owner and/or common producer association. The boundaries of a CLU are generally delineated from relatively permanent features such as fence lines, roads, and/or waterways. More generally, as used herein, a field is an example of a region bounded by edges that are temporally persistent.

In various applications, the ability to treat a given pixel as being part of a particular region would be desirable. For example, agricultural land use will generally be uniform over a given field, which will typically occupy multiple pixels in a particular image. Processing each pixel independently can thus be (1) unnecessarily computationally expensive, to the extent that the results of the processing produce different outcomes for a field's pixels, and (2) will also necessarily be needlessly inaccurate. By incorporating the knowledge that groups of pixels should be considered collectively, more accurate results can be produced, with greater efficiency. Accordingly, being able to treat all pixels (e.g., pixel 824) within a given region of a satellite image (e.g., within field 822) uniformly can be beneficial (e.g., when classifying field 822 as containing soybeans vs. corn vs. water). When examining the image depicted in FIG. 8A for land use classification purposes, all of field 808 should be designated "corn field," as should all of field 818. All of field 822 should be designated soybeans.

The USDA makes CLU data available (e.g., as CLU maps). Unfortunately, access to CLU data is restricted to entities certified by the FSA as working in cooperation with the Secretary of Agriculture. A company (or individual), such as an environmental research company or a land use planner (unaffiliated with the Secretary of Agriculture) will accordingly be unlikely to benefit from CLU data.

Even where an entity has access to CLU data, such data has various limitations. As one example, CLU data can become stale. An entity wanting a current boundary map for a particular region (e.g., where land usage has changed and/or where existing CLU data is inaccurate) may have to wait a year or longer for an updated set of government-provided CLU data. As another example, non-agricultural land uses (e.g., rivers, lakes, residential development, industrial development, mines, etc.) are outside the narrow definition of a CLU, as are farming plots outside of the United States and/or potentially American farming plots not associated with the FSA/USA. The ability to uniformly treat all pixels bounded by house 814 (e.g., including pixel 826), or all pixels bounded by river 812 (e.g., including pixels 828 and 830) can be beneficial, despite those regions not representing CLUs.

Using techniques described herein, boundary maps can be created, e.g., from imagery stored in storage 312. In addition to delineating CLUs (also referred to interchangeably herein as "fields"), boundaries of other types of contiguous land use (e.g., forests, grasslands, mines, parking lots, etc.) can also be determined. Further, the approaches described herein can be applied to other forms of imagery (e.g., other than land observations). Accordingly, as used herein, "fields," "regions," and "segments" will generally be used interchangeably, with a CLU being an example of a field/region/segment. While various examples described herein will refer to agricultural fields (e.g., a corn field adjacent to another corn field or a soybean field), "fields" (and the approaches described herein) are not limited to an agriculture context.

A first step in extracting fields (e.g., as a dataset) is to find their boundaries. As mentioned above, field boundaries manifest themselves in satellite imagery as edges that are temporally persistent. That temporal persistence, together with the ability to analyze a stack of satellite images, allows field boundaries to be distinguished from edges arising from ephemeral phenomena (e.g., clouds).

The source imagery for boundary map creation can include satellite imagery from any of several different sources, each of which have been preprocessed and divided into uniform tiles, and stored in Google Cloud Storage (GCS) buckets (e.g., as described above). Images can come from government sources (e.g., Landsat, NAIP) and/or 3rd-party sources (e.g., Planet Labs, RapidEye), as applicable. It is to be noted that while cloud removal has been described as a technology that can be applied to imagery data (e.g., stored in storage 312), cloud-free images are not necessary as input to the applications described below.

One approach to mitigating the effects of cloud and other image clutter is to average pixel values over many images, taken over a long time interval. However, averaging also tends to diminish differences between fields. Adjacent fields with different land uses can look very similar after averaging, diminishing the strength of the edge between them. An alternate approach is to determine edges for each image of a temporal stack, and then average the results over time. While field boundaries may be obscured in some images, over a long enough period of time, they will appear in a greater fraction of the images than ephemeral edges.

The pixel values of a satellite image can be regarded as samples of an underlying function f(x,y), defined at every point on the ground contained within the image. In terms of this function, the values of f(x,y) will change much more at a field boundary than within a field. This can be measured by computing $|\nabla f(x,y)|$. Edges can be characterized as those points (x,y) for which $|\nabla f(x,y)|$ is large, whereas within a field, the gradient will be zero (in an ideal case).

For images, the points (x,y) are only defined at discrete points $\{X_1, X_2, \ldots, X_M\}$ and $\{y_1, y_2, \ldots, y_N\}$. Finite differences can be used to approximate $$\nabla f(x, y) = \left(\frac{\partial f}{\partial x}(x, y), \frac{\partial f}{\partial y}(x, y)\right):$$

$$\frac{\partial f}{\partial x}(x_i, y_j) \approx f(x_{i+1}, y_j) - f(x_i, y_j) = D_x f(x_i, y_j), \quad (1)$$

$$\frac{\partial f}{\partial y}(x_i, y_j) \approx f(x_i, y_{j+1}) - f(x_i, y_j) = D_y f(x_i, y_j). \quad (2)$$

(For i=M or j=N, Neumann boundary conditions can be used. That is, $D_x f(x_M, y_j) = 0 = D_x f(x_i, y_N)$ is assigned.)

The discrete gradient magnitude:

$$|Df(x_i, y_j)| = \sqrt{|D_x f(x_i, y_j)|^2 + |D_y f(x_i, y_j)|^2}. \quad (3)$$

is defined for images with multiple spectral bands, so that each $f(x_i, y_j)$ is a vector $(f_1(x_i, y_j), \ldots, f_L(x_i, y_j))$, and $D_x f$ and $D_y f$ will be vector-valued as well. Then $|D_x f(x_i, y_j)|$ is the length of this vector:

$$|D_x f(x_i, y_j)|^2 = \sum_{k=1}^{L} (D_x f_k(x_i, y_j))^2, \quad (4)$$

and similarly for $|D_y f(x_i, y_j)|$.

The finite difference operators $D_x$, $D_y$ are implemented using sparse matrices, so that the "differentiation" process includes reshaping an image f into a vector, multiplying by the appropriate matrix, then reshaping back into an image.

The construction of the sparse matrices is as follows. First, one-dimensional finite differencing (with Neumann boundary conditions) of a vector with K components is obtained with the following matrix:

$$B_K = \begin{pmatrix} -1 & 1 & 0 & 0 & \ldots & 0 \\ 0 & -1 & 1 & 0 & \ldots & 0 \\ \vdots & & \ddots & \ddots & & \vdots \\ 0 & \ldots & 0 & -1 & 1 & 0 \\ 0 & \ldots & 0 & 0 & -1 & 1 \\ 0 & \ldots & 0 & 0 & 0 & 0 \end{pmatrix} \quad (5)$$

Accounting for the location of indices to correspond to differentiation with respect to x or y is accomplished using Kronecker products. If $I_L$ denotes the L×L identity matrix, then for use with M×N×L images, $$D_x = (I_M \otimes B_N) \otimes I_L, \quad (6)$$

$$D_y = (B_M \otimes I_N) \otimes I_L. \quad (7)$$

This produces matrices that are (MNL)×(MNL) in size. They are constructed so that if f is an M×N×L image, unwinding the pixel values of f into a vector, multiplying this vector by the matrix, and then reshaping the product back into an image will give the desired finite-difference derivative.

A. Example Process

Figure 11:
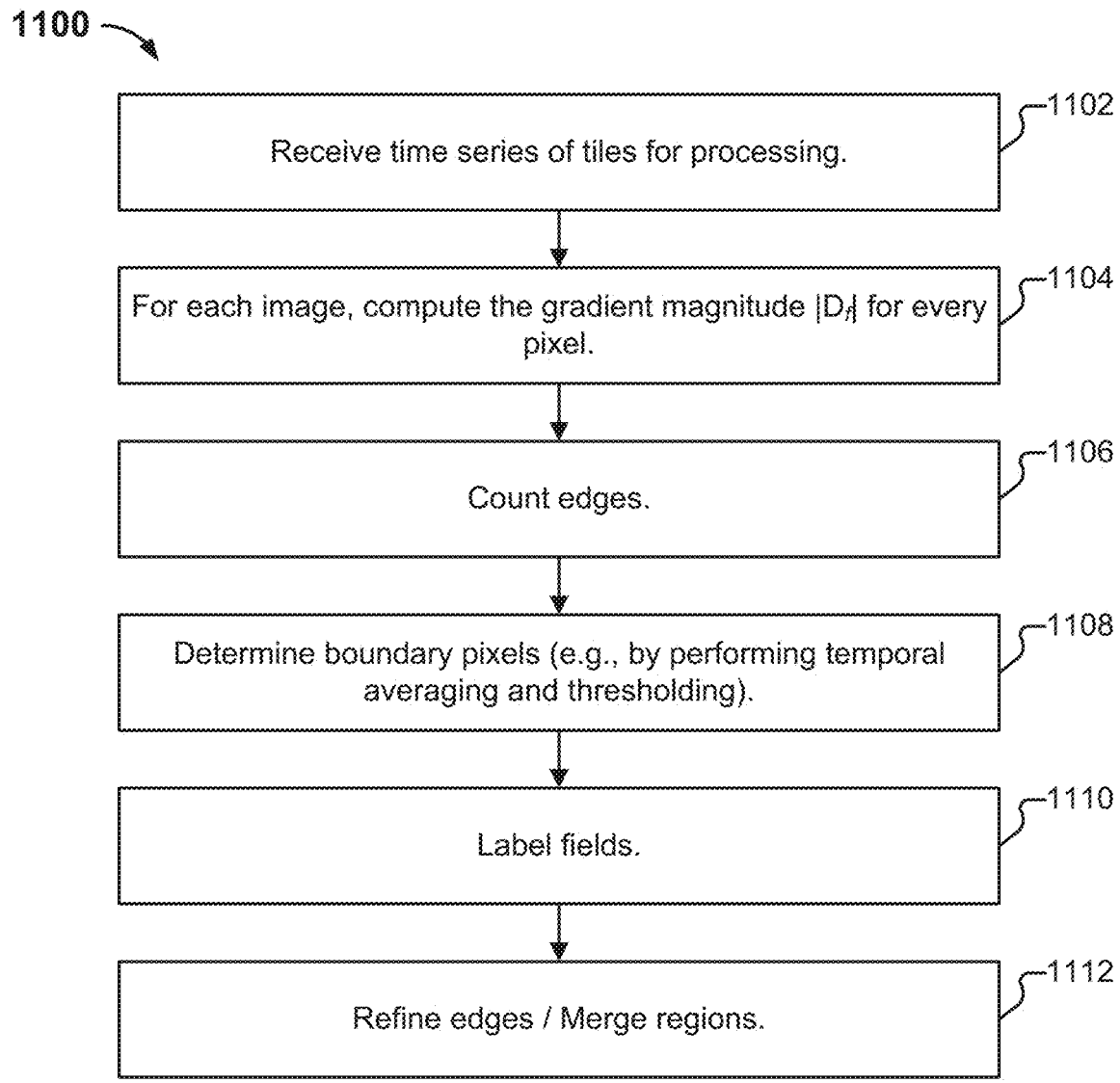
FIG. 11 illustrates an example of a process for creating a boundary map.

FIG. 11 illustrates an example of a process for creating a boundary map. In various embodiments, process 1100 is performed by boundary map creator module 320. The map is created by extracting fields from satellite images of a particular location, for which there may be many different observations over a period of many years. As will be described in more detail below, process 1100 can be terminated prior to the completion of the boundary map, as intermediate products (e.g., the output of portion 1108 of the process) are also useful for various applications.

One example way to implement boundary map creator module 320 is (as with other components of platform 302) to use a combination of python scripts and libraries (e.g., NumPy, sciPy, scikit-image). In particular, computation can be performed using a set of one or more Google Compute Engine virtual machine instances. Parallelization over tiles and dates (the latter for gradient computation, which is done independently with each image) can be performed using either a Celery master or with Bash shell scripts, depending on the geographic scope of the computation.

Figure 12B:
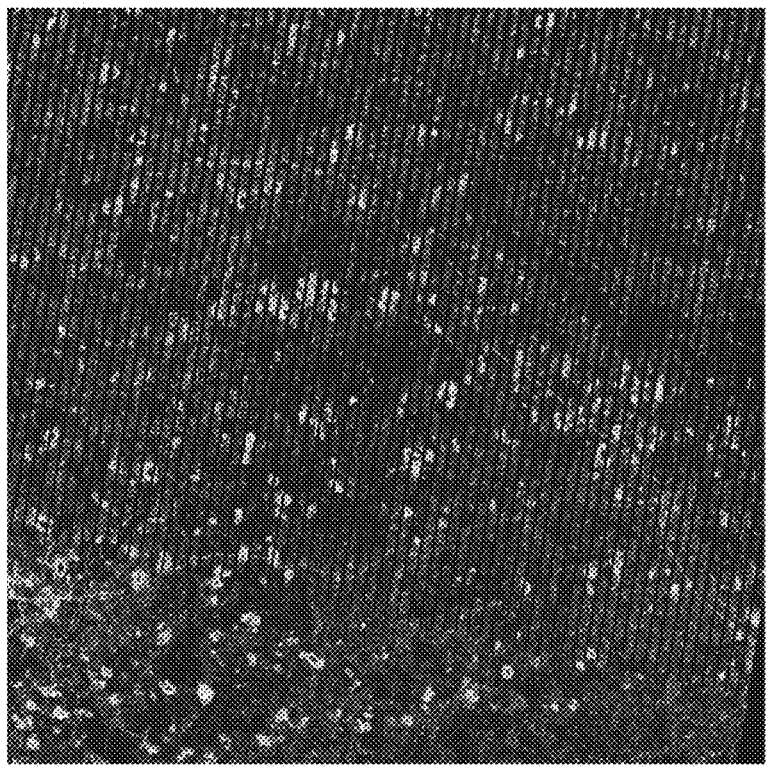
FIG. 12B depicts a gradient magnitude image.
Figure 12A:
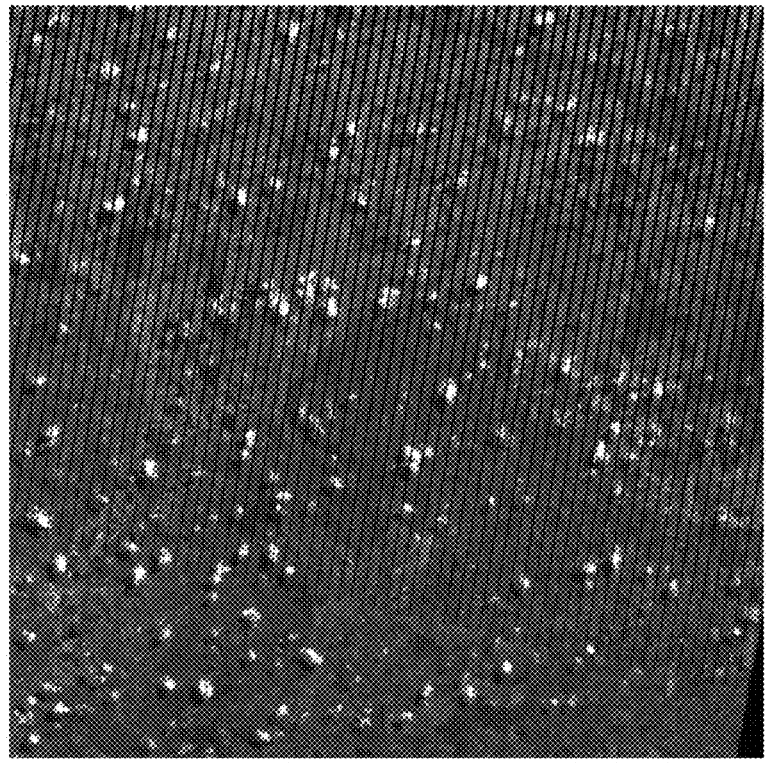
FIG. 12A depicts a portion of a Landsat 7 image.

The process begins at 1102, when a set of images corresponding to a particular tile is received. As one example, at 1102 boundary map creator module 320 receives an instruction (e.g., in response to the execution of a periodic script, or in response to a user request submitted via a web frontend) to generate a boundary map for a particular portion of land (e.g., by receiving a set of bounding coordinates, an identification of a particular tile identifier, etc.). A set of tiles corresponding to the location is retrieved for processing. As one example, suppose a request is received to generate a boundary map for the portion of land depicted in FIG. 12A. FIG. 12A is an example of a 2048×2048 sized portion of a Landsat 7 image and includes clouds, cloud shadows, incomplete tile coverage, and the scanline corrector artifact. At 1102, tile 1200 is retrieved, along with a time series of other tiles depicting that portion of land. In one example, fifteen years of imagery, with approximately forty observations a year, is retrieved at 1102 (approximately 600 images retrieved).

The scope of the set of tiles retrieved at 1102 can be adjusted as applicable (e.g., taking into account tradeoffs). The longer the time series (e.g., fifteen years vs. two years), the less likely it will be for clutter (e.g., scanline artifacts, incomplete tile coverage, clouds, etc.) to erroneously impact boundary lines. However, a longer time series can also result in reduced currency. For example, suppose a field was bisected three years ago (or its usage changed (e.g., from rural to urban)). When fifteen years of images are examined, the changes made three years ago may not be identified as sufficiently persistent. Similarly, boundary maps for portions of land that are generally less cloudy (e.g., portions of Arizona desert) may achieve results of similar quality to those of cloudier environments (e.g., portions of Colorado) with a smaller time series (e.g., three years of observations instead of fifteen). As yet another example, process 1100 can be performed using multiple kinds of observations (e.g., processed Landsat tiles and drone photographs that have been preprocessed to align with the portion of land being operated on). For example, a farmer or other entity may desire a highly accurate boundary map to be generated for a 50-mile radius of a particular grain elevator using a set of recent observations (e.g., obtained once a day over the last week via low flying aircraft).

At 1104, a gradient magnitude image is created for each image in the set of images retrieved at 1102. The gradient magnitude |Df| is computed for every pixel in a given image in the set of retrieved images of the location (e.g., using python code with a differentiation library and a sparse matrix library). A threshold value of |Df| that empirically provides a reasonable separation between edge pixels and within-field pixel fluctuations is selected. One example of such a threshold value is 50. It is also possible to leave |Df| unthresholded, or to use a threshold value of 0, and rely on temporal persistence to separate edge pixels from within-field pixel fluctuations. In the case of multi-band imagery, each band can be independently processed in accordance with process 1100, and the results can be variously combined. As one example, suppose a set of imagery includes six bands of spectral information. Six gradients can be respectively determined at 1104 (e.g., in parallel) for each of the six bands, and a six component vector generated. The gradient magnitude image created for each received image at 1104 can be stored in storage 312 (e.g., as a GeoTIFF image, preserving georeferencing information). FIG. 19B depicts a gradient magnitude image corresponding to the image depicted in FIG. 12A. The content of the image shown in FIG. 12B is the magnitude of the gradient at every pixel in image 1200 and summing over bands (resulting in a single band image).

Figure 13:
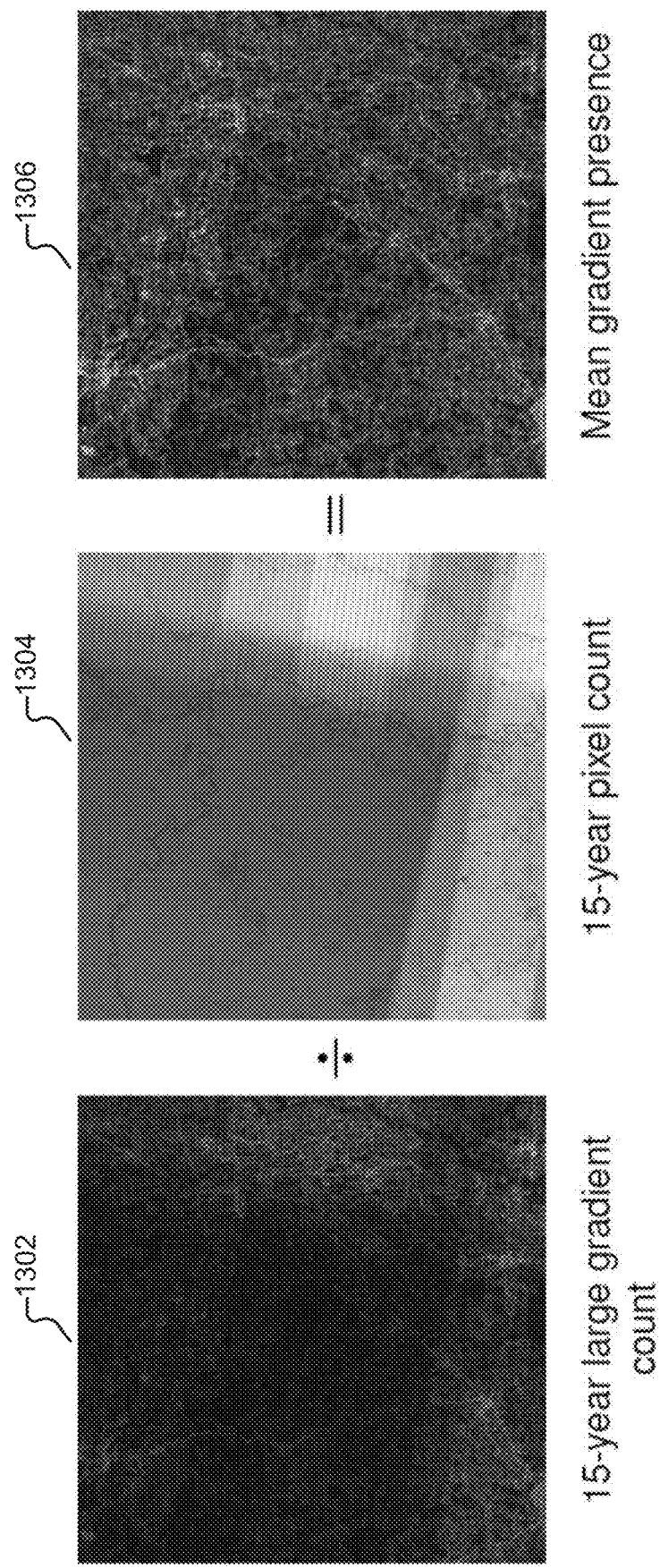
FIG. 13 depicts a gradient count image, a presence count image, and a gradient presence image.

At 1106, each of the gradient magnitude images (generated at 1104) is examined to tally the number of times a given pixel exceeds the gradient threshold. The edge count (across all the images in the set of retrieved images of the location) is saved as a gradient count image (e.g., as a GeoTiff image) in storage 312. An example of a gradient count image is shown at 1302 in FIG. 13. As shown at 1302, for each pixel, the brightness indicates how many times in the time series (e.g., set of 600 images) the pixel met the edge criteria (i.e., had a gradient magnitude that exceeded the threshold). As shown variously at 1302, structural outlines are present. Approximately 75% of the image (starting from the upper left corner of the image) is darker than the rest. The darkening is due to the Landsat pattern.

As mentioned above, in some cases, observational data for some pixels within a given observation may be missing. As one example, region 402 of the image depicted in FIG. 4A is a region where no data was available in a Landsat 1 MSS observation. If the observation depicted in FIG. 4A was the only observation used to make a boundary map, it might be the case that the edges of region 402 might erroneously be classified as edges. Where a time series of many tiles is used in process 1100, an occasional instance of missing observational data for a given pixel is unlikely to impact the final boundary map, as most of the other observations will contain usable data. It is possible, however, that many observations of the same region in a time series may be missing observational data. The varying intersection of an image with Landsat scenes means that some pixels are outside the intersection more often than others. Another issue is the scanline corrector artifact of Landsat 7, which affects some pixels more than others.

One approach to mitigating the erroneous classification as edges of the boundaries of observed pixels with pixels missing data is to tally the number of times each pixel is not within the NODATA region for each image. The presence count (across all the images in the set of retrieved images of the location) is also saved as an image. An example of a presence count image is shown at 1304 in FIG. 13. One way to determine which pixels are within the NODATA region is (e.g., during preprocessing of the image described above) to reserve a pixel data value of 0 for NODATA. A pixel for which data is present but the measured value is very low can be rounded up (if needed) to preserve the meaning of 0 as NODATA. As needed, the NODATA 0 value can be converted to a not a number (NaN) value for use in additional processing. As shown at 1304, for each pixel, the brightness indicates how many times in the time series (e.g., set of 600 images) the pixel was not in a NODATA region (i.e., data was captured by the imaging sensor for the pixel). As with 1302, as shown variously at 1304, structural outlines are present. And, approximately 75% of the image (starting from the upper left corner of the image) is darker than the rest. The darkening is due to the Landsat capture pattern. Further, scanline related errors are visible along the right side of the image as stripes, with some pixels having fewer observations than others due to obscuring by Landsat 7 artifacts.

The pixelwise quotient of the edge count and presence count (from the respective edge count image and presence count image) gives the frequency with which each pixel, when present, is considered to be an edge pixel (1306). This gives a measure of each pixel's edge persistence. Any arithmetic involving a NaN value will result in a NaN value (e.g., when the difference is taken), so the finite difference involving pixels in the NODATA region will also be a NaN.

Figure 15:
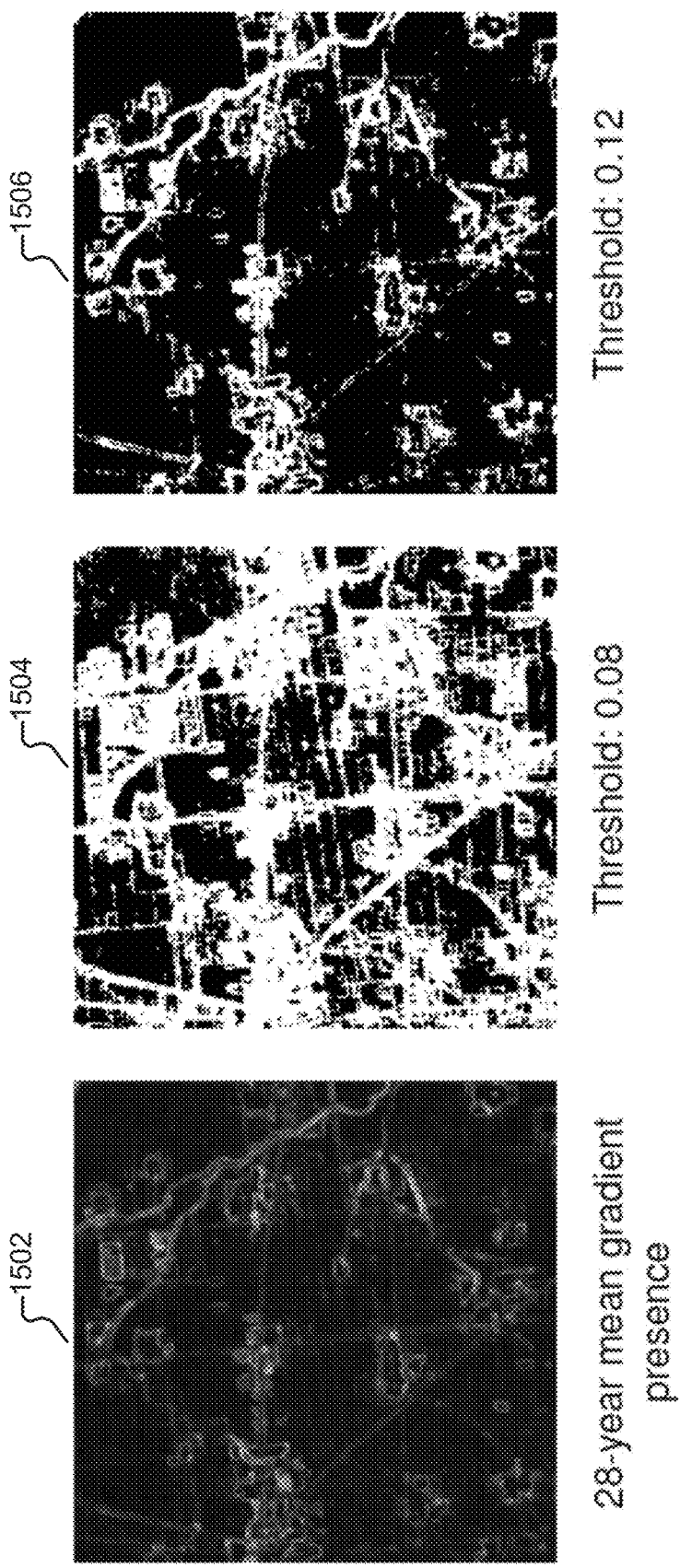
FIG. 15 depicts gradient presence images.

Suppose that the pixelwise quotient of the edge count and presence count for a given pixel is 0.20. This means that 20% of the time the pixel was observed, it was determined to be an edge pixel. A threshold for this quantity is chosen, and used at 1108 to make a final selection of those pixels that are considered to be part of field boundaries. The result is saved (e.g., in storage 312) as a binary GeoTIFF image, indicating which pixels are boundaries. Examples of two different thresholds (0.20 and 0.15) being applied to the same gradient presence image are shown in FIG. 14 (as image 1402 and image 1404). The tradeoff in selecting a threshold value is the inclusion of spurious edges (lower threshold) vs. edge incompleteness (higher threshold). FIG. 15 illustrates a 28-year mean gradient presence image of a portion of land in China at 1502. Greater cloudiness and smaller field sizes make boundary detection more challenging. Examples of two different thresholds (0.08 and 0.12) being applied to image 1502 are shown as image 1504 and image 1506.

The binary image generated as output at 1108 (an example of which is shown at 1306 in FIG. 13) can be used for a variety of purposes. One example is as a mask (e.g., indicating which portions of a region are edges/boundaries and, e.g., when the mask is inverted, which are not). Accordingly, in various embodiments, process 1100 ends at 1108, with the generation of a binary image such as image 1306.

Figure 16:
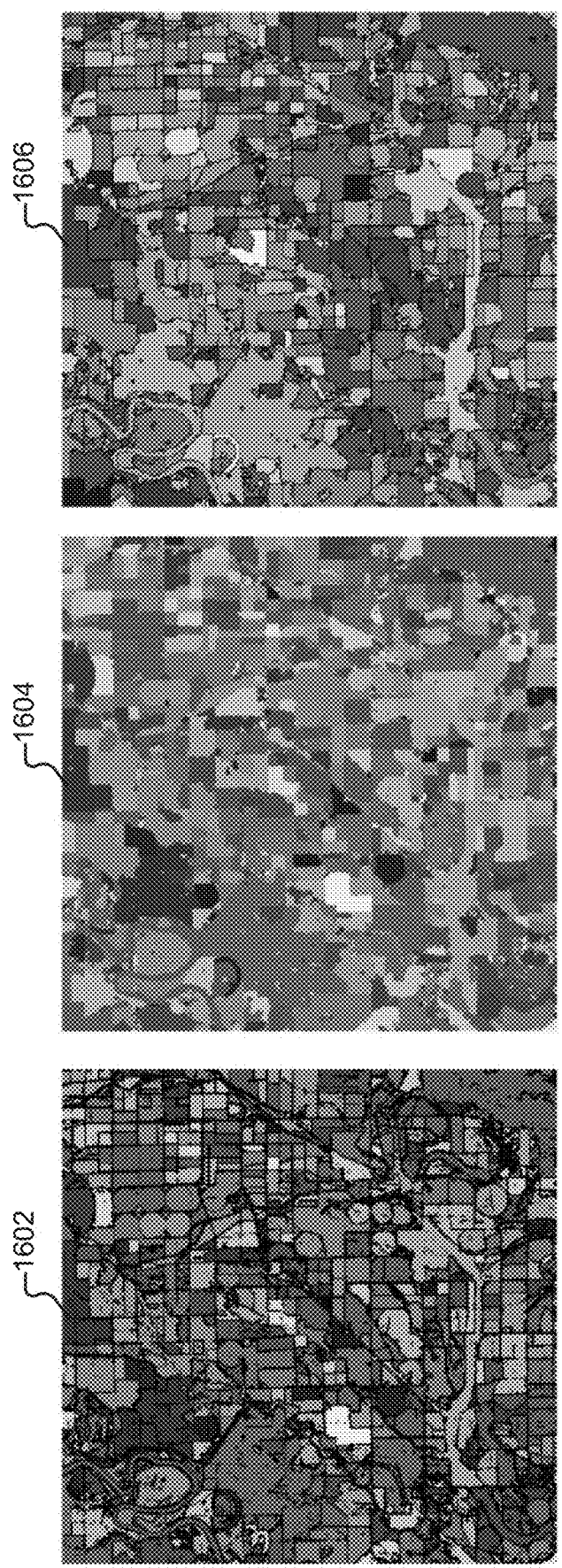
FIG. 16 depicts boundary maps.

The output of portion 1108 of process 1100 can be enhanced/refined, for example to generate a boundary/field map in which individual fields are identified and given labels. One approach is as follows. Take the set of identified non-boundary pixels (e.g., from the output of portion 1108), and separate them into connected components. One way to do this is using a Python package such as scikit-image, which provides image processing functionality (including for finding connected components) and uses NumPy arrays as image objects. Other packages providing morphological processing can also be used, as applicable (e.g., scipy.ndimage). At 1110, each such connected component is given a positive integer label as an identifier (e.g., using a "label" function made available by an appropriate Python package for labeling connected components). The set of pixels having a common label now constitute a field, and the boundary pixels are not (yet) assigned a field. The assignments are saved as an integer-valued image. FIG. 16, at 1602, depicts a set of fields (connected components) to which a random color map has been applied (i.e., with each pixel within an arbitrary field being colored the same as the other pixels in that field). Edges can be refined by alternately interpolating (1604) and redifferentiating (1606), described in more detail below.

Imperfections in the edge identification process can lead to issues such as excessively thick edges, and stray edge pixels wholly interior to fields. The boundaries can be optionally refined/improved (at 1112) using a variety of techniques. For example, skeletonizing can be used to thin edges to one-pixel thick, without changing connectivity. Interpolation can be used to assign field labels to each edge pixel, according to which field each edge pixel is closest to. Recomputing edge pixels, by once again computing gradients and assigning nonzero pixels to edges, allows refinement processing to be repeated. For example, portions 1104-1108 of process 1100 can be performed using the output of 1110. Different thresholds can be used, e.g., with the gradient threshold being set at >1. Such processing can be terminated variously depending on application. As one example, a final boundary map can be created after skeletonization, resulting in a boundary map with fields having a one-pixel-thick edge. As another example, a final boundary map can be created after interpolation, resulting in a boundary map with every pixel assigned to a field. As mentioned above, each field is assigned (e.g., via labeling) a positive integer value that can be used as a field ID or other label. One example of a format for a final boundary map is to save it as a raster image (e.g., in storage 312) which has a field ID for each pixel. The field ID (minus 1) can be used as an index for conversion between rasters and field-value arrays. In various embodiments, additional types of output are saved in conjunction with process 1100, such as a variety of shapefiles that describe different field polygons, and state rasters (e.g., comprising those fields within their boundaries). The shapefiles provide the vertices of polygons in geographical coordinates. In various embodiments, certain types of land use, such as urban areas and large bodies of water are not enclosed in any polygons and are left blank.

Process 1100 has been described thus far in terms of creating a boundary map for a single tile. A boundary map over a larger area can also be created (e.g., over a region such as a state) by merging smaller-scale maps. In various embodiments, the margining is performed at 1108, so that fields can be (re)labeled at the larger scale, and to avoid artificial boundaries at the edges of the smaller scale maps.

Portions of process 1100 are described above as being performed on all tiles in the set (e.g., 1102 where tiles are received, followed by 1104 where each image has a gradient magnitude determined for each pixel). As explained above, in some embodiments processing on all tiles is performed in parallel, e.g., with all tiles being retrieved at once, and then each of the retrieved tiles having per-pixel gradient magnitudes determined in parallel (e.g., using Celery architecture). In other embodiments, at least some portions of process 1100 are performed serially, e.g., with a single image being retrieved at 1102, and portions 1104-1106 performed with respect to that image, followed by a second image being retrieved at 1102 and portions 1104-1106 performed with respect to the second image, etc., until all images have been processed in accordance with portions 1102-1106 and processing continues (for the set) at 1108.

B. Example Application: Improving Classification

Certain portions of land, such as agricultural fields, are generally uniform in what they contain. For example, in a given farmer's field (e.g., a CLU), typically one type of crop (e.g., corn or soybeans) will be grown. And, typically, the contents within a given field are likely to change over time in the same way (e.g., grow at the same rate, produce the same yield, be affected by pests in the same manner, etc.).

A field will typically, when observed with remote imagery sensors, comprise several pixels. Some forms of image analysis operate at the pixel level (and, e.g., arrive at a per-pixel result). When each pixel of the field is analyzed (e.g., by a land use classification technique or set of techniques), it is possible that while most of the pixels within the field will be classified as corn, various stray pixels within the field may be classified as soybeans, whether due to errors in classification technique, limitations in the image(s) being analyzed, etc. As explained above, for some applications (e.g., land use classification and yield prediction), it may be desirable for results to be made uniform across an area (e.g., treating the field as the fundamental unit and/or arriving at a per-field result). As will be described in more detail below, boundary maps can be used (e.g., in conjunction with per-pixel analysis approaches) to achieve more uniform results.

Figure 17:
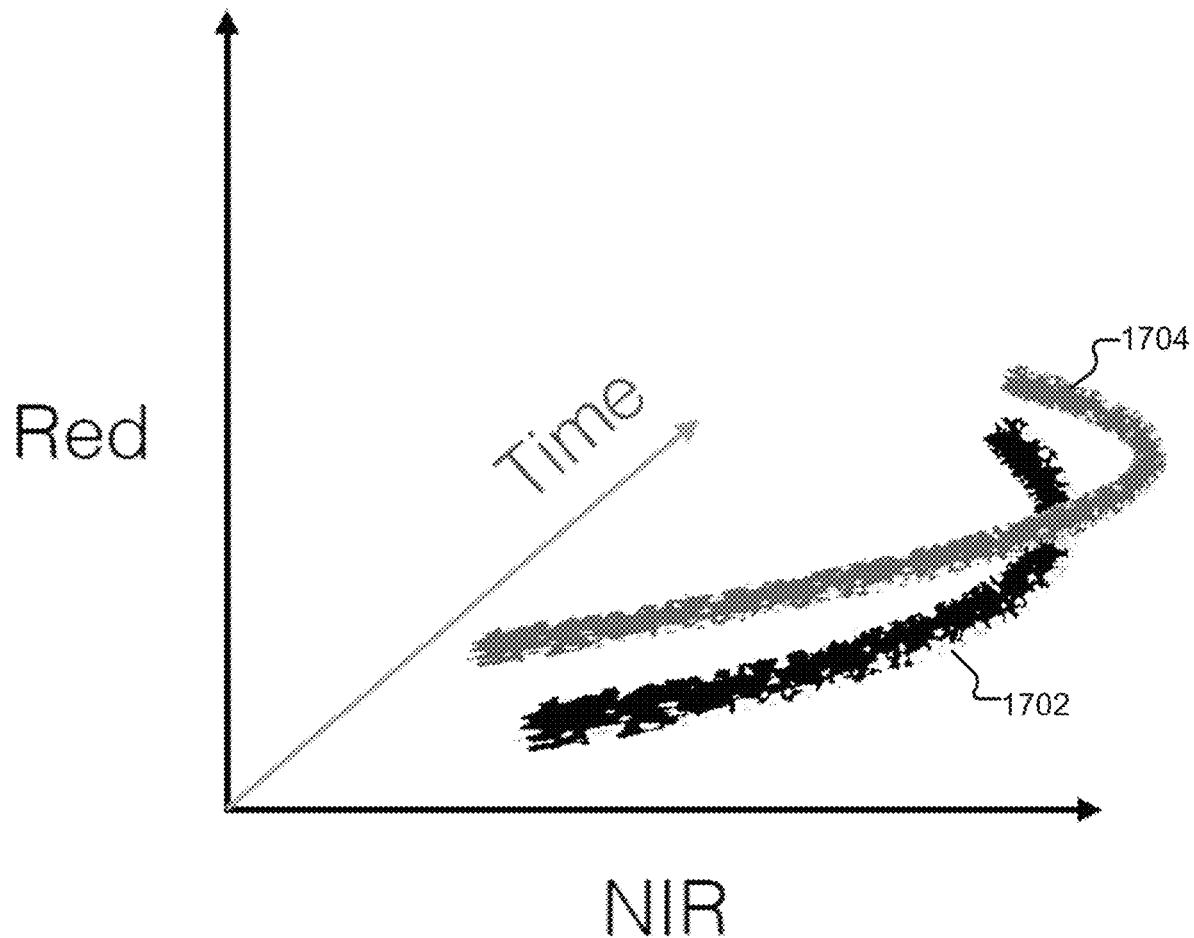
FIG. 17 illustrates a three-dimensional representation of how the spectral signatures of two different crops change over time during a typical growing season.

As shown in FIG. 3, platform 302 includes a classifier 322 (e.g., a land use classifier) that can classify portions of land. One way to implement classifier 322 is as a python script (or set of scripts). In various embodiments, classifier 322 takes as input an identification of a portion of land (e.g., a particular tile identifier, set of coordinates, etc.) and evaluates the land using a model 324. Model 324 is trained using a training set of imagery (and optionally additional data) for which land use classification has already been performed, and an appropriate machine learning technique, such as a random forest (e.g., using functionality provided by scikit-learn). FIG. 17 illustrates a three-dimensional representation of how the spectral signatures of two different crops (corn 1702 and soybeans 1704) change over time during a typical growing season. In particular, FIG. 17 tracks the brightness of a corn pixel and a soybean pixel, respectively, in the red and near infrared spectral bands, over time. Other bands can also be used instead of/in addition to the spectral bands represented in FIG. 17, and four-dimensional and other representations constructed similarly to what is depicted in FIG. 17.

Different types of land cover (e.g., corn, vs. soy, vs. forest, vs. pavement, etc.) will trace out different curves in a space such as is depicted in FIG. 17 (also referred to herein as "light curves"). The differences in such curves can be used in machine learning training (e.g., using a random forest and/or support vector machine) to differentiate between the different kinds of land usage and ultimately to classify images accordingly. Light curves can also be indicators of how healthy a crop is, and/or to predict yield. As one example, during the growing season, when a plant starts photosynthesizing actively, it becomes much more reflective in the near infrared than it is in the red, and so its NDVI values increase. As the plant matures, the NDVI value will increase even further, and then begin to plateau. Eventually, as the plant begins to brown, the NDVI will start to decrease, and, when the plant is harvested or otherwise removed from the land, the NDVI will drop significantly.

Figure 18A:
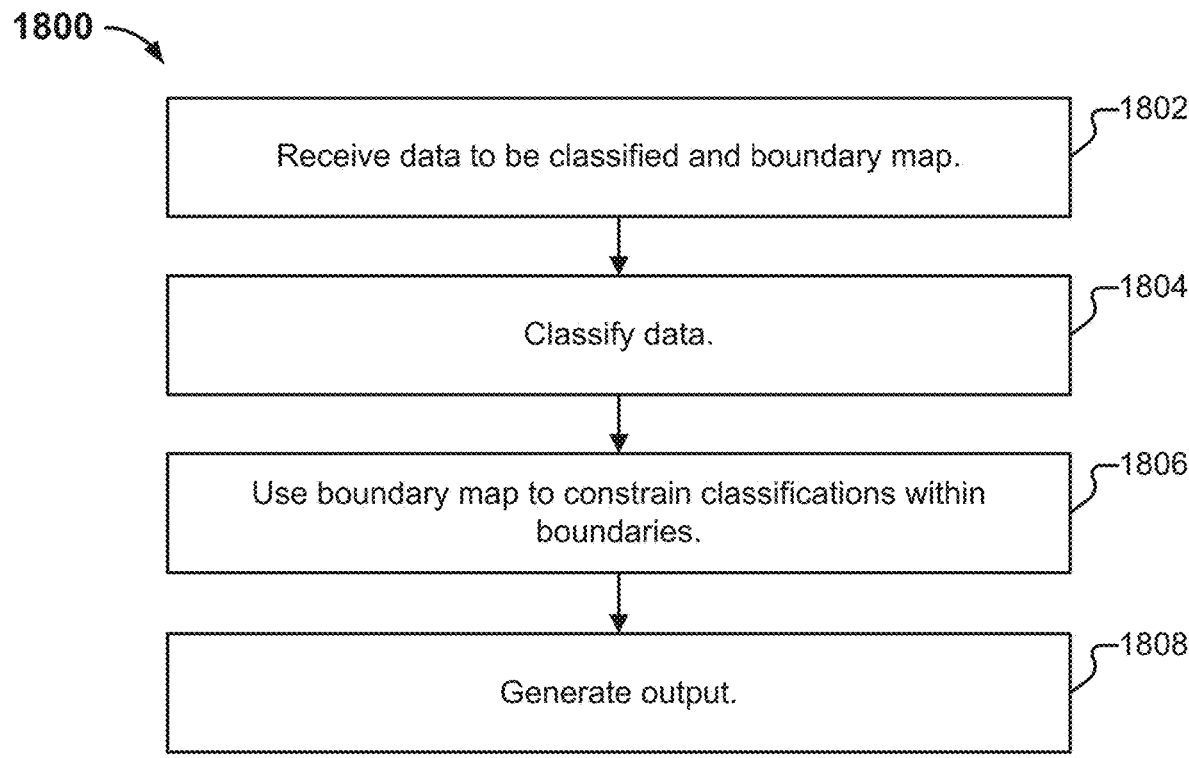
FIGS. 18A and 18B illustrate example processes for enhancing a classification using a boundary map.
Figure 18B:
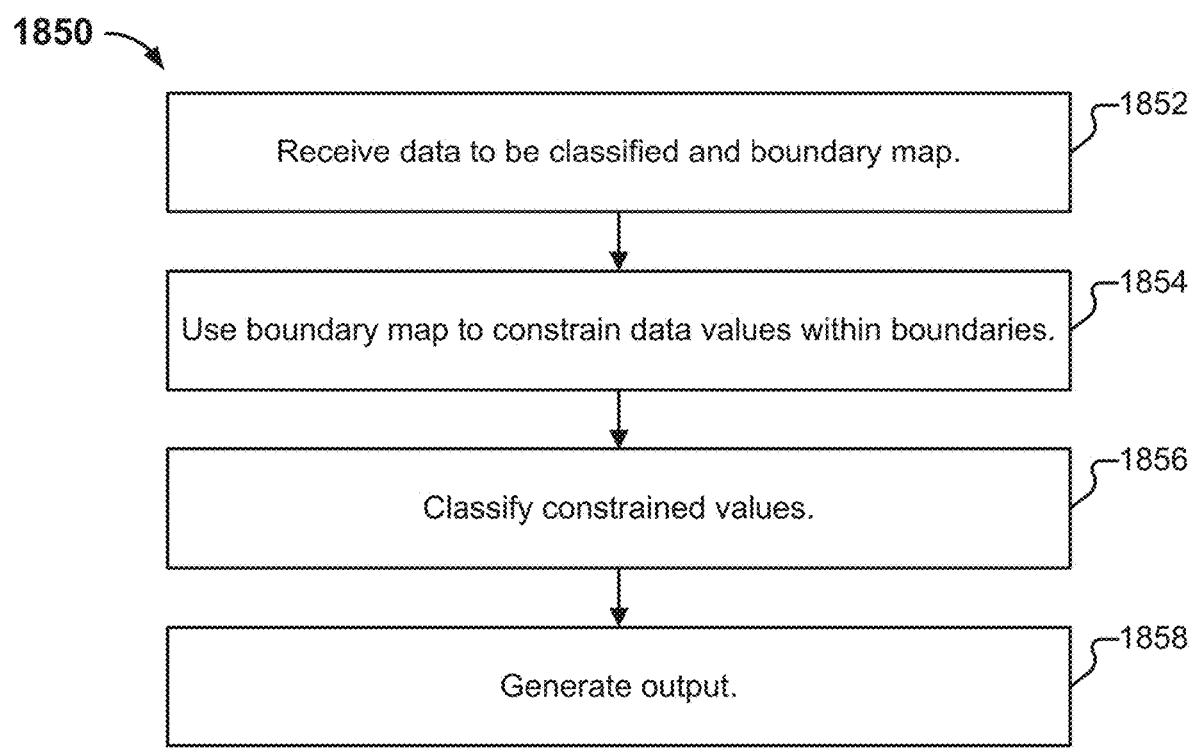

One approach to classifying land is to independently evaluate each pixel (e.g., using model 324) and classify each pixel (e.g., as corn, water, road, etc.) accordingly. A boundary map, such as one produced in accordance with process 1100, can be used as an additional input to classifier 322, to help improve the classification results. The boundary map can be applied after an initial classification is performed (FIG. 18A). The boundary map can also be applied prior to classification (FIG. 18B). Further, the boundary map can be used in conjunction with other types of analysis, such as yield estimation.

FIG. 18A illustrates an example of a process for enhancing a classification using a boundary map. In various embodiments, process 1800 is performed by classifier 322. The process begins at 1802 when data to be classified, and a boundary map, are received. One example of the data received at 1802 is a time series depicting the region shown in FIG. 8A across a time window such as a month, or a year.

At 1804, the data received at 1802 is classified. As one example, for each pixel in a given position (e.g., pixel 1,1 across all received images) classifier 322 evaluates the data associated with the pixel and assigns a classification. Examples of such data include a single spectral band (e.g., Near Infrared), a set of bands (e.g., all Landsat bands), and/or data from other sources associated with the pixel (e.g., a vector of statistical information such as rainfall statistics, ground temperature, etc. mapped to each pixel).

Figure 19:
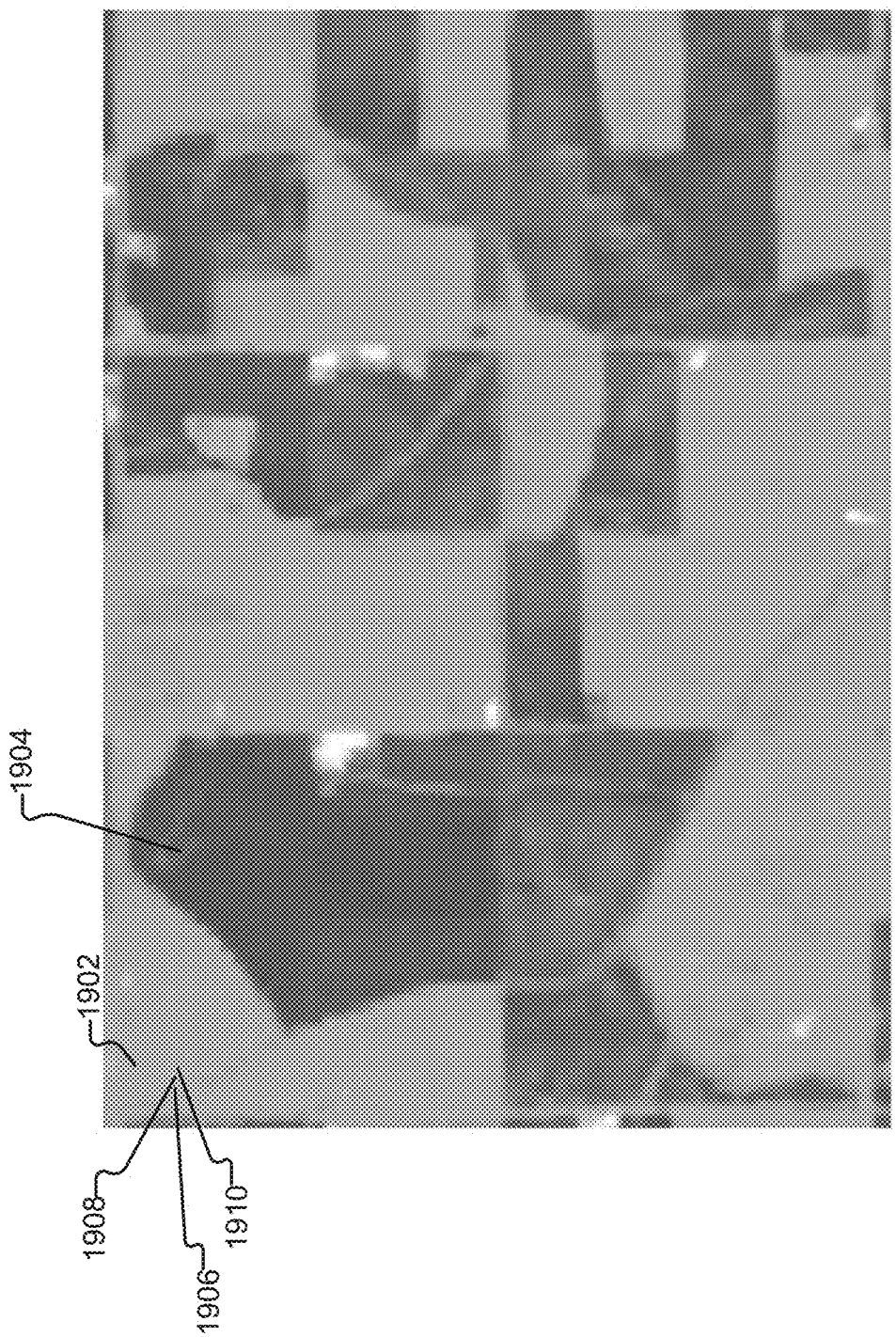
FIG. 19 depicts various fields in Iowa.

FIG. 19 depicts various fields in Iowa, including corn fields (1904) and soybean fields (1902). Suppose classifier 322 is examining a stack of images corresponding to the land shown in FIG. 19. It classifies the land covered by pixels 1906 and 1910 as soybeans, but classifies the land covered by pixel 1908 as corn. It is possible that the land covered by pixel 1908 is in fact corn. It is also possible that a problem with the data and/or a problem with the classifier erroneously resulted in pixel 1908 being classified as corn. Irrespective of the reason pixel 1908 is identified as corn, for many applications, it would be desirable for pixel 1908 to be identified as soybeans.

Returning to process 1800, a boundary map can be used to constrain classification results so that, given a statistic or set of statistics associated with a given pixel in a time series, the results will be uniform over a field. For certain types of data (e.g., used in a field classification), each pixel within a field (e.g., sharing the same field ID) can vote for the value that should be applied to the field as a whole. So, for example, if 95% of the pixels within a field are classified as soybeans, and 5% are corn (or other classifications) at 1804, all pixels within the field boundaries can be classified as soybeans at 1806.

Other kinds of analysis can also be performed in accordance with process 1800 and process 1800 can be adapted as applicable. As one example, statistics such as rate of growth may be computed, per pixel, for the time series at 1804. And, at 1806, the average value can be determined across all pixels within each field.

Classifier 322 can generate a variety of different types of output at 1808 as applicable. For example, classifier 322 can generate a classification map (e.g., in GeoTIFF format) which identifies, at each pixel in the image, a numeric value corresponding to the land use classification determined by the classifier. In various embodiments, classifier 322 is trained using up to 256 classes (covered by an unsigned 8-bit integer) with, for example, "01" representing corn, "02" representing soybeans, "03" representing wheat, "04" representing evergreen trees, etc.

Classifier 322 can also generate, for each/arbitrary classifications, a binary mask (e.g., corn mask indicating whether a given pixel is corn (value=1) or not (value=0); a soybean mask indicating whether a given pixel is soybeans (value=1) or not (value=0); etc.). As another example, instead of (or in addition to) conclusively assigning a particular label ("01") to a given pixel, classifier 322 generates a probability (or confidence) that a particular pixel is a given classification. In this scenario, the land covered by an arbitrary pixel might be 78% likely to be corn (corn=0.78), 15% likely to be soybeans (soybeans=0.15), 4% likely to be wheat (wheat=0.04), etc. In this scenario, classifier 322 can optionally select as a classification for the pixel the land use that has the highest score (subject to a threshold, such as 40% confidence). As yet another example of output that can be generated at 1808, classifier 322 can store (e.g., in a table or other appropriate data structure) a classification for a given field ID, without (or in addition to) generating a classification map. (E.g., with an arbitrary field identified as fieldID=233982 having a classification of "02" and another field identified as fieldID=233983 having a classification of "01").

The output of classifier 322 can also be consumed by other processes/components of platform 302 for a variety of purposes. As one example, yield predictor 326 (a script or set of scripts) can take as input classification data (from classifier 1222) and additional data such as rainfall/sunlight, and light curve information for a given region, to generate yield estimates for the region (e.g., using a model 328 trained using historical information).

FIG. 18B illustrates an example of a process for enhancing a classification using a boundary map. In various embodiments, process 1850 is performed by classifier 322. The process begins at 1852 when data to be classified, and a boundary map, are received. One example of the data received at 1852 is a time series depicting the region shown in FIG. 8A across a time window such as a month, or a year.

At 1854, a boundary map is used to constrain the values that will be input into classifier 322. As one example, at 1854, for each image in the time series received at 1852, the average value across all pixels within a particular field is set as the value for each pixel within the field. Suppose, for a single image in a time series of images, pixel 1906 has a green channel value of 0.90, pixel 1908 has a green channel value of 0.60, and pixel 1910 has a green channel value of 0.80. At 1954, a green channel value of 0.77 will be set for all three pixels (1906, 1908, and 1910), prior to being provided to classifier 322. Average values for other channels will similarly be applied to pixels 1906, 1908, and 1910. (It is to be noted that the average value will be taken across all pixels within a given field, not just pixels 1906, 1908, and 1910. Values for the remaining pixels have been omitted for simplicity.)

At 1856, classifier 322 classifies the results of the processing performed at 1854. Specifically, classifier 322 will operate on the average value for each pixel in a given field, across the time series. As with process 1800, other kinds of analysis can also be performed in accordance with process 1850 and process 1850 can be adapted as applicable. And, as with process 1800, classifier 322 can generate a variety of different types of output at 1858 as applicable, including classification maps, tables of classifications, etc.

FIG. 20A illustrates an example of a portion of land classified without use of a boundary map (e.g., using classifier 322 on a time series of data without using a boundary map). As seen at 2002, a single pixel (or small set of pixels) has been classified as one type of crop in classification map 2000, but is surrounded by pixels classified as a second type of crop (in region 2004). FIG. 20B illustrates an example of a boundary map for the scene depicted in FIG. 20A. Boundary map 2010 is an example of a map that can be produced in accordance with process 1100. As shown in FIG. 20B, region 2006 is a single field. FIG. 20C illustrates an example result where the time series data used to produce the classification map 2000 and boundary map 2010 are both provided to classifier 322. As shown in FIG. 20C, all pixels in region 2008 are classified as the same crop. FIG. 20C depicts a classification map, which is an example of output producible using either process 1800 or 1850 (at 1808 or 1858).

C. Example Applications: Correcting Artifacts, Upsampling Images, and Denoising Images Boundary maps, such as those that can be created using embodiments of process 1100, can be used to improve land use classification results (e.g., as explained in conjunction with FIGS. 18A and 18B). Boundary maps (whether made in accordance with embodiments of process 1100 or otherwise provided, e.g., as CLU data) can also be used in other applications to improve other kinds of results. Examples of such other applications include correcting artifacts such as scanline correction errors, upsampling images, and denoising images.

Figure 21C:
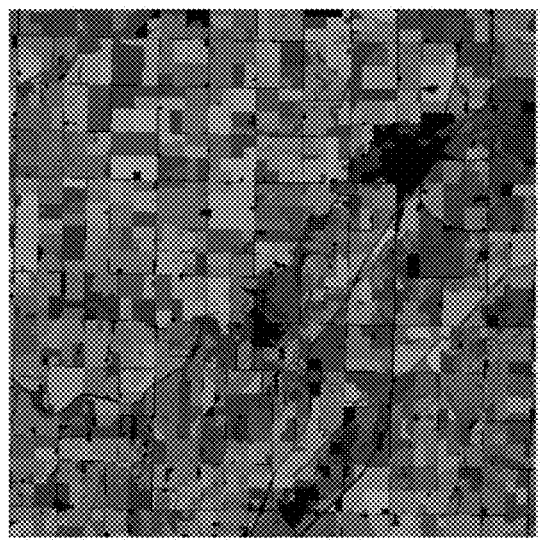
FIG. 21C illustrates a result of providing the image shown in FIG. 21A and the boundary map shown in FIG. 21B as input to process 2300.
Figure 21B:
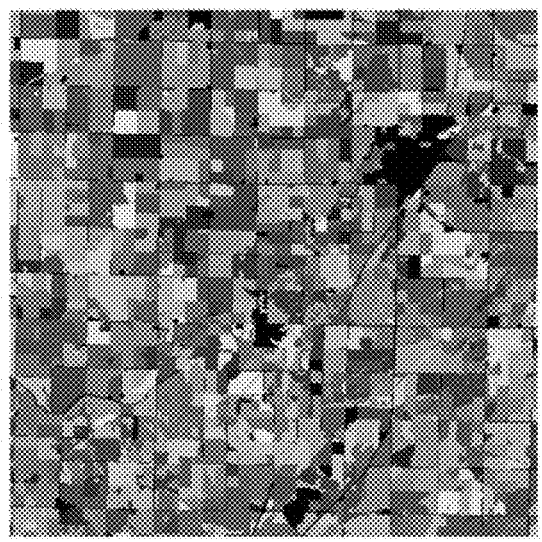
FIG. 21B depicts a boundary map.
Figure 21A:
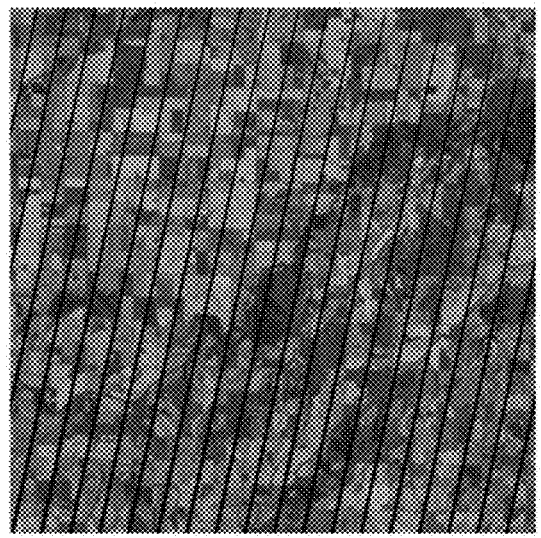
FIG. 21A depicts a Landsat 7 image.
Figure 22C:
FIG. 22C illustrates a result of providing the image shown in FIG. 22A and the boundary map shown in FIG. 22B as input to process 2300.
Figure 22B:
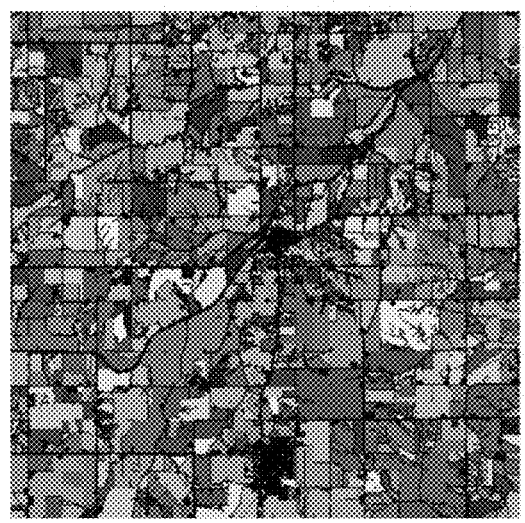
FIG. 22B depicts a boundary map.
Figure 22A:
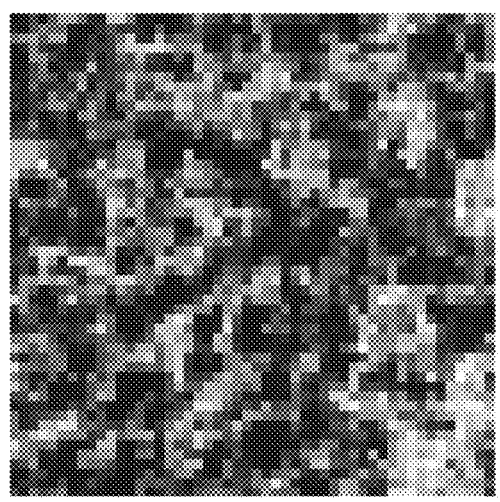
FIG. 22A depicts a portion of a MODIS image.
Figure 24B:
FIG. 24B shows a zoom into FIG. 24A.
Figure 25:
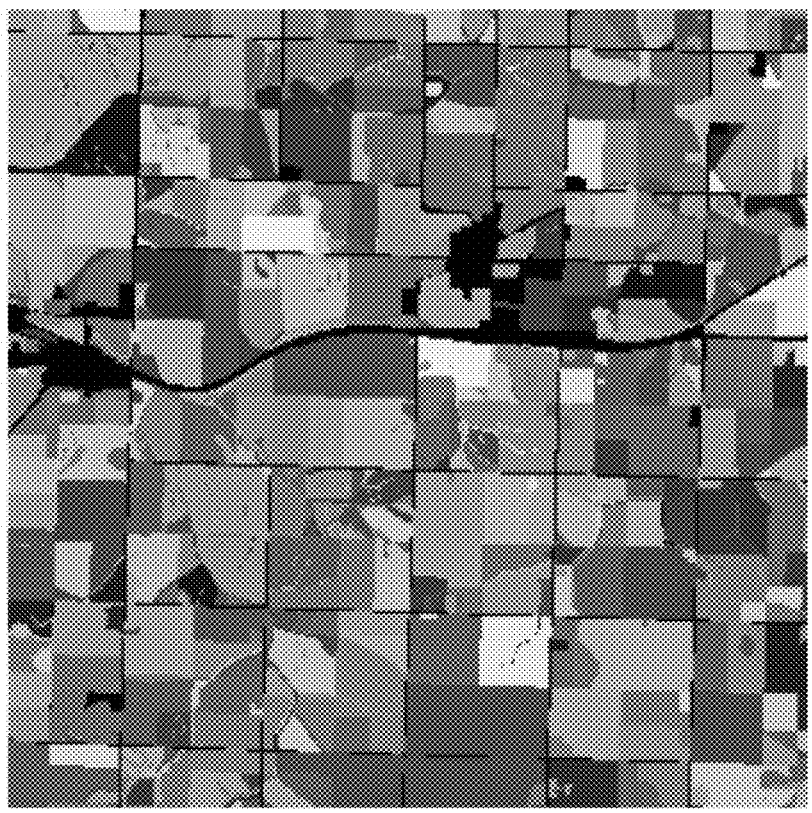
FIG. 25 illustrates an example of a boundary map.

FIG. 21A depicts a Landsat 7 image that includes (as diagonal black lines) scanline correction artifacts. FIG. 22A depicts a portion of a MODIS observation. FIG. 24B depicts a noisy observation by Sentinel-1 of a portion of land. FIGS. 21B, 22B, and 25 respectively depict boundary maps corresponding to the images shown in FIGS. 21A, 22A, and 24B. In each case, the captured observational data can be improved by performing an embodiment of process 2300 using the respective boundary map.

Figure 23:
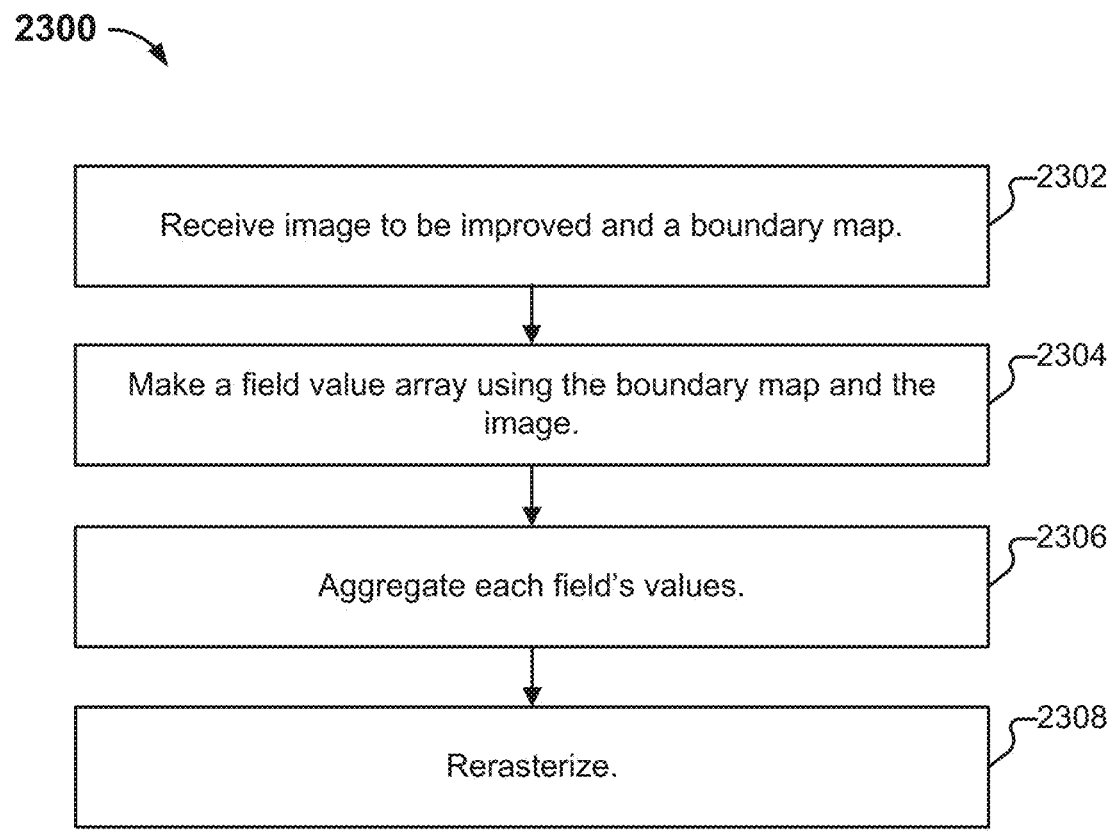
FIG. 23 illustrates an embodiment of a process for enhancing an image using a boundary map.

FIG. 23 illustrates an embodiment of a process for enhancing an image using a boundary map. In various embodiments, process 2300 is performed by image enhancer 332. One example way to implement image enhancer 332 is as a set of Python scripts incorporating the open-source libraries NumPy and SciPy. The process begins at 2302 when an image to be enhanced and a corresponding boundary map are received. As a first example, suppose that at 2302, image 2100 and boundary map 2130 are received. At 2304, a field value array is constructed, using the boundary map and the received image. The field value array is an array of deques, and is created by iterating over pixels in the received image, appending a given pixel's value to the appropriate field. At 2306, the values (extracted from the received image) are aggregated per field. A variety of aggregation techniques can be used, examples of which include determining the mean pixel value, the median pixel value, or a mode. As previously explained, for pixels where no data is present, a NaN value can be supplied (e.g., during ingestion), so that operations such as taking a median or mean are not impacted by the presence of zero values. The values determined at 2306 are used to perform, at 2308, a rerasterization operation, resulting in an enhanced image where each pixel in a field in the enhanced image has the same value as the rest of the pixels in the same field. As with various other examples provided throughout the Specification, where the image received at 2302 is multi-spectral, multiple values for a pixel can be operated on throughout process 2300 as applicable.

FIG. 21C illustrates a result of providing image 2100 and boundary map 2130 as input to process 2300. In particular, regularizing the pixel brightness values across the pixels bounded by a given field (e.g., using the median value) has in-painted the black stripes of missing data in the original image.

FIG. 22B depicts a boundary map (created in accordance with process 1100) for a portion of land, rasterized to 30 m resolution. FIG. 22A depicts a corresponding MODIS observation of the same portion of land that is represented by boundary map 2230. The MODIS observation (240 m resolution) has been upsampled so that both image 2200 and boundary map 2230 are the same size (e.g., with 2048×2048 pixels representing 30 m×30 m of ground in both cases). FIG. 22C illustrates a result of providing image 2200 and boundary map 2230 as input to process 2300. In particular, regularizing the pixel brightness values across the pixels bounded by a given field (e.g., using the median value) has resulted in a resolution-enhanced version of image 2200.

Embodiments of process 2300 can similarly be used to de-noise image 2450 (using boundary map 2500), resulting in an image such as image 27A. Noise in images is an obstacle to many kinds of image processing. This is especially true of automated processing, as it can be challenging for computer algorithms to extract image features amidst substantial noise as easily as humans can. A fundamental challenge is to remove noise without also removing essential image characteristics. Much of the information content of an image is contained in the image's edges. Accordingly, a technique that will preserve edges in the course of removing noise will be beneficial.

Figure 24A:
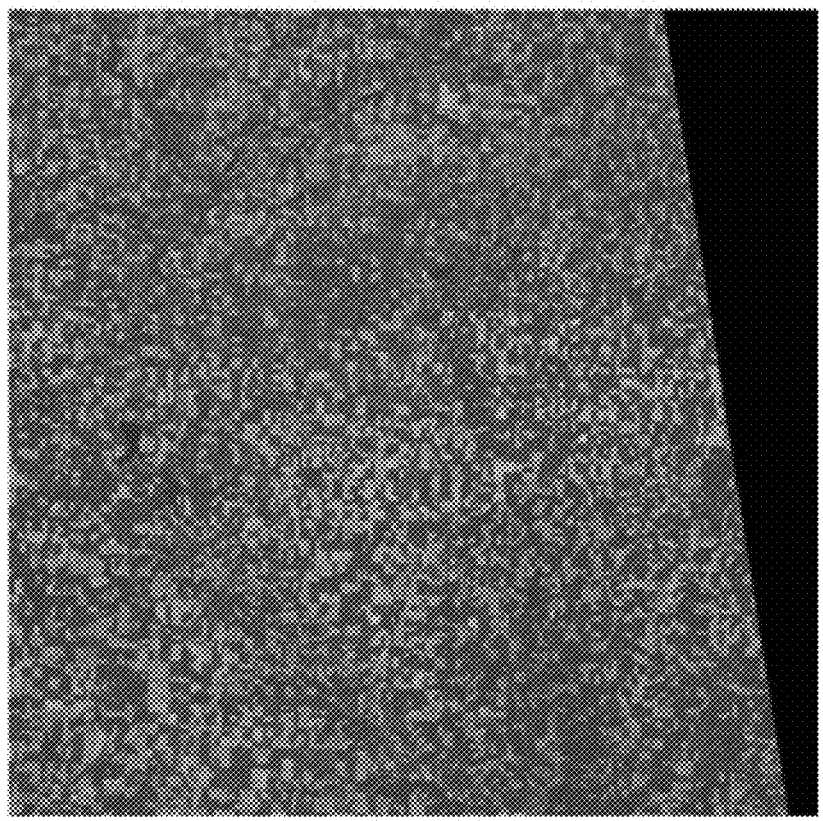
FIG. 24A shows an example of a processed SENTINEL-1A image.

One source of input to platform 302 is Sentinel-1 data. Sentinel-1 provides synthetic aperture radar (SAR) imagery. Benefits of SAR imagery include that it is cloud-free, and also that it can be continuously collected (including at night). One drawback of SAR imagery is that it can be very noisy. FIG. 24A shows an example of a processed Sentinel-1A image (UTM tile 15N_004_075 (Carroll, IA), taken Sep. 11, 2015), with each side of the image representing a distance of approximately 60 km. In the example shown in FIG. 24A, the first channel is the VH polarization, the second channel is the VV polarization, and a third channel has been added using $$\frac{VV - VH}{VV + VH}.$$

FIG. 24B shows a zoom into FIG. 24A, with each side of the image representing a distance of approximately 900 m. FIG. 25 illustrates an example of a boundary map that corresponds to the portion of land depicted in FIG. 24B. The following is an example approach to using boundary maps (whether generated in accordance with an embodiment of process 1100, or otherwise obtained, e.g., as governmental CLU data) to assist in image denoising.

Figure 26:
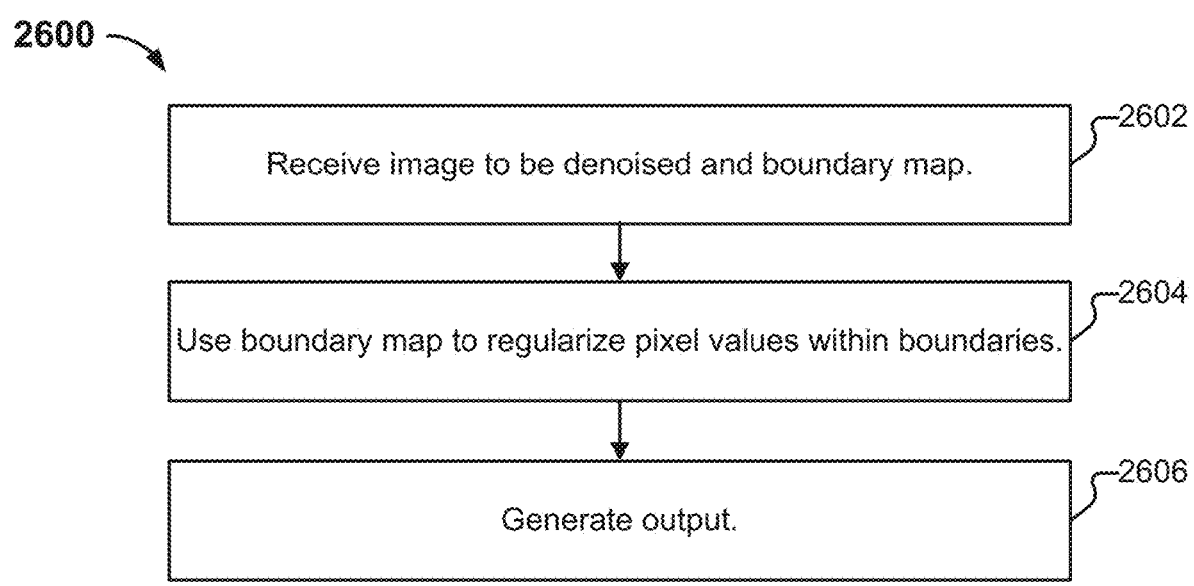
FIG. 26 illustrates an embodiment of a process for enhancing an image using a boundary map.
Figure 27B:
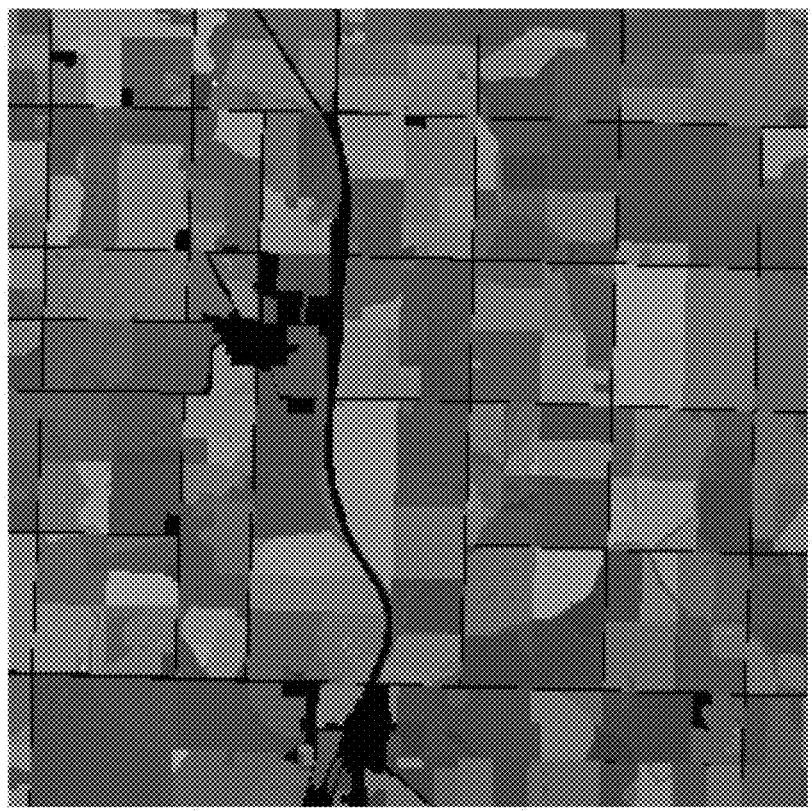
FIG. 27B depicts a result of regularizing the pixels in FIG. 24B using a field-wise mean of the logarithm of the pixel values.
Figure 27A:
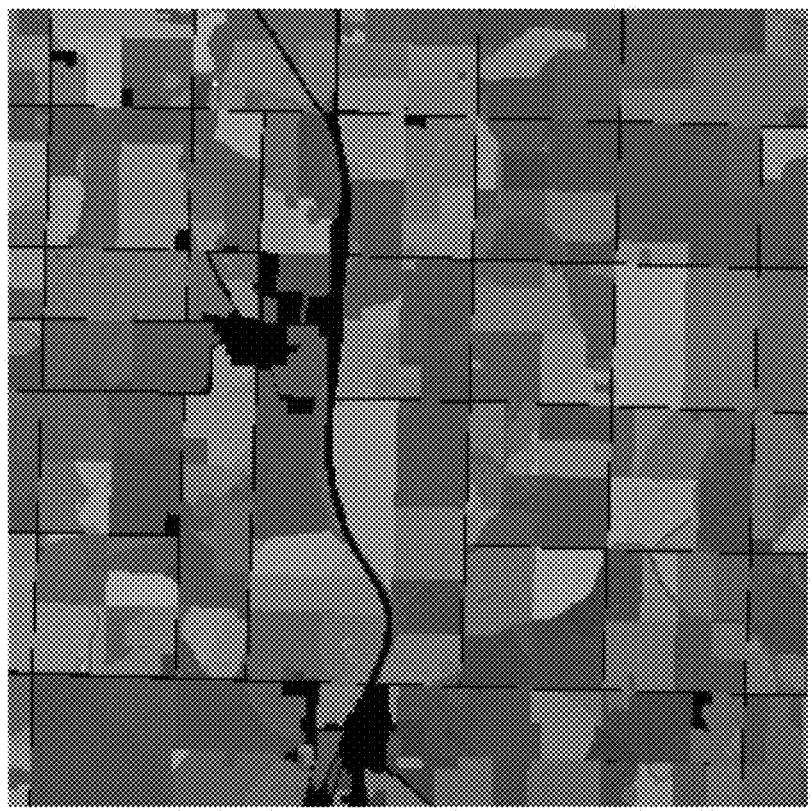
FIG. 27A depicts a result of regularizing the pixels in FIG. 24B using a field-wise median value.

One approach to using a boundary map such as boundary map 2500 to reduce noise in an image such as image 24B is shown in FIG. 26 and is an embodiment of process 2300. In various embodiments, process 2600 is performed by denoiser 334. One example way to implement denoiser 334 is as a set of Python scripts incorporating the open-source libraries NumPy and SciPy. The process begins at 2602 when an image to be denoised (e.g., image 2450) and a boundary map (e.g., boundary map 2500) are received. At 2604, for each field in the boundary map, a regularized value (or set of values, where data for multiple spectral bands is present at each pixel) is determined using pixels in the received image that are located within the field. An image comprising the constrained values is generated as output at 2606. As one example of the processing that can be performed at 2604, a mean value (or set of values, where the image is multi-spectral) can be determined across the pixels in the received image that correspond to a given field in the boundary map. The noise distribution of SAR often has outliers. Accordingly, instead of a mean value, a median value can also be used (e.g., to reduce the impact of outlier pixel values in the received image). FIG. 27A depicts a result of regularizing the pixels in FIG. 24B using a field-wise median value. FIG. 27B depicts a result of regularizing the pixels in FIG. 24B using the field-wise mean of the logarithm of the pixel values (per the multiplicative Gaussian model). The results shown in FIGS. 27A and 27B are not identical but are both similar and reasonable ways to reduce SAR noise.

V. Additional Platform Detail

Figure 28:
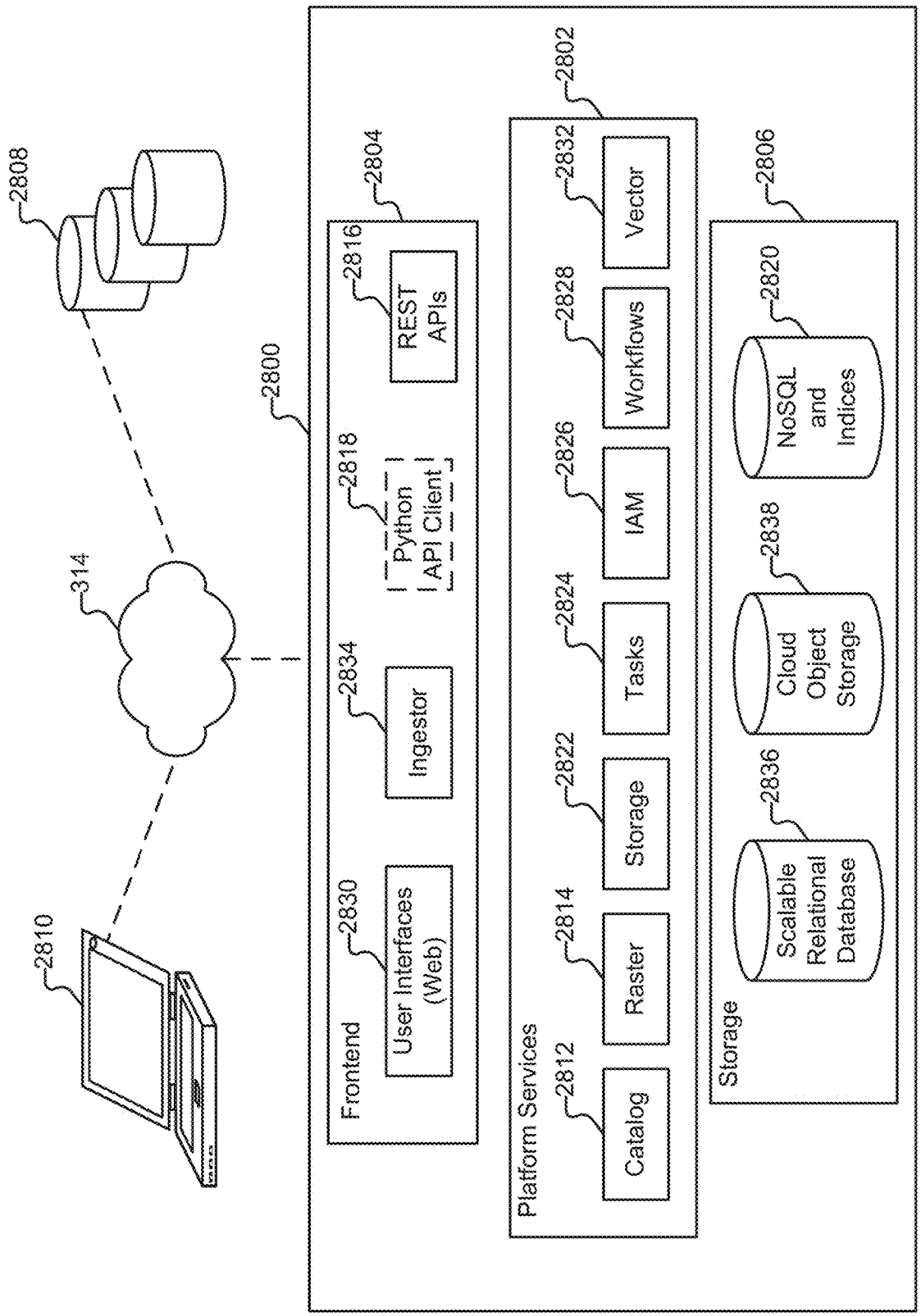
FIG. 28 illustrates an embodiment of a platform for processing and analyzing data in accordance with various techniques described here.

FIG. 28 illustrates an embodiment (2800) of platform 302 that makes available a set of platform services 2802 which can be used to support various applications. An example of such an application is thermal anomaly detection and classification, described in more detail below. Platform services 2802 can be implemented in a variety of ways. One example is as a set of microservices on a container orchestration cluster (e.g., built using the Flask micro web service framework with Kubernetes). The services can be accessed via REST APIs 2816 and/or an API client 2818 (e.g., implemented using Python). Platform services 2802 make use of a variety of types of storage 2806. These include a scalable relational database 2836 (e.g., Postgres or MySQL server), cloud object storage 2838 (e.g., Amazon S3, Google Cloud Storage, or Microsoft Azure Blob), and/or a key value pair store and associated indexing capabilities 2820 (e.g., Apache Cassandra, Amazon DynamoDB, Redis, or Elasticsearch).

Platform 2800 includes a set of interfaces 2804. Ingest interface 2834 is an embodiment of ingestor 308 and can be used to ingest a variety of types of data (e.g., raster data, point data, and LiDAR data) from a variety of sources 2808 (e.g., Sentinel-1 data from ESA and MODIS data from NASA). For a given ingestion action, ingestor 2834 selects an appropriate ingestion pipeline (e.g., implemented as a Python script) applicable to the data source. Users can also provide their own data to platform 2800 (e.g., using client device 2810) using an API made available by ingestor 2834. As applicable, platform 2800 processes the ingested data (e.g., uncompressing/recompressing, normalizing, applying data corrections, restructuring band order, etc.), stores the data in an appropriate location, and registers it with Catalog service 2812.

Catalog service 2812 is a repository of georeferenced images that provides a query language for performing searches. In an example embodiment, catalog service 2812 supports three types of classes: images, bands, and products. An image (represented by the class "Image" in the API) contains data for a shape on earth, as specified by its georeferencing. An image references one or more files (e.g., TIFF or JPEG files) that contain the binary data conforming to the band declaration of its product. A band (represented by the class "Band" in the API) is a 2-dimensional slice of raster data in an image. A product includes at least one band and all images in the product conform to the declared band structure. For example, an optical sensor will commonly have bands that correspond to the red, blue, and green visible light spectrum, which can be rastered together to create an RGB image. A product (represented by the class "Product") is a collection of images that share the same band structure. Images in a product can generally be used jointly in a data analysis, as they are expected to have been uniformly processed with respect to data correction, georegistration, etc. For example, multiple images from a product can be composited to run a process over a large geographic region. Some products correspond directly to image datasets provided by a platform, such as the Landsat 8 Collection 1 product which contains all images taken by the Landsat 8 satellite, is updated continuously as it takes more images, and is processed to NASA's Collection 1 specification. A product can also represent data derived from multiple other products or data sources—some may not even derive from Earth observation data. A raster product can contain any type of image data as long as it is georeferenced.

Raster service 2814 performs two general tasks: retrieving data from storage 2806 and providing a consistent way of splitting that data into smaller tiles. Examples of methods provided by raster service 2814 include "ndarray," "stack," and "raster," which retrieve raster data and return them either in an NumPy array or, for raster, an image file. The methods accept a list of image identifiers, which can be found by using Catalog 2812, and support rescaling, resampling, reprojecting, clipping, resizing, selecting bands of interest, and converting data type of the imagery in a single call.

Storage service 2822 persists data to backend storage objects. It provides a mechanism to store arbitrary data and later retrieve it using key-value pair semantics. A few example ways in which storage service 2822 can be used include: storing an auxiliary dataset useful for a particular analysis, storing custom shapes for regions of interest for an application, and uploading raster data that can later be registered via Catalog service 2812. An example interaction with storage service 2822 would be composed of a PUT API call to set a blob (chunk of bytes) to a key, then retrieve that data using a GET API call referencing the same key. There are several storage types that can be chosen when interacting with the Storage service 2822: "data," "tmp," "products," "result," and "logs." The "data" storage type is a default storage type. The "tmp" storage type is for temporary assets, and may be deleted after a given time period (e.g., seven days). The "products" storage type is for storing raster data. The "result" and "log" storage types are where the output and logs are stored from task processing.

Tasks service 2824 provides scalable compute capabilities to parallelize computations. In an example embodiment it works by packaging users' Python code and executing the code on hosted cloud infrastructure nodes. These nodes are able to access imagery at extremely high rates of throughput which, paired with horizontal scaling, allow for the execution of computations over nearly any spatio-temporal scale.

Identity and Access Management (IAM) service 2826 provides for user identity and access management. An example way to implement IAM service 2826 is as a third party identity provider (e.g., AuthO, Ping, or Okta).

Workflows service 2828 provides a computation engine for inventing and quickly deploying geospatial analyses. Users can use Workflows service 2828 to develop processes, interactively see changes recomputed on the fly, and run them at scale. One feature of the Workflows service 2828 is live visualization on an interactive map (e.g., as provided via a web interface 2830). In an example embodiment, users can build custom interactive tools with Workflows 2828 using ipywidgets and ipyleaflet in Jupyter notebooks. And, data can be retrieved as NumPy arrays or native Python types to use with other libraries. Workflows service 2828 also has an Array type that's intercompatible with NumPy, so complex numerical operations can be expressed without requiring users to learn new syntax.

Vector service 2832 allows users to store vector geometries (points, polygons, etc.) along with key-value properties, and query that data spatially and/or by properties. It can be used for data at the scale of millions to billions of features. An example use for Vector service 2832 is for storing the output from Tasks service 2824 (e.g., a computer vision detector might be run in thousands of tasks over many years of data across a continent; the objects it detects can be saved as features for later querying and analysis using Vector service 2832).

VI. Radiometric Terrain Correction

Using techniques described herein, embodiments of platform 2800 can be used in conjunction with radiometric terrain correction, e.g., using a static correction layer for transforming SAR Sigma0_E that is generated by a Sentinel-1 geocoder module (e.g., provided by platform 2800) to Radiometric Terrain Corrected Gamma0_T observations; this global static layer may be generated using ESA's SNAP tool.

One motivation for generating a static correction layer is the fact that the orbits of the Sentinel-1 mission are well controlled (~250 m tube) to enable TOPS interferometry. This ensures that the imaging geometry does not vary significantly between repeat passes.

When performing radar imaging, electromagnetic (EM) waves are sent from the satellite in space and directed toward the surface of the Earth. The EM waves bounce off of the surface, some of which are reflected back to the satellite and captured in an image (e.g., SAR (synthetic-aperture radar) image). While the same material (e.g., vegetation) may be on flat terrain versus sloped terrain, from the perspective of the radar, if the sloped terrain is facing more directly at the satellite (where the satellite may be angled relative to the surface) as compared to flat terrain, then the same material will appear, from the satellite's perspective, brighter on the sloped terrain as compared to that on flat terrain as more energy is reflected back towards the satellite. That is, what is observed by the radar is a combination of not only what is on the surface, but also how it is oriented with respect to the surface.

In some embodiments, performing radiometric terrain correction includes removing the component that is due to the geometry of the terrain, leaving behind what is due to the material on the surface. For example, if vegetation mapping on sloped terrain is being performed, the backscatter contribution due to the orientation of slopes is nominally removed, and only the reflections due to the trees on the hill remain. In this way, the topography of the ground is decoupled from what is on the surface (where what is on the surface is of interest and whose scattering of the radar signal is of interest). This allows for changes in material on the surface to be detected. For example, by performing radiometric terrain correction, if deforestation occurs, changes in backscattering due purely to the change in the amount of forest/vegetation over time may be isolated and determined in a way that is decoupled from backscattering that is due to the slope of the terrain (and the way that the image was taken). For example, suppose a first image of an area of interest was taken from a first angle (or perspective), and a second image of the area of interest was taken from a second angle (or perspective). After applying the appropriate corrections, the effect of geometry/terrain will be compensated for, and the two corrected images will appear as if they were taken from the same perspective (e.g., top down). If the two corrected images were taken at different times, then their difference can be determined in a manner that reflects changes on the ground (and not differences due to geometry/terrain effects). Radiometric terrain correction may also be used in other contexts, such as to facilitate agricultural monitoring.

Figure 29:
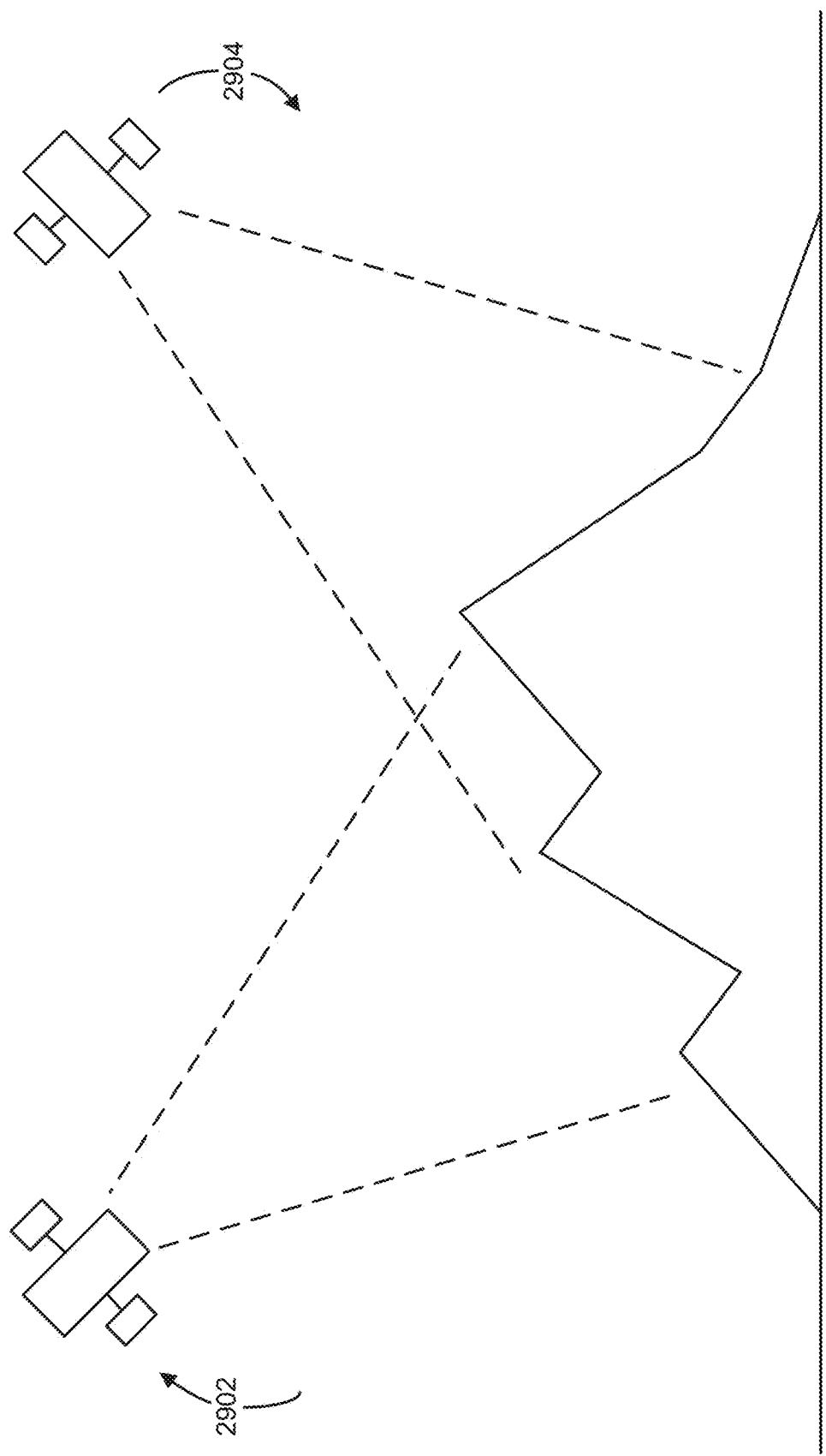
FIG. 29 illustrates an embodiment of imaging an area of interest from different geometries/satellite positions.

FIG. 29 illustrates an embodiment of imaging an area of interest from different imaging geometries/satellite positions. In this example, a satellite is shown imaging (e.g., radar imaging) the same area of interest (e.g., portion of the Earth) during an ascending pass (2902) and a descending pass (2904). Although the same area of interest is being imaged, because of the differences in image acquisition geometry (e.g., the relative position of the satellite to the area of interest in the ascending pass versus the descending pass), the captured images of the same area of interest will appear to be different.

Figure 30B:
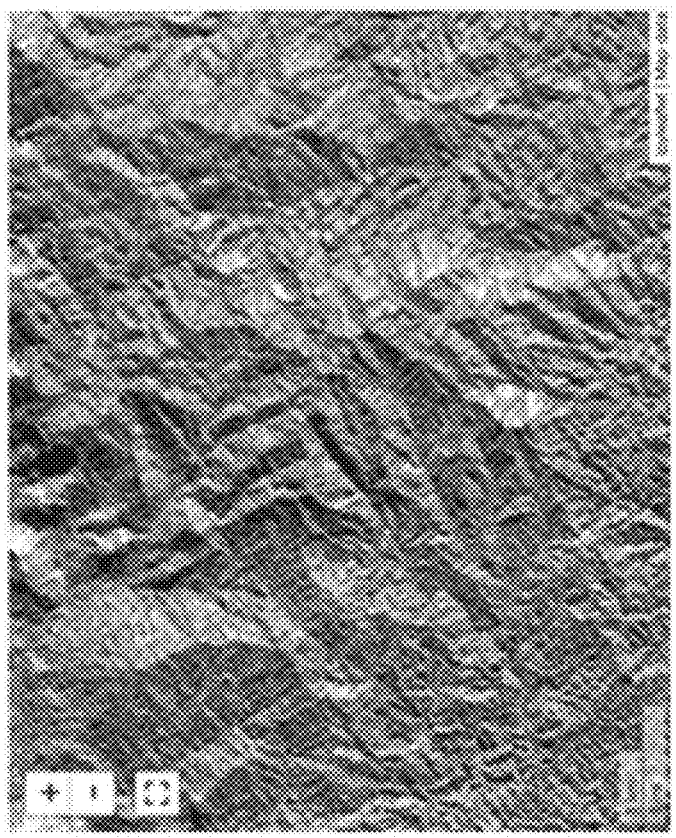
FIGS. 30A-30B illustrate embodiments of imaging an area of interest.
Figure 30A:
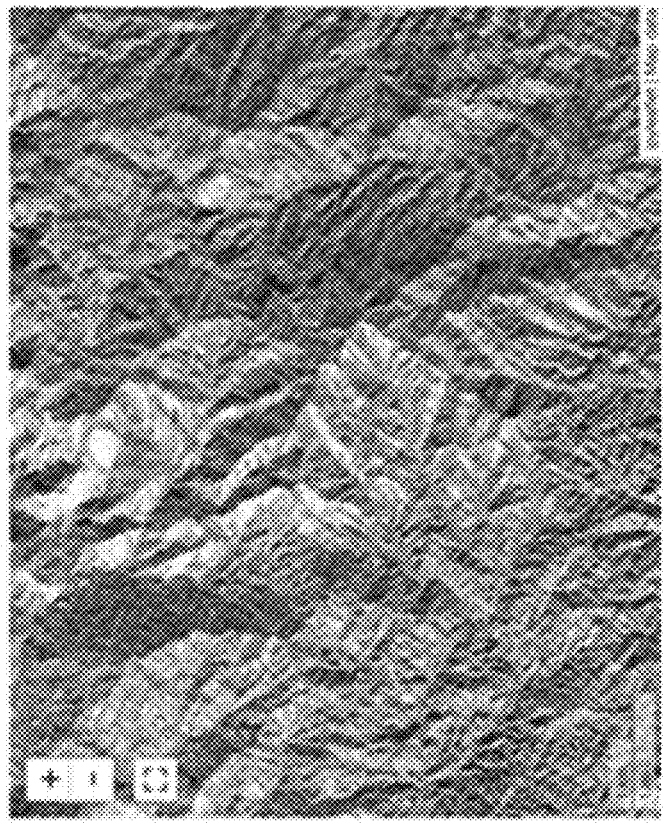

FIGS. 30A-30B illustrate embodiments of imaging an area of interest. Examples of radar imagery over Sulawesi, Indonesia (hilly terrain) is shown. In FIG. 30A, an ascending pass with illumination from the West is shown. In FIG. 30B, a descending pass with illumination from the East is shown. As shown in this example, the same area of interest looks completely different when imaged from different geometries/satellite positions. This makes it difficult to compare imagery acquired from different geometries with each other and detect changes on the ground.

Figure 31B:
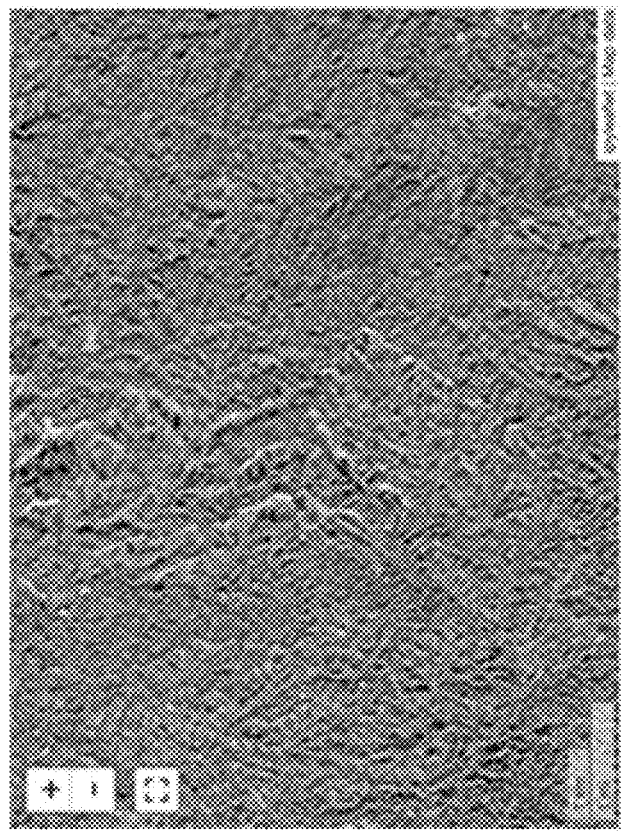
FIGS. 31A-31B illustrate embodiments of radiometric terrain correction.
Figure 31A:
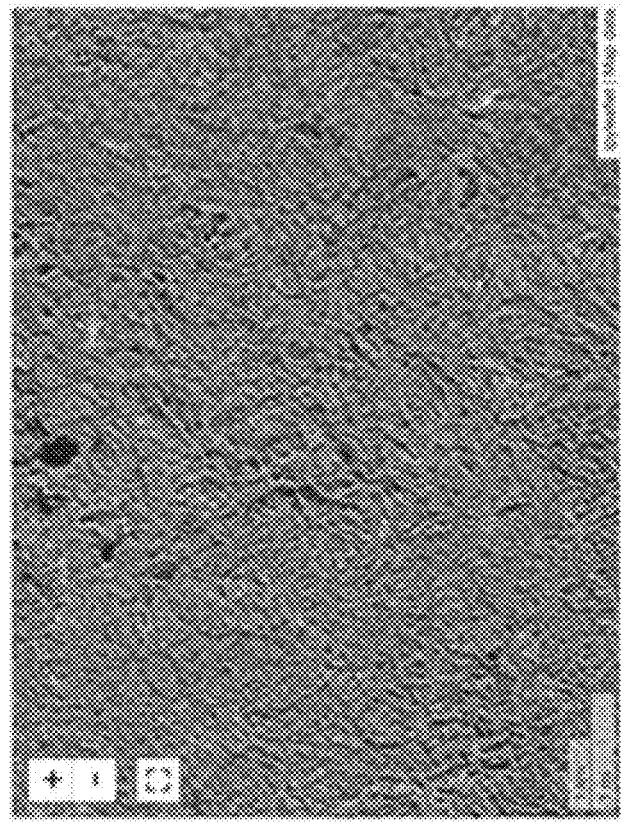

Radiometric terrain correction may be used to attempt to transform each captured image to look like it was imaged from straight up. FIGS. 31A-31B illustrate embodiments of radiometric terrain correction. In this example, terrain correction is applied to the captured images of FIGS. 30A and 30B. FIG. 31A illustrates an embodiment of a terrain corrected ascending pass with illumination from the West, corresponding to a terrain corrected version of the image of FIG. 30A. FIG. 31B illustrates an embodiment of a terrain corrected descending pass with illumination from the East, corresponding to a terrain corrected version of the image of FIG. 30B. As shown in this example, the terrain corrected images are now comparable. By correcting the images of the area of interest to appear as if they were all taken from the same imaging geometry/perspective (e.g., as if they were all acquired from looking vertically down from space, irrespective of the imaging geometry and where the satellite had been), a coherent collection of images may be created for performing various processing, such as detecting changes to the area of interest.

In existing approaches for radiometric terrain correction, for every incoming image, terrain correction is performed on the incoming image, followed by geocoding. In such traditional approaches, the computationally expensive step of performing terrain correction is run for every incoming image.

Using embodiments of the correction techniques described herein, the terrain correction step need only be run once per imaging geometry (or perspective). In some embodiments, a single image is used as a reference, and the geometric correction factor is computed. The same correction factor is then reused for all images acquired from that imaging geometry (or perspective).

Figure 32:
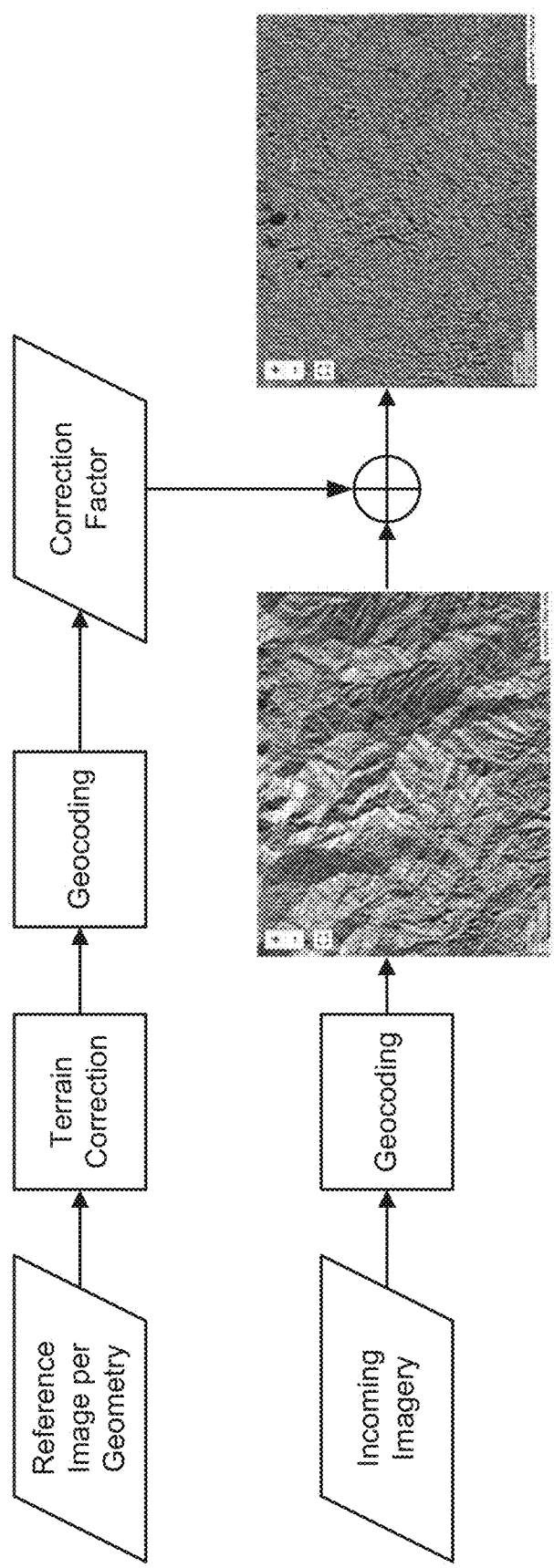
FIG. 32 illustrates an embodiment of terrain correction.

FIG. 32 illustrates an embodiment of terrain correction. The terrain approach shown in the example of FIG. 32 (embodiments of which are described in further detail below) is more computationally efficient than existing correction approaches, as the relatively computationally expensive terrain correction step is only run once per reference image, and not for every incoming image, as in existing correction techniques. Rather, only the relatively computationally cheaper geocoding step need be performed for each incoming image in embodiments of the terrain correction approach described herein. In contrast to existing terrain correction approaches, the improved terrain correction approaches described herein have the benefit of significantly reducing usage of computational resources (e.g., reduction in the number of processors needed, as well as a reduction in the amount of processing time needed). The saving of computational and processing resources has further benefits, such as allowing the use of smaller machines, instances, etc. to process incoming imagery. Further, as another example benefit, correction factors may be recomputed with newer/improved algorithms if needed without requiring reprocessing large archives.

Figure 33:
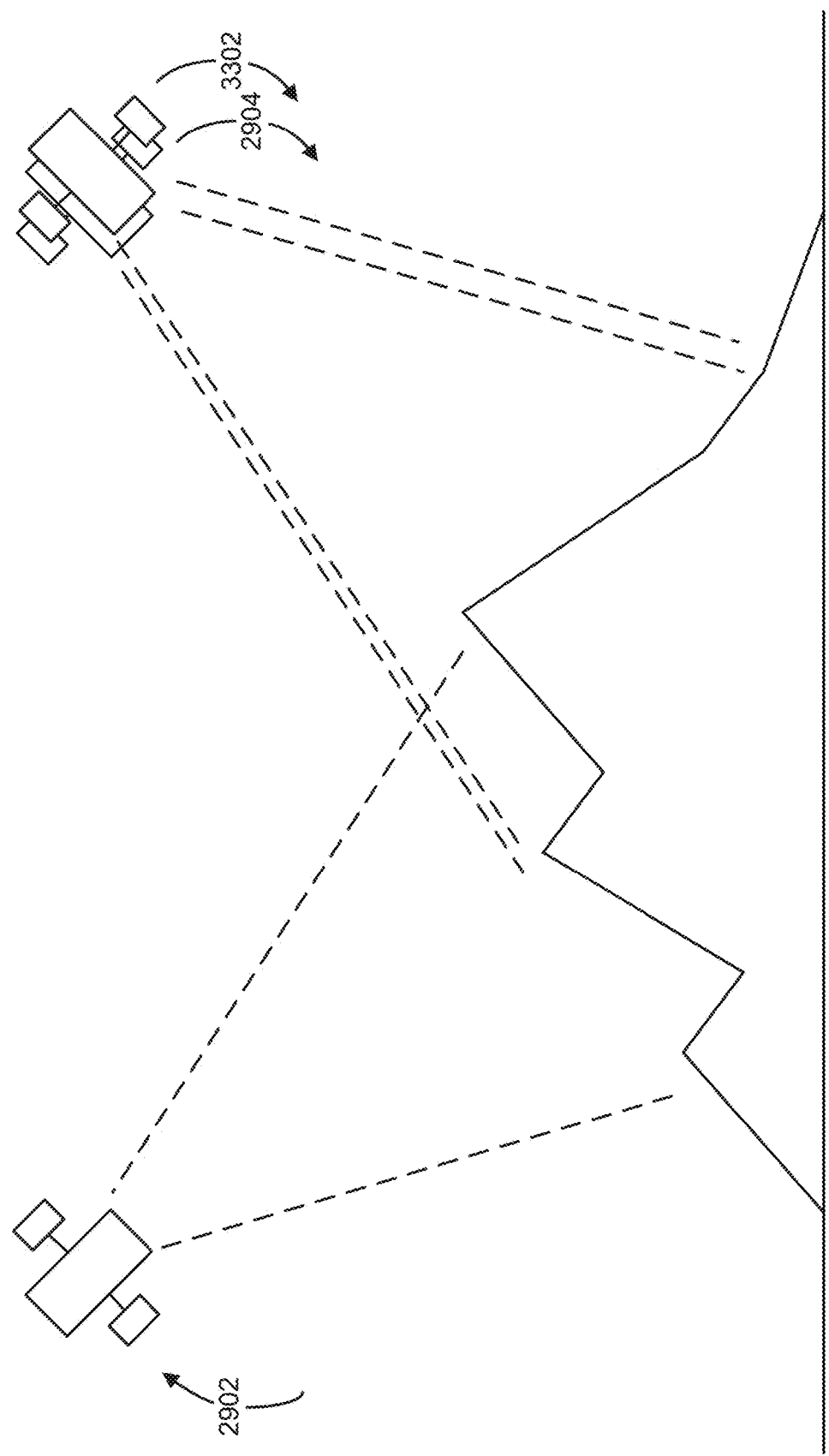
FIG. 33 illustrates an embodiment of performing terrain correction by image acquisition geometry.

FIG. 33 illustrates an embodiment of performing terrain correction by image acquisition geometry. The example of FIG. 33 continues from the example of FIG. 29. In this example, suppose that a correction factor had been generated and stored based on the imaging geometry for capturing of the image of the area of interest during ascending pass 2902. Similarly, suppose that a different correction factor had been generated and stored based on the imaging geometry for capturing of the image of the area of interest during descending pass 2904.

Now, suppose that the satellite captures another image of the area of interest during another descending pass 3302. The imaging geometry for this pass 3302 is similar to the imaging geometry for pass 2904. In this example, rather than performing terrain correction again on the newly captured image (as would be done in existing terrain correction techniques), using the techniques described herein, the correction factor that had been generated for pass 2904 may be retrieved and applied to the image captured during the second descending pass 3302 to perform terrain correction. In this way, the same correction factor is reused for all images acquired from the same or similar image acquisition geometry. In some embodiments, to facilitate this, all geocoded imagery and terrain correction factors are generated on a pre-defined common grid (e.g., 10 meter grid in UTM (Universal Transverse Mercator) coordinates)

Here, for example, the precise control of satellite orbits for satellites such as Sentinel-1 (as well as for upcoming satellites such as NISAR) is leveraged, as the next time an image is taken from a certain side of an object/area of interest, the satellite will be relatively close to where it had been the last time it had been on that same side of the object/area of interest (e.g., the satellite, which imaging the same area of interest, will be in relatively the same location from one descending pass to the next descending pass, or from one ascending pass to the next ascending pass). That is, from the perspective of imaging geometry, the difference between the two positions of the satellite during passes 2904 and 3302 when imaging the same area of interest is relatively negligible (while the satellite may be very close to the same position, the camera may have moved slightly, such that the pixels between two images do not necessarily line up—geocoding is used to perform alignment of pixels to adjust this—however, given the distance of the satellite from the ground, the difference in angle from which the images were captured will be relatively negligible, such that the image acquisition geometry is effectively the same). In this way, the determination of the correction factor need only be performed once per imaging geometry. Once it is determined what the correction factor should be for a given imaging geometry, the same correction factor may be applied efficiently for every image taken or acquired by the satellite from that imaging geometry. For example, correction factors are generated and stored, where the correction factors are labeled or indexed by image acquisition geometry. Uncorrected images, when stored, are associated with the same image acquisition geometry (e.g., by naming the uncorrected image based on its imaging geometry or including metadata information describing the corresponding image acquisition geometry). When performing correction on uncorrected images, the images may be clustered by image acquisition geometry. The correction factor for that image acquisition geometry is then applied (e.g., as an additive layer) to all images in the cluster of images that share the same image acquisition geometry to perform terrain correction.

The following are further embodiments of acquisition geometry-based radiometric terrain correction.

Figure 34A:
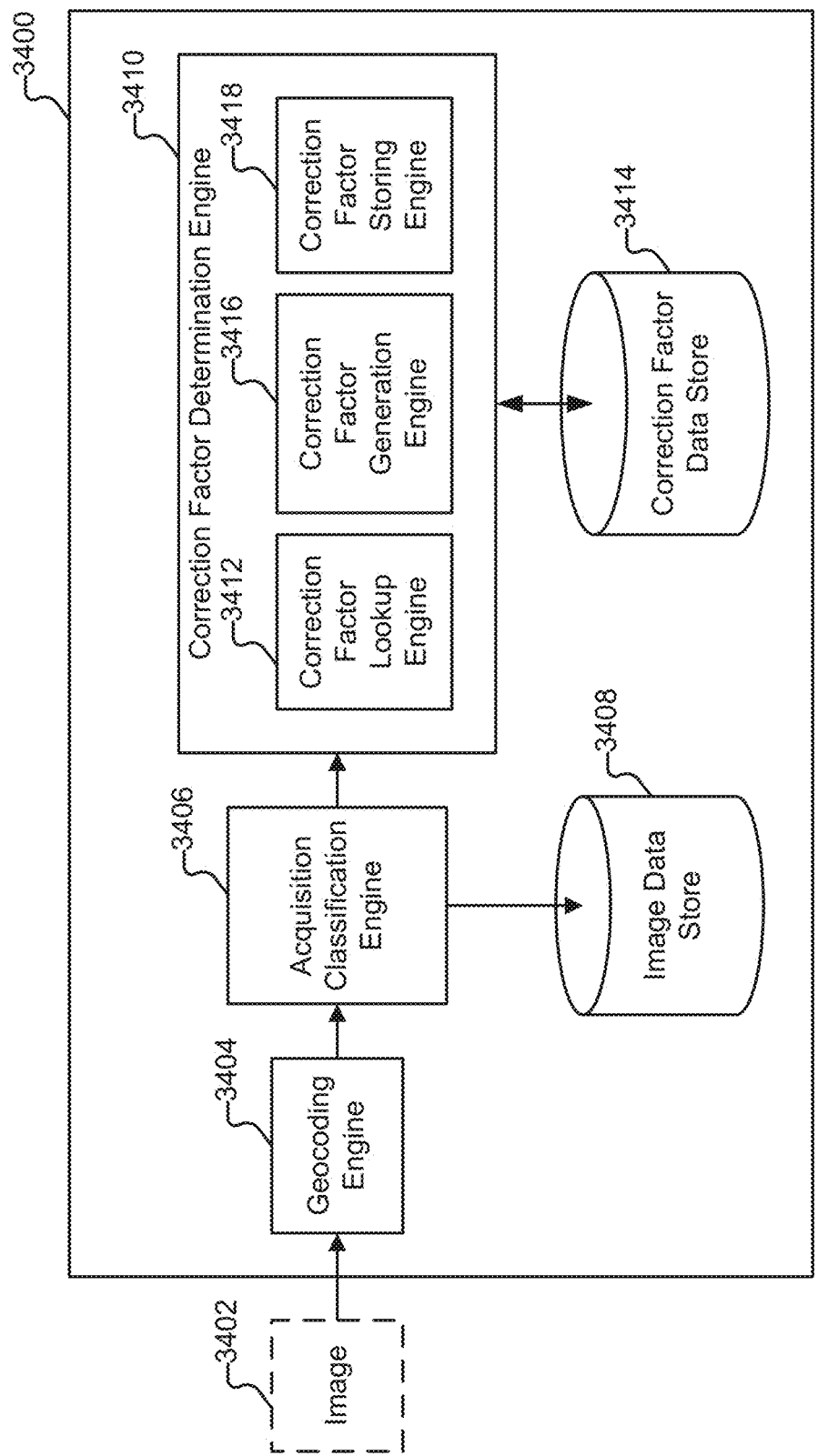
FIG. 34A illustrates an embodiment of a system for acquisition geometry-based radiometric terrain correction.

FIG. 34A illustrates an embodiment of a system for acquisition geometry-based radiometric terrain correction. In some embodiments, system 3400 is an alternative view of platform 2800. In this example, system 3400 is configured to store incoming imagery, as well as determine/store correction factors based on acquisition geometry. For illustrative purposes, examples of system 3400 are described in conjunction with the example of FIG. 33.

First Correction Factor for an Acquisition Geometry:

In this example, suppose that an image 3402 was captured during descending pass 2904. The image 3402 includes an uncorrected image (where terrain correction has not yet been applied, such as image 30A). The image also includes acquisition/collection geometry metadata, which includes metadata describing how the image was acquired by the satellite.

In some embodiments, geocoding engine 3404 is configured to perform geocoding on the image. In some embodiments, geocoding includes aligning the image. This may include assigning, to each pixel in the image, a geocoordinate, such as a latitude and a longitude.

Acquisition classification engine 3406 is configured to determine an acquisition classification of the image. In some embodiments, this includes extracting or otherwise obtaining the collection geometry metadata provided along with the image. In some embodiments, the acquisition geometry metadata comprises one or more state vectors that indicate the position and/or velocity of the satellite when it acquired the image being processed. In some embodiments, the acquisition classification is a classification of the acquisition geometry for the image.

In some embodiments, the acquisition classification (also referred to herein as a "footprint" or a patch of ground relative to the satellite's location) is generated from the acquisition geometry metadata for the image. As one example, the acquisition classification is generated based on orbit information, such as orbit pass number, track number, etc. In some embodiments, the acquisition classification is also generated based on timing information associated with the image acquisition, such as the time since the satellite passed the Equator (e.g., going North) when the image was acquired. This may be used to distinguish, for example, whether the image was captured during an ascending pass or a descending pass. Such timing information may also be indicated as a "frame" for NISAR imagery. In some embodiments, if available, a swath identifier may also be used (as in the case of Sentinel-1 imagery).

In some embodiments, the image (which in some embodiments is also aligned) is stored or written to image data store 3408. The acquisition classification for the image is also associated with the image. For example, the acquisition information is stored as metadata for the image. In some embodiments, the image is labeled with the acquisition classification. In other embodiments, the image is indexed by acquisition classification (e.g., one or more of orbit track, time since equator, and/or swath), where the acquisition classification may be used as a key to perform a lookup of images with the same acquisition classification. As will be described in further detail below, the acquisition geometry may be used to determine an appropriate correction factor to apply to the image.

In some embodiments, correction factor determination engine 3410 is configured to determine whether a correction factor for the imaging geometry already exists. If not, then a correction factor is generated for the collection geometry.

Correction factor lookup engine 3412 is configured to perform a lookup of correction factor data store 3414 to determine whether there is a previously determined correction factor that corresponds to the collection geometry. In some embodiments, correction factors in the correction factor data store are indexed by acquisition classification (e.g., where the acquisition classification may be used as a key to perform a lookup of a correction factor corresponding to the footprint).

If a correction factor corresponding to the acquisition classification already exists, then a correction factor need not be re-computed. Later on, if the uncorrected image is to be corrected, its footprint may be used to obtain the corresponding correction factor from data store 3414, where the correction factor may then be applied. If it is determined that a correction factor corresponding to the acquisition classification does not exist, then correction factor generation engine 3416 is configured to generate a correction factor corresponding to the acquisition classification.

In this example, suppose that for the image captured during the descending pass 2904, there is no existing correction factor corresponding to the acquisition classification for that image. In some embodiments, the correction factor is generated using the image 3402 as a reference image, including by using the acquisition classification, as well as a digital elevation model (DEM), which includes a topographical map of the Earth that includes the area of interest captured by the image. The acquisition geometry metadata and the digital elevation map are representations of the imaging geometry, and are used to estimate the correction factor. In some embodiments, a range-Doppler mapping is used to determine an appropriate elevation map for the image. For example, the latitude/longitude of each pixel in the image is determined (e.g., by alignment using geocoding engine 3404). The lat/long coordinates of the pixels are used to determine where the imaged area lies in a digital elevation map. The digital elevation model (also referred to as a terrain model) is used to determine the angle of the surface/ground at every point/coordinate where it is hit by radar (e.g., during the radar imaging), where the angle of the ground that is being imaged by radar will affect the amount of radar backscatter that occurs.

In some embodiments, when mapping the image to a digital elevation model, not only are points (e.g., pixels) in the image aligned (e.g., to the correct geo-coordinates), the effect of the slope on the brightness at a point corresponding to a pixel (which is indicated by the DEM) is determined. In this way, the digital elevation model is used to not only place a point, but also indicate the contribution of the surface geometry at that point to the radar brightness of the pixel. For example, the DEM indicates, at a given lat/long, the slope at that coordinate. The captured image is a set of pixels. In some embodiments, each pixel is aligned or mapped to a specific coordinate. In this way, a specific pixel in the image may be mapped to a corresponding appropriate coordinate and slope value for that coordinate in the DEM. The brightness of the pixel may then be corrected for the slope at that pixel/geo-coordinate (e.g., the contribution of the observed radar backscatter due to the slope for that image pixel may be determined, and then corrected for).

As described above, the correction factor is performed once per encountered imaging geometry/acquisition classification. If an acquisition geometry/classification is encountered again, the correction factor generation processing need not be performed again. For example, the determination of how much the slope at a certain point affects the brightness of an image is performed once per stack of images (that share the same imaging geometry).

As described above, while the variation in an orbital pass (e.g., ascending or descending pass) is enough to cause shifts in pixels (for which geocoding is used to align imaged pixels to the appropriate coordinates), because the satellite is far from the ground (e.g., 1,000 kilometers away), even if the satellite is shifted by several hundred meters from one pass to the next, while that may shift the pixels (and necessitate geocoding), it is not sufficient to shift the angle from which the satellite is observing the surface in any substantial way.

That is, while the process of aligning the pixels captured from the satellite's frame of reference (e.g., mapping the pixels to ground coordinates) is performed for every image, from the perspective of the pixels on the ground, the satellite is "seen" to be at almost the exact same location in the sky (the angle is effectively the same). Here, the images of an area of interest that are taken between different instances of the same type of pass (e.g., ascending or descending pass) may vary enough to require pixel realignment (i.e., geocoding). However, the variation in angle between captures of the area of interest in different passes does not vary enough to cause the effect of the geometry of the surface to substantially change. Put another way, between collection passes, the pixels captured by the satellite may be shifted by several hundred meters. This may be a shift in many pixels. In various embodiments, alignment is performed prior to correction so that a pixel may be appropriately corrected with the appropriate topographical information (as, prior to alignment, the same two pixel indices in two different images may not map to the same set of coordinates, and thus the correction factor for the same pixel index should be different for the two images).

That is, even though the satellite may not be in the exact same position from pass to pass, leading to a shift in the geocoordinates that pixel indices map to, the angle (which affects terrain correction) does not vary as much, allowing the same static correction factor to be applied for images collected from the same acquisition geometry.

Thus, even if the satellite is moving around, it is still observing the same spot on the ground from almost the same angle. By considering the perspective of a given pixel on the ground, then the same correction factor may be used from collect to collect (from a pass of one type to another subsequent pass of the same type) for the same acquisition geometry. This is leveraged to determine a static, per-acquisition geometry correction factor that may be computed once per acquisition geometry. For example, for a given pixel, the radar backscattering measured for that pixel may be corrected to remove the contribution due to the geometry of the terrain at the geo-coordinates corresponding to that pixel. When the correction factor is applied to the uncorrected image, the resulting corrected image will appear as if the imaged area had been imaged by the satellite from top-down (rather than at an angle).

In some embodiments, correction factor storing engine 3418 is configured to store the generated correction factor to correction factor data store 3414.

In some embodiments, storing the correction factor includes storing the correction factor at an index that is based on acquisition geometry/classification (where the acquisition classification may be used as a key to access and retrieve the correction factor/layer). For example, every correction factor that is generated is indexed by footprint. As one example, the correction layer is stored (or labeled/named) with an identifier that matches to the identifier stored with the image. This links or associates the image with its corresponding correction factor. For example, both the image and its corresponding correction factor share a common acquisition classification. When the image is to be corrected, the acquisition classification for the image may be used to identify the corresponding correction factor to apply to perform the correction. Further, the next time an image is acquired that has the same footprint, the image may be corrected by performing a lookup of the corresponding correction factor based on the footprint (rather than having to perform the terrain correction from scratch).

In some embodiments, the correction factor or layer has the same format as the image. For example, the correction factor is stored as a layer that may be added or subtracted from an uncorrected image to generate a corrected image. For example, the correction factor is stored as the same size as captured images, with the same number of pixels. As one example, if images are stored as a two-dimensional (2-D) array of pixels, the correction factors are also stored as 2-D arrays of pixels. This provides various benefits. For example, when correction is to be performed, the correction factor may be added or subtracted directly to/from an image (e.g., by adding/subtracting by pixel).

Further, for all images with the same image collection geometry, the same correction factor may be applied to the stack of images with the same collection geometry. As described herein, although there are many images that may share the same collection geometry, the collection geometry need only be computed once, where the correction factor may then be applied as a static layer to any images that share the same acquisition classification.

In some embodiments, a local incidence angle is also stored for the correction factor, as it is representative of what the terrain looks like to the satellite in that acquisition geometry, where the local incidence angle may be useful in interpretation, or for other models, or as input to other models.

In some embodiments, a shadow layover mask is also stored with the correction factor, which may be used for correcting radar imagery. For example, suppose a mountain, where the mountain is imaged from the side. What is behind the mountain will not be seen and is in the shadows. In some embodiments, the shadow layover mask is used to determine what is visible and not visible. This may be used to speed up certain types of processing, where portions of the ground corresponding to parts of the surface that are not visible may be ignored during analysis.

As shown in the above example, two entries are created. First, the uncorrected (and in some embodiments, aligned) new image (image without terrain correction) is stored to image data store 3408. The generated correction factor is stored to correction factor data store 3414, where the correction factor is usable for that new image and any successive image that falls in the same footprint. In some embodiments, both the image and the correction factor are associated with each other by the acquisition classification (which is generated based on imaging geometry such as orbit track, time since Equator, swath, etc.).

Second Image with the Same Acquisition Classification

In this example, suppose that subsequent to the processing described above, a second, subsequent image of the area of interest is taken during descending pass 3302. In this example, the second image is aligned using geocoding engine 3404. The acquisition classification (e.g., footprint) for the second image is determined using acquisition classification engine 3406. A lookup is performed by correction factor lookup engine 3412 to determine whether there already is an existing correction factor for the footprint of the second image.

In this example, a correction factor had already been generated for this footprint based on the processing of the image 3402 that had been taken during descending pass 2904. Based on the determination that a correction factor/layer for this footprint already exists, the correction estimation/generation processing is not repeated. Instead, only the alignment is performed, and the second (uncorrected) image is stored to image data store 3408. In some embodiments, the second image is associated with the previously determined correction factor. As one example, the second image is labeled such that its name matches the index of the correction factor (e.g., labeled with a common or same name, such as the footprint). As another example, the second image is stored with metadata that includes a reference to the index with the corresponding correction factor. For example, the stored second image is associated with at least one of the orbit track, time since equator crossing in ascending direction, and/or swath information that is representative of the acquisition classification. In this way, the first image, second image, and corresponding correction factor share a common identifier (e.g., the acquisition classification) as a link or association, where the system leverages that the digital elevation model, and consequently, the geometric correction will be the same from collect to collect (e.g., for each pass of the same type). For example, the first image from the first descending pass and the second image from the second descending pass will be stored with the same acquisition classification, and will be part of one "stack" of images that share the same imaging geometry, and for which the same correction factor can be applied.

Applying a Correction Factor

Figure 34B:
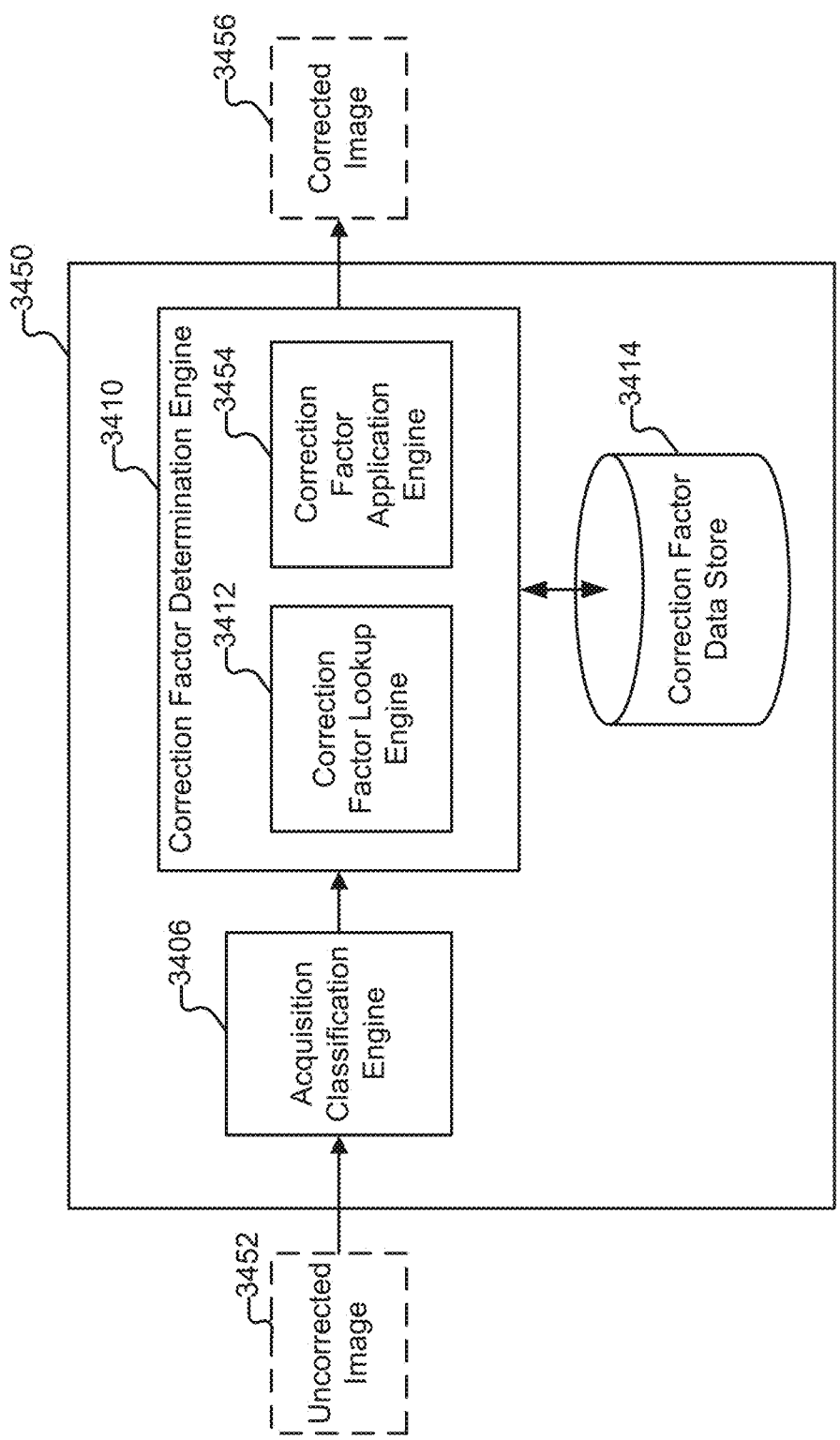
FIG. 34B illustrates an embodiment of a system for applying correction factors.

FIG. 34B illustrates an embodiment of a system for applying correction factors. In this example, suppose that a user has selected a set of images to view. The end user would like to perform radiometric terrain correction on the set of images. System 3450 is configured to perform the correction. In some embodiments, system 3450 is an alternative view of platform 2800. As described above, uncorrected images are stored in a manner (e.g., labeled with file names) that associates them with acquisition classification identifiers that are also used to index correction factors. This allows the appropriate correction factor matching to an uncorrected image to be identified based on footprint.

In some embodiments, the platform abstracts away matching of file names or the underlying management of the association between images and correction factors to allow end users to focus on the operations that they would like to perform.

As one example workflow, a user indicates an interest in a geographic region. For example, the end user draws a polygon on a map or otherwise selects or indicates a region of interest. The user may also specify a time period of interest. The user may then request that the system provide all images that correspond to the selected region and time period of interest.

The platform then returns all images that intersect with the user's indicated region of interest and that were captured during the user's indicated time period of interest. In some embodiments, the backend platform stitches or mosaics the returned images (e.g., into one array per day). The end user may then perform whatever operations they would like on the set of image arrays.

For example, the user may request, over a polygon representing an area of interest, images whose footprints/acquisition classification match for a certain track number and swath. The platform may then access image data store 3408 for all uncorrected images that match to the user's selected region/time period of interest and that are grouped by track/swath number/identifier.

The end user may then perform terrain correction by, for example, allowing the user to add correction layers as a band on top of the returned uncorrected images. The user may wish to perform the terrain correction, because the initial returned set of uncorrected images (that satisfy the user's request) includes images that are grouped by properties such as area, time, or track (or orbit number), which may include images that were taken from different passes (because two images may share the same orbit track, but have been taken on different passes with different times from the Equator), and the user would like all of the images to be corrected so that they appear as if they were captured from the same perspective.

In some embodiments, to apply the correction, the platform determines, for each uncorrected image to be corrected, the corresponding correction factor to apply. For example, referring to the example of FIG. 34B, an uncorrected image 3452 is received. For example, the uncorrected image is received from image data store 3408 in response to the user's request for images that satisfy one or more properties/criteria (e.g., area, time, orbit track, etc.). The acquisition classification for the uncorrected image 3452 is obtained. This may be computed by acquisition classification engine 3406. In another embodiment, the acquisition classification may be obtained from the name of the image if the acquisition classification (e.g., orbit number, time since equator, and/or swath) is encoded in the file name of the uncorrected image. As another example, the acquisition classification information may be included as metadata in a record for the uncorrected image in the image data store and retrieved.

In some embodiments, the correction factor lookup engine 3412 of correction factor determination engine 3410 is used to perform a lookup of correction factor data store 3414 to find the corresponding correction layer that is indexed by the acquisition classification (footprint) of uncorrected image 3452 (for example, a lookup is performed of data store 3414 using the footprint as a key). In this example, the corresponding correction factor is retrieved from data store 3414 and is applied by correction factor application engine 3454 (e.g., by adding the retrieved correction layer onto the uncorrected image 3452) to generate corrected image 3456.

Figure 35:
FIG. 35 illustrates an embodiment of a user interface.

FIG. 35 illustrates an embodiment of a user interface. In this example, an example of a visualization or representation of a correction layer is shown. In this example, as shown at 3502, the correction layer, local incidence angle, and shadow layover mask are represented as bands, similar to the way other satellite imagery is represented in the platform. This allows the correction layer and accompanying information to be accessed in the same manner as any other satellite imagery on the platform. In some embodiments, the correction layers may be added onto an uncorrected image as additional bands of information.

In some embodiments, the correction is performed on each uncorrected image in the set of uncorrected images to be corrected. In other embodiments, images in the set of uncorrected images are first grouped together by footprint (which may be determined based on the manner in which they were labeled/indexed). This results in separate groups or subsets of uncorrected images that are clustered by footprint (i.e., that share the same acquisition classification). For each unique acquisition classification, a lookup is performed of the correction factor data store for the correction factor matching to a given acquisition classification. In this way, a lookup is not performed on the correction factor data store for each and every uncorrected image to be corrected, but once for each group or stack of uncorrected images that share the same acquisition classification.

As shown in this example, corrected images may be generated dynamically, in an efficient manner. This is done by performing a lookup of the appropriate correction factor, which can then be added or subtracted to/from the uncorrected image. All images that share the same footprint are treated in the same way, with the same correction factor applied on the fly as needed.

This is an improvement over existing systems. For example, in existing systems, the uncorrected image is modified/corrected and stored, and the original uncorrected image cannot be retrieved. Using the techniques described herein, the source image may be maintained, as the correction layer is separate, and may be added or removed as desired. This has further benefits.

For example, suppose that there were changes to the digital elevation model (e.g., a change in slope), but the altitude did not change to a degree that required reperforming alignment. It would be beneficial to update the correction factors in light of this information. In existing techniques, all of the source imagery would need to be obtained again, and terrain correction would need to be recomputed for every single image. In the geometry-based correction factor determination described herein, the correction factors need only be generated once for each unique type of footprint/acquisition classification using a reference image for the acquisition classification, rather than for every single image maintained by the platform. Using the techniques described herein, the entire global correction layer may be recomputed any time a new terrain correction algorithm is used (e.g., to improve accuracy), or if there are improvements to slope estimation allowing for recalculation of correction factors, where the correction factor may be applied to all uncorrected images that have the same footprint. In this case, none of the aligned data (e.g., uncorrected images) need be rewritten.

Figure 36:
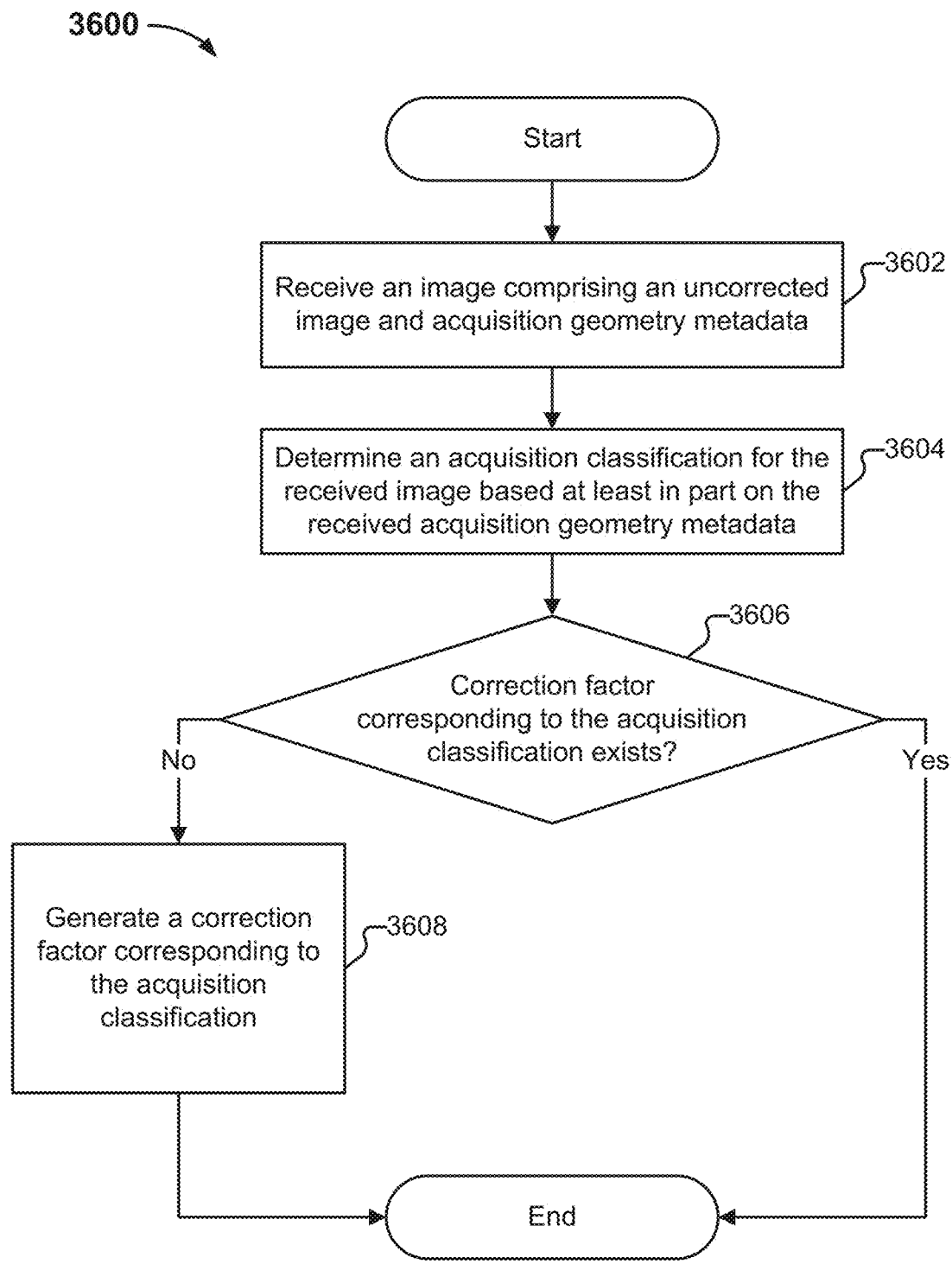
FIG. 36 is a flow diagram illustrating an embodiment of a process for determining a correction factor.

FIG. 36 is a flow diagram illustrating an embodiment of a process for determining a correction factor. In some embodiments, process 3600 is executed by system 3400 of FIG. 34A. The process begins at 3602 when an image is received that includes an uncorrected image and acquisition geometry metadata. At 3604, an acquisition classification is determined for the received image based at least in part on the received acquisition geometry metadata. At 3606, it is determined whether a correction factor corresponding to the acquisition classification exists. If a correction factor corresponding to the acquisition classification does exist, then the process ends. If a correction factor corresponding to the acquisition classification does not exist, then the process continues to 3608 where a correction factor corresponding to the acquisition classification is generated. In some embodiments, the generated correction factor is stored to a data store. In some embodiments, the generated correction factor is indexed by the acquisition classification. The received image is associated with the correction factor based at least in part on the acquisition classification.

Figure 37:
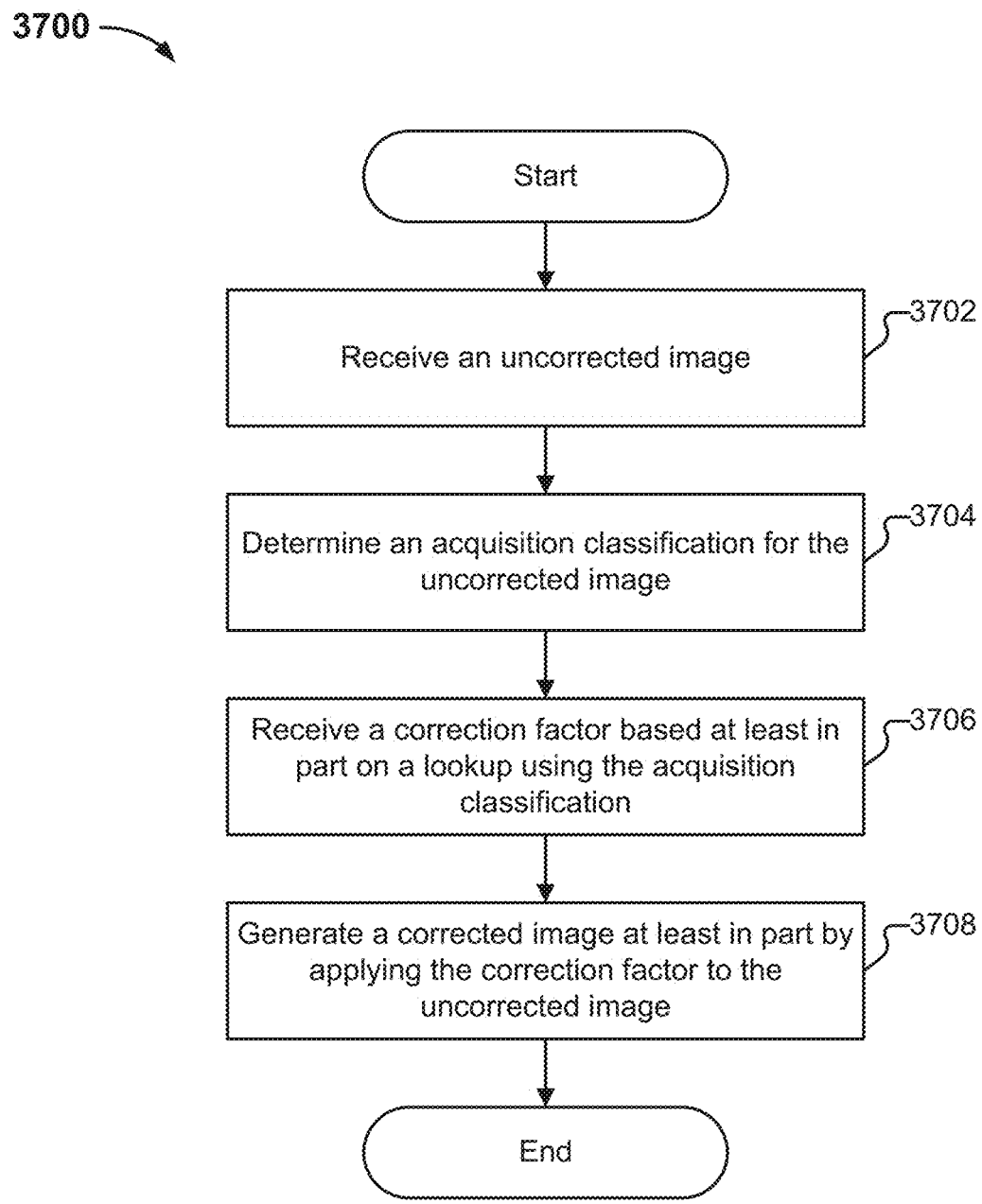
FIG. 37 is a flow diagram illustrating an embodiment of a process for applying a correction factor.

FIG. 37 is a flow diagram illustrating an embodiment of a process for applying a correction factor. In some embodiments, process 3700 is executed by system 3450 of FIG. 34B. The process begins at 3702 when an uncorrected image is received. At 3704, an acquisition classification for the uncorrected image is determined. At 3706, a correction factor is received based at least in part on a lookup using the acquisition classification. At 3708, a corrected image is generated at least in part by applying the correction factor to the uncorrected image.

Bursts

The following are embodiments of performing acquisition geometry-based radiometric terrain correction on bursts. When images are delivered from Sentinel-1, they typically include approximately 30 "bursts," which may cover an overall area. Traditionally, all 30 bursts are processed at once, even if an end user is interested in only a small portion of the overall area covered by the collection of bursts. In some embodiments, the terrain correction techniques described herein are structured around processing in such bursts, where a burst is, for example, treated as a fundamental unit of pixels (or fundamental image unit or element).

For example, in some embodiments, correction factors are generated for acquisition geometry on a burst-level basis. In some embodiments, the correction factors are indexed or labeled using a naming convention that is based on burst-related metadata.

Indexing of correction factors on burst-level acquisition geometry metadata provides various benefits. For example, correction factors may be indexed at a smaller and more consistent granularity (rather than at the collection level), allowing terrain correction to be more efficient. For example, rather than dealing with 240-kilometer by 240-kilometer images, bursts are dealt with, which are sized approximately 20-kilometers by 80-kilometers.

The following are embodiments of performing radiometric terrain correction with bursts. The European Space Agency (ESA) operates Sentinel-1. Sentinel-1 traverses the sky, capturing pictures of the Earth's surface. In some embodiments, the satellite takes pictures in three swaths that are offset from the satellite's orbit. For example, the satellite takes a picture of the nearest swath, then the middle swath, then the farthest swath. After going through the three swaths, the satellite cycles through the three swaths again. In some embodiments, at each swath, the satellite takes a burst of 9 images (or 9 "bursts"). After imaging a cycle of three swaths, 27 bursts are captured.

The 27 bursts are gathered together and delivered as a single collection. That is, the burst is the fundamental unit of processing for Sentinel-1. Periodically (e.g., every 12 days), the satellite returns to approximately the same point in space (e.g., within 100 meters of where it was previously), and images the same collection of bursts.

In some embodiments, the platform uses the acquisition geometry of a burst as a footprint by which correction factors are indexed. For example, for each footprint, there will be a stack of images that have the same footprint that will be captured over time. A single correction factor is generated for each burst footprint. When a new image for a particular burst footprint is received, the previously computed correction factor for that footprint may be applied, rather than having to recompute the correction factor for that image, as described above.

Figure 38:
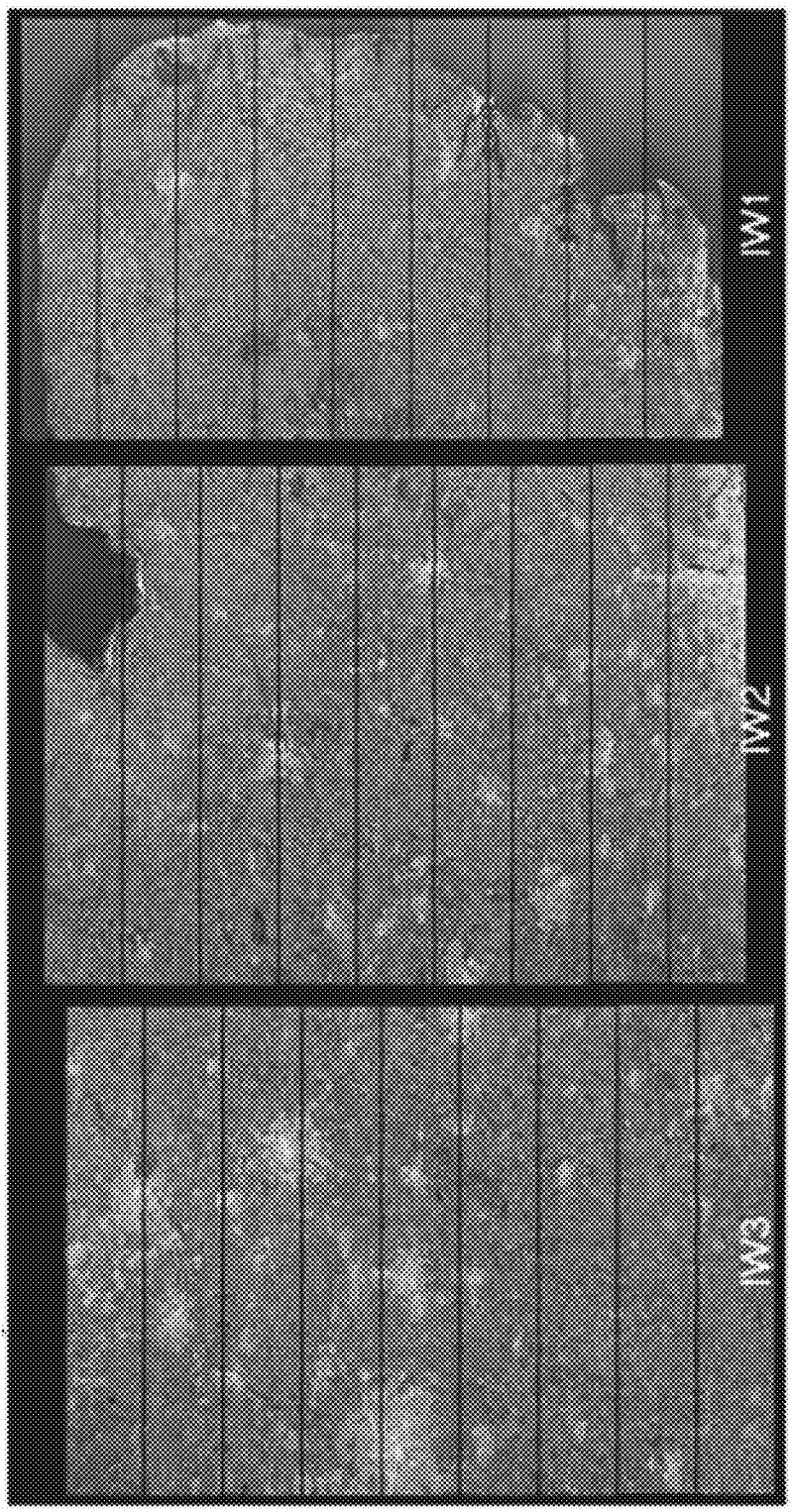
FIG. 38 illustrates an embodiment of a collection of bursts.

FIG. 38 illustrates an embodiment of a collection of bursts. The following is a collection of images that is provided by ESA. In this example, the collection of bursts covers an area of 240 kilometers by 240 kilometers. Internally, the collection is broken into individual bursts that are grouped into three swaths, where each swath is a subset of the collection of images. The collection is not necessarily one large coherent image, and it is not always clear which bursts have been packaged into a collection. Rather, the collection is opened in order to determine what bursts have actually been delivered.

Figure 39:
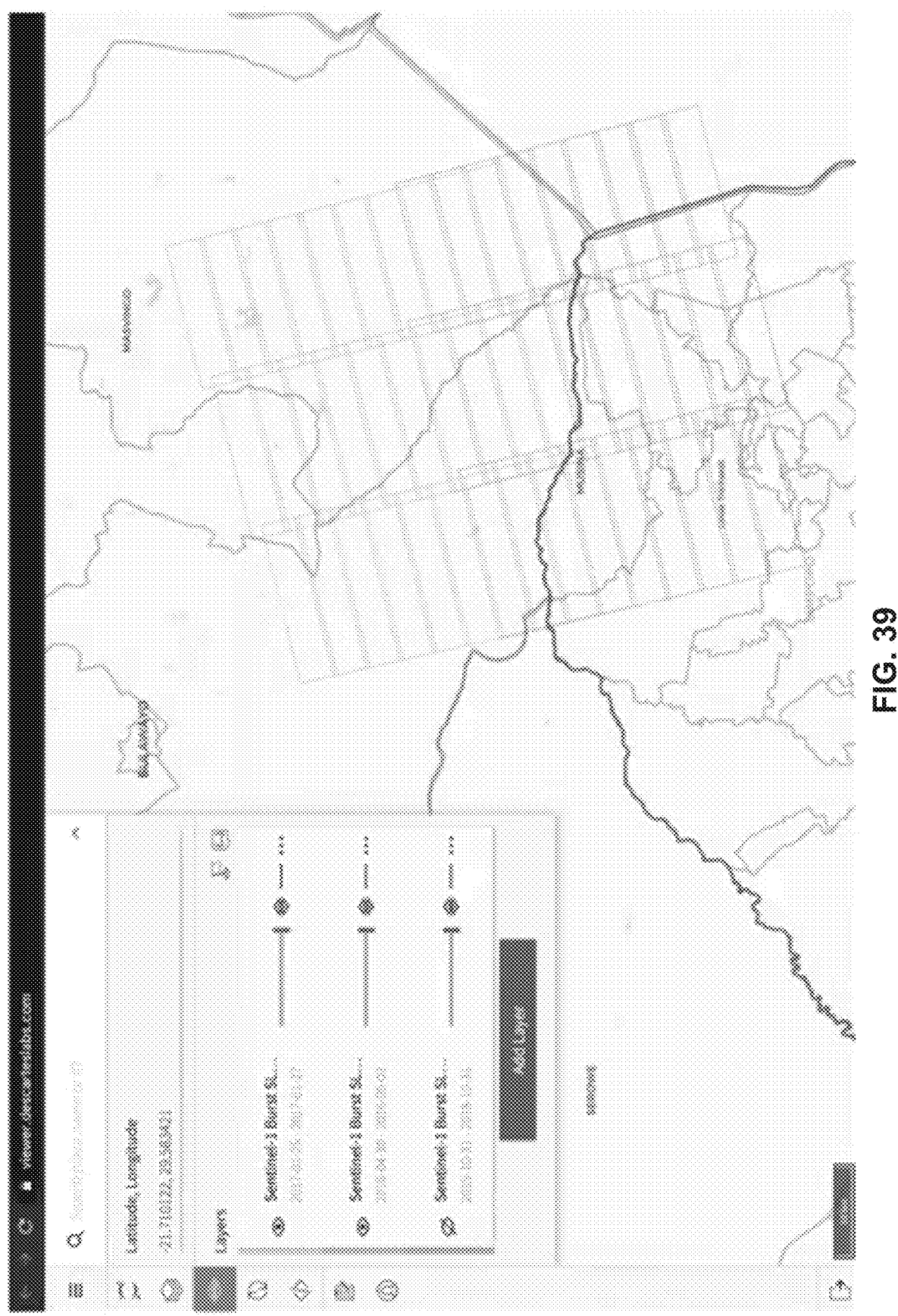
FIG. 39 illustrates an embodiment of collections of bursts.

FIG. 39 illustrates an embodiment of collections of bursts. In this example, two different image collections are shown that are overlapping, and that ESA has provided for different dates over the same area. Each individual rectangle in the two image collections represents a burst. As shown in this example, the bursts are precisely aligned.

It is unknown what bursts are in the image collections until the image collections are opened. In some embodiments, as collections are received, they are opened, and bursts are labeled. The terrain correction operates at the granularity of the burst, rather than at the image collection level that ESA provides. In this way, the system is able to precisely pull out only those portions that are needed for any point in the ground. In some embodiments, the same naming convention used for labeling the bursts is also used to save the radar correction factors for each of the burst footprints/ acquisition classifications that are encountered. In this way, consistency is maintained between bursts, their footprints, and the correction factors (allowing them to be associated with each other). Operating at the burst level (where a burst is the fundamental image unit) is beneficial from a radar perspective, as image collections/packages from ESA are arbitrary and not necessarily consistent from collect to collect, whereas bursts are repeated periodically (e.g., every 12 days) with precision. In some embodiments, each burst is associated with corresponding acquisition geometry metadata, which, as described above, is used to determine an acquisition classification or burst footprint. A correction factor is generated for each encountered burst footprint, as described above. In some embodiments, each burst is labeled by its acquisition classification. By labeling based on burst footprint, an indexing scheme is constructed that allows the system to access these fundamental image units so that repeated processing can be performed reliably. The system need not be concerned whether image collections or groups or bundles of bursts are aligned or have overlap or are consistent from collect to collect.

In some embodiments, as bursts are ingested, the acquisition geometry for each burst is determined. If the acquisition geometry has not been previously encountered, then a correction factor for the footprint is generated. The correction factor is then stored and indexed based on the corresponding burst footprint. In some embodiments, the (uncorrected and aligned) burst is also stored and indexed by the burst footprint, resulting in a new entry in the indexing scheme when a new burst (with a new footprint) is received from the ESA. Other bursts ingested over time with the same footprint will then be stored at the same index, resulting in a stack of bursts that have the same footprint index. The indexing of bursts and correction layers in a consistent manner based on acquisition classification allows for fast retrieval and application of correction layers to uncorrected images.

The following is an example of determining whether, for a given burst, bursts with the same footprint have been previously encountered. As one example, a burst is received. The burst is represented as a polygon (e.g., its footprint). The received polygon is compared with every other polygon in the system to determine whether there is a match. If the burst polygon does not match to any of the previously existing polygon entries, then a new, unique entry is added to the indexing scheme.

In some embodiments, the naming of the bursts is based on acquisition geometry metadata. As one example, the name of a burst is based on satellite orbit. In the example of Sentinel-1, orbits are labeled from 1 to 179 over a 12 day cycle. A second part of the name is related to the time since the satellite passed the equator. This may be used to indicate whether the satellite had been on an ascending or descending pass when acquiring an image. As the time is a continuous variable, in some embodiments, the time since the satellite passed the equator is indicated by finding a bucket or bin (e.g., three second long bin) that the time falls into. For example, each orbit is split up into three second long segments, each representing a bin with its own identifier. The bin that the time since passing the equator falls into is used as a second portion of the name for a burst. Thus, the name for a burst is generated based on its acquisition geometry. This gives every possible polygon in the world.

Figure 40:
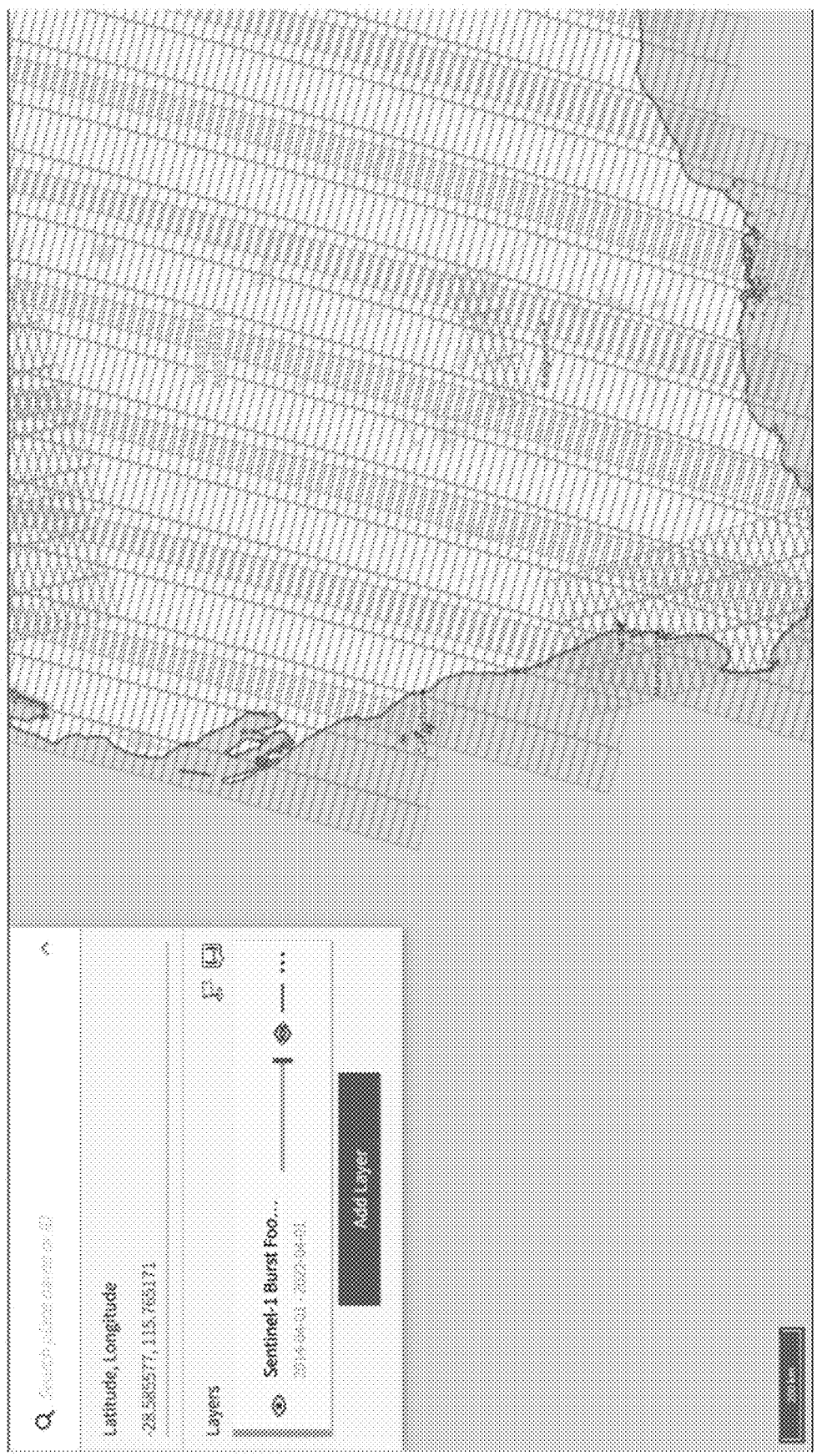
FIG. 40 illustrates an embodiment of representations of bursts.

FIG. 40 illustrates an embodiment of representations of bursts. Examples of burst footprints from Sentinel-1 are shown. When a new image is ingested, it is labeled with a name based on its acquisition geometry (footprint). The footprint of the new image is compared with all existing previous footprints to determine whether there is a match between the footprint of the new image and an existing footprint. If no match is found, then a new entry in a data structure of footprints (e.g., table) is created. This indicates that a new footprint has been observed by Sentinel-1, and a new stack of images for that footprint is started.

In some embodiments, a satellite system, such as NISAR, provides a mapping, such as a reference set of polygons, from which an initial set of footprints and acquisition correction factors may be generated.

In this example, the labeling of a burst is based on an encoding of the combination of orbit number and time since the satellite passed the equator when the burst image was acquired. In some embodiments, the label is further determined based on swath number in the example of Sentinel-1 images (where, as described above, Sentinel-1 images include three swaths). Thus, in some embodiments, a burst footprint is generated based on three components, the first component of which is the orbit track; the second component of which is the time since the equator; and the third component is the swath that the burst/footprint belongs to.

Figure 41:
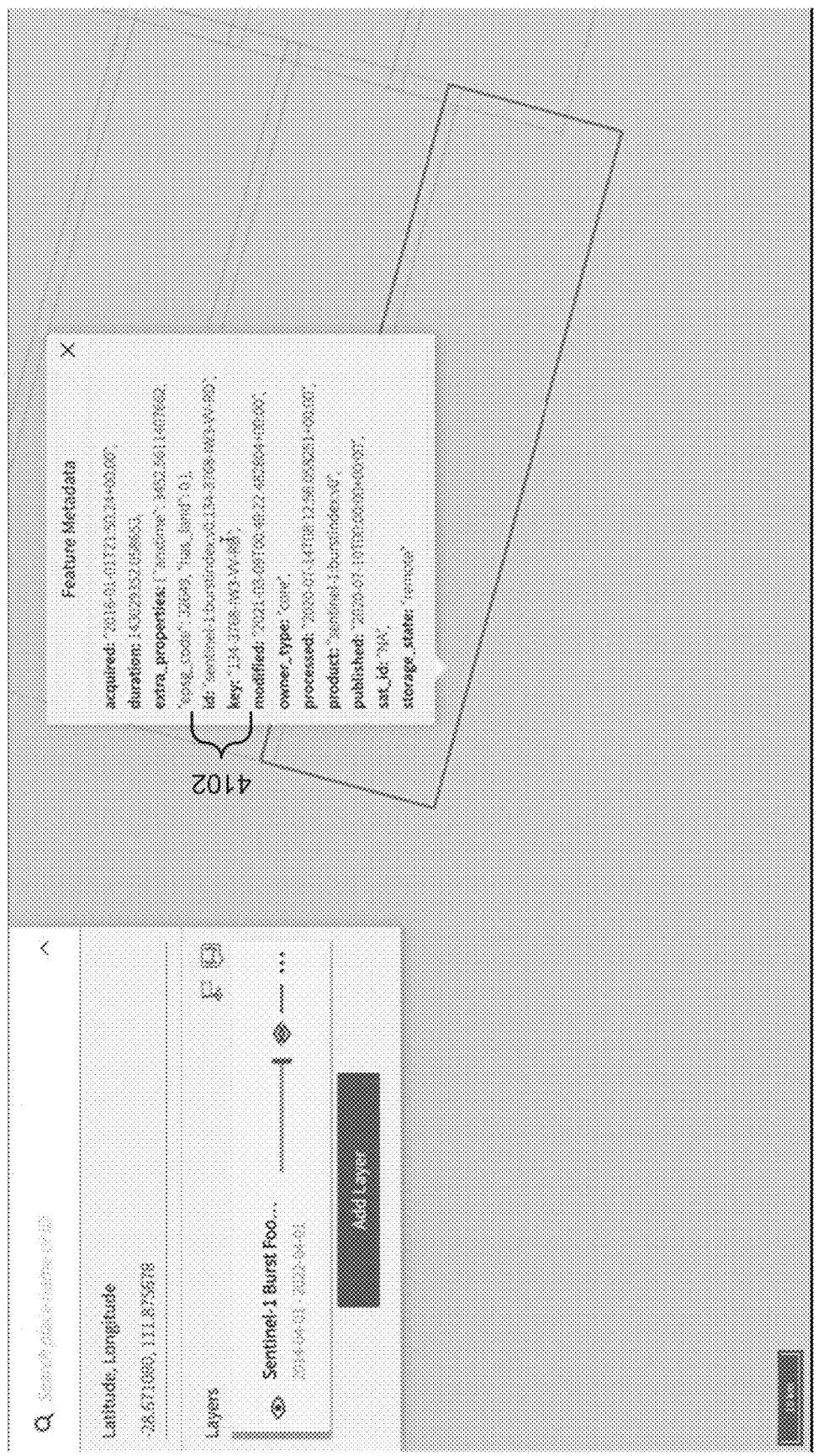
FIG. 41 illustrates an embodiment of metadata of a burst.

FIG. 41 illustrates an embodiment of metadata of a burst. An id (with burst index)/key of the burst based on acquisition geometry is shown at 4102.

As described above, in some embodiments, for satellite imagery such as Sentinel-1, a combination of orbit, time since equator, and swath is used to determine an acquisition classification for each burst. The orbit may be used as a differentiator between bursts. There may be multiple orbits observing the same point on Earth, and those may be different swaths. Then there may be ascending and descending passes that observe the same spot, but those bursts may be at an angle to each other, where only a part of them would overlap. In some cases, these images of the same spot of the Earth would have both a different orbit and different time since equator, as they would have been taken at different times and passes (e.g., for one image, the satellite may have been almost halfway around the Earth later). Thus, even if two images are taken of the same spot of the Earth, they may have been acquired in different ways (due to their track, ascending/descending pass, swath, etc.) with different footprints, for which different terrain correction factors should be applied. That is, even though two bursts are overlapping, the satellite acquisition geometry may be sufficiently different to require different terrain correction factors.

Figure 42:
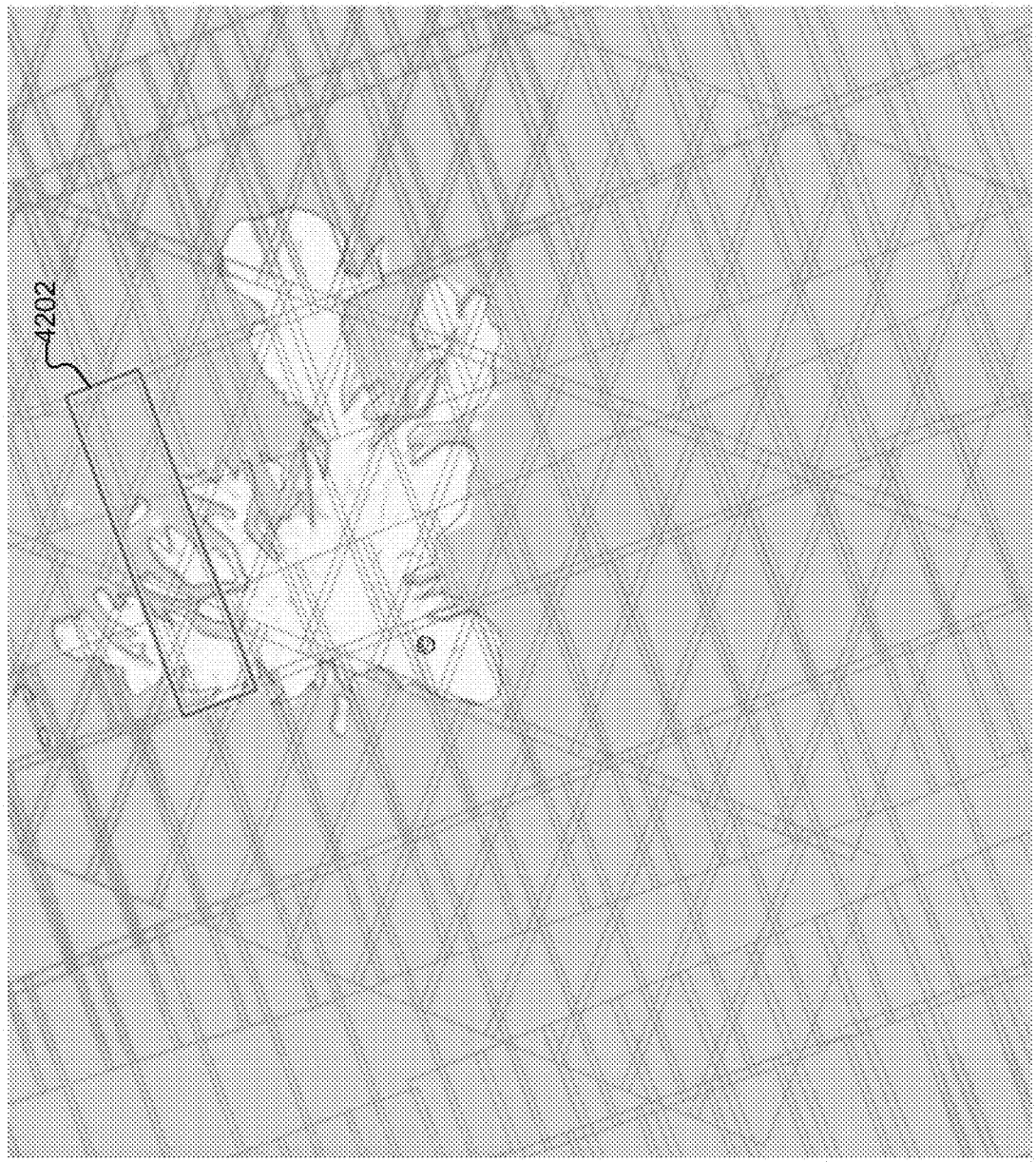
FIG. 42 illustrates an embodiment of bursts.

FIG. 42 illustrates an embodiment of bursts. In this example, consider burst 4202 (represented by a rectangular polygon). There are multiple other bursts that overlap the region covered by burst 4202. However, the orientation of the burst itself is different for ascending and descending passes. For example, bursts that overlap with respect to area may be slanted relative to each other due to the pass direction, and would thus require different correction factors. The differences in acquisition geometry may be encoded via acquisition geometry metadata such as orbit track, time since equator, swath, etc., as described above.

While embodiments involving radiometric terrain correction are described herein for illustrative purposes, the correction techniques may be variously adapted to accommodate other types of imaging, such as optical imagery (e.g., Sentinel-2 imagery), as appropriate. For example, with respect to Sentinel-2 imagery, a correction image (e.g., that has an additive constant and a multiplicative constant) may be generated that is dependent on sun angle. The correction techniques described above may be variously adapted to allow pre-computation of the correction layer (to account for the sun's angle). In this way, the correction for sun angle need not be performed or repeated for every image. Rather, images may be grouped by the location of the sun in the sky when the images were taken. A single correction layer may then be computed for that orientation of the sun. The correction layer may then be applied to any successive images where the sun was in the same portion of the sky, where application of the correction layer (e.g., by performing addition/multiplication) is more efficient than having to repeat the processing of generating the correction for every image.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an uncorrected image and acquisition geometry metadata;
determine an acquisition classification based at least in part on the acquisition geometry metadata;
based at least in part on the acquisition classification, determine whether a correction factor corresponding to the acquisition classification exists;
in response to determining that the correction factor corresponding to the acquisition classification does not exist:
determine the correction factor; and
store the correction factor; and
associate the uncorrected image with the correction factor; and
a memory coupled to the processor and configured to provide the processor with is instructions.

2. The system of claim 1, wherein the acquisition geometry metadata comprises an orbit track, and wherein the acquisition classification is based at least in part on the orbit track.

3. The system of claim 1, wherein the acquisition geometry metadata comprises an indication of time since a satellite passed the Equator, and wherein the acquisition classification is based at least in part on the indication of time since the satellite passed the Equator.

4. The system of claim 1, wherein the acquisition geometry metadata comprises a swath, and wherein the acquisition classification is based at least in part on the swath.

5. The system of claim 1, wherein the determining whether the correction factor corresponding to the acquisition classification exists comprises performing a lookup of a data store using the acquisition classification as a key.

6. The system of claim 1, wherein storing the correction factor comprises indexing the correction factor at least in part by the acquisition classification.

7. The system of claim 1, wherein associating the uncorrected image with the correction factor comprises associating the uncorrected image with the acquisition classification.

8. The system of claim 1, wherein the uncorrected image is labeled at least in part by using the acquisition classification.

9. The system of claim 1, wherein the processor is further configured to align the uncorrected image at least in part by performing geocoding.

10. The system of claim 1, wherein the processor is further configured to store the uncorrected image.

11. A method, comprising:
receiving an uncorrected image and acquisition geometry metadata;
determining an acquisition classification based at least in part on the acquisition geometry metadata;
based at least in part on the acquisition classification, determining whether a correction factor corresponding to the acquisition classification exists;
in response to determining that the correction factor corresponding to the acquisition classification does not exist:
determining the correction factor; and
storing the correction factor; and
associating the uncorrected image with the correction factor.

12. The method of claim 11, wherein the acquisition geometry metadata comprises an orbit track, and wherein the acquisition classification is based at least in part on the orbit track.

13. The method of claim 11, wherein the acquisition geometry metadata comprises an indication of time since a satellite passed the Equator, and wherein the acquisition classification is based at least in part on the indication of time since the satellite passed the Equator.

14. The method of claim 11, wherein the acquisition geometry metadata comprises a swath, and wherein the acquisition classification is based at least in part on the swath.

15. The method of claim 11, wherein the determining whether the correction factor corresponding to the acquisition classification exists comprises performing a lookup of a data store using the acquisition classification as a key.

16. The method of claim 11, wherein storing the correction factor comprises indexing the correction factor at least in part by the acquisition classification.

17. The method of claim 11, wherein associating the uncorrected image with the correction factor comprises associating the uncorrected image with the acquisition classification.

18. The method of claim 11, wherein the uncorrected image is labeled at least in part by using the acquisition classification.

19. The method of claim 11, further comprising aligning the uncorrected image at least in part by performing geocoding.

20. The method of claim 11, further comprising storing the uncorrected image.

21. A computer program product embodied in a non-transitory computer readable medium and comprising computer instructions for:
- receiving an uncorrected image and acquisition geometry metadata;
- determining an acquisition classification based at least in part on the acquisition geometry metadata;
- based at least in part on the acquisition classification, determining whether a correction factor corresponding to the acquisition classification exists;
- is in response to determining that the correction factor corresponding to the acquisition classification does not exist:
  - determining the correction factor; and
  - storing the correction factor; and
- associating the uncorrected image with the correction factor.

\* \* \* \* \*